US012626575B2

(12) United States Patent
Dong et al.

(10) Patent No.: US 12,626,575 B2
(45) Date of Patent: May 12, 2026

(54) HUMAN SENSING-BASED AUTOMATIC CONTROL METHOD, FIRST ELECTRONIC DEVICE, AND SYSTEM

(71) Applicant: HUAWEI TECHNOLOGIES CO., LTD., Guangdong (CN)

(72) Inventors: Wei Dong, Xi'an (CN); Haowei Xu, Xi'an (CN); Pei Yao, Xi'an (CN); Xiao Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 49 days.

(21) Appl. No.: 18/704,870

(22) PCT Filed: Aug. 30, 2022

(86) PCT No.: PCT/CN2022/115867
§ 371 (c)(1),
(2) Date: Apr. 25, 2024

(87) PCT Pub. No.: WO2023/071498
PCT Pub. Date: May 4, 2023

(65) Prior Publication Data
US 2025/0046168 A1     Feb. 6, 2025

(30) Foreign Application Priority Data
Oct. 25, 2021     (CN) .......................... 202111243792.1

(51) Int. Cl.
*G08B 21/02* (2006.01)
*G10L 15/22* (2006.01)
*G16Y 10/60* (2020.01)
*G16Y 10/80* (2020.01)

(52) U.S. Cl.
CPC .............. *G08B 21/02* (2013.01); *G10L 15/22* (2013.01); *G16Y 10/60* (2020.01); *G16Y 10/80* (2020.01)

(58) Field of Classification Search
None
See application file for complete search history.

(56) References Cited

U.S. PATENT DOCUMENTS 10,497,235 B1 * 12/2019 Rogers ............. G08B 13/19691
11,741,813 B2 * 8/2023 Chen ..................... A61B 5/1117
340/573.1
(Continued)

FOREIGN PATENT DOCUMENTS

CN      107816990 A     3/2018
CN      107863658 A     3/2018
(Continued)

*Primary Examiner* — Muhammad Adnan

(57) ABSTRACT

The system includes a hub device, a first electronic device, and a second electronic device. The first electronic device includes a first ultra-wide band module and a millimeter-wave radar module. Position information of the second electronic device and position information of a user are obtained based on position measurement for the second electronic device, measurement for a human body position, and conversion that are performed by the first electronic device. At least one second electronic device automatically performs a preset operation based on the position information of the user and the position information of the second electronic device.

20 Claims, 52 Drawing Sheets

(56) References Cited

U.S. PATENT DOCUMENTS

| | | | | |
|---|---|---|---|---|
| 11,754,699 | B2 * | 9/2023 | Wang | G01S 13/583 |
| | | | | 342/114 |
| 11,875,659 | B2 * | 1/2024 | Shin | G08B 21/043 |
| 12,196,850 | B2 * | 1/2025 | Adimoolam | G01S 13/56 |
| 2017/0309142 | A1 * | 10/2017 | Phillips | G08B 13/1672 |
| 2019/0173685 | A1 * | 6/2019 | Gould | H04L 12/2827 |
| 2019/0268177 | A1 * | 8/2019 | Li | H04L 12/2834 |
| 2019/0363902 | A1 * | 11/2019 | Gould | H04L 12/2838 |
| 2020/0166611 | A1 * | 5/2020 | Lin | G01S 13/0209 |
| 2022/0319694 | A1 * | 10/2022 | Peterson | G16H 40/67 |

FOREIGN PATENT DOCUMENTS

| | | |
|---|---|---|
| CN | 110687808 A | 1/2020 |
| JP | 4410302 B1 | 2/2010 |

* cited by examiner (a)

(b)

(a)

(b)

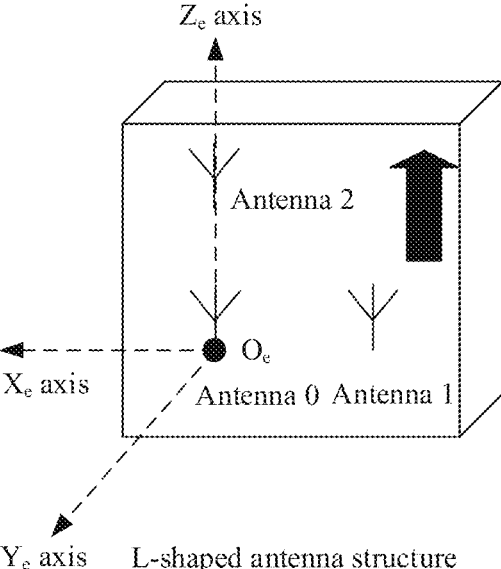
$Z_e$ axis
Antenna 2
$O_e$
$X_e$ axis    Antenna 0  Antenna 1
$Y_e$ axis    L-shaped antenna structure
(a)
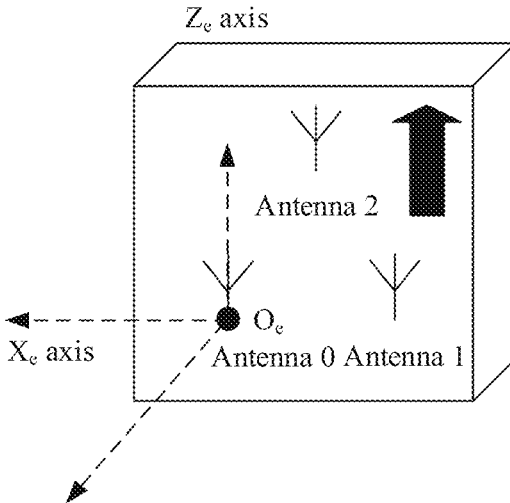
$Z_e$ axis
Antenna 2
$O_e$
$X_e$ axis    Antenna 0  Antenna 1
$Y_e$ axis    Triangular antenna structure
(b)
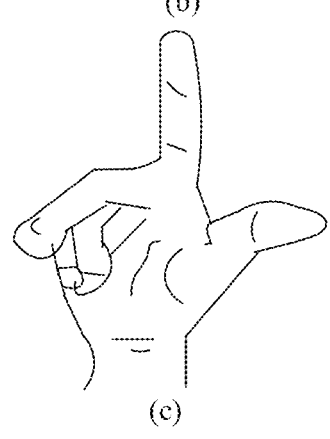
(c)
FIG. 9

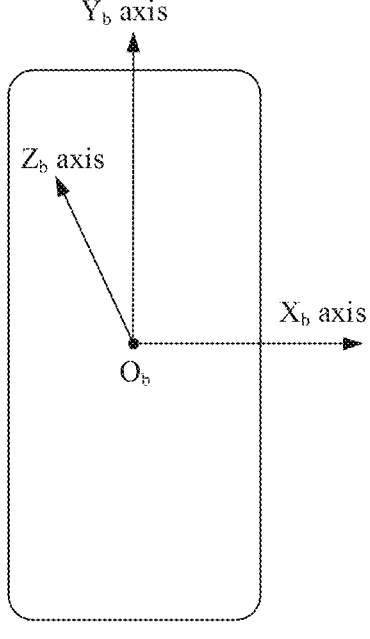
(a)
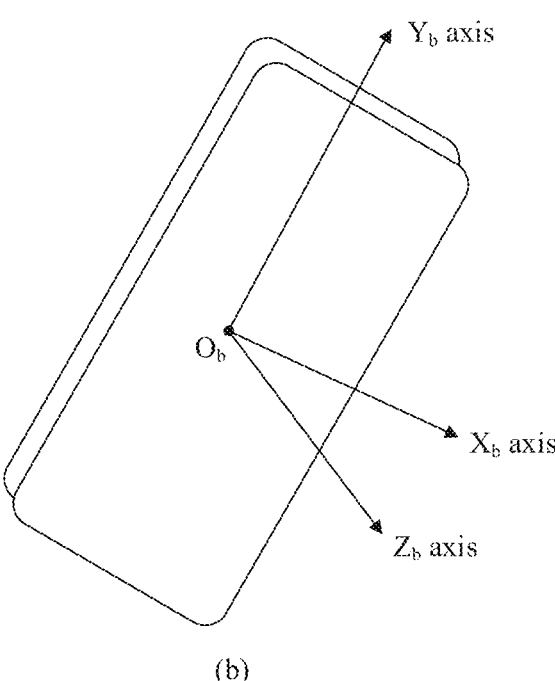
(b)
FIG. 10

(a)

(b)

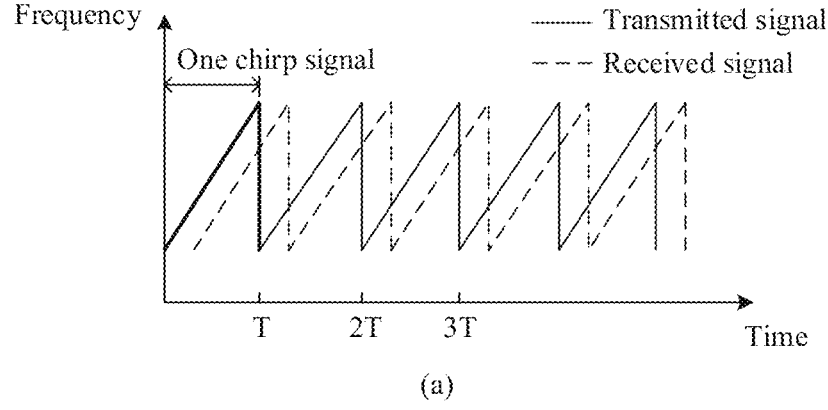
(a)
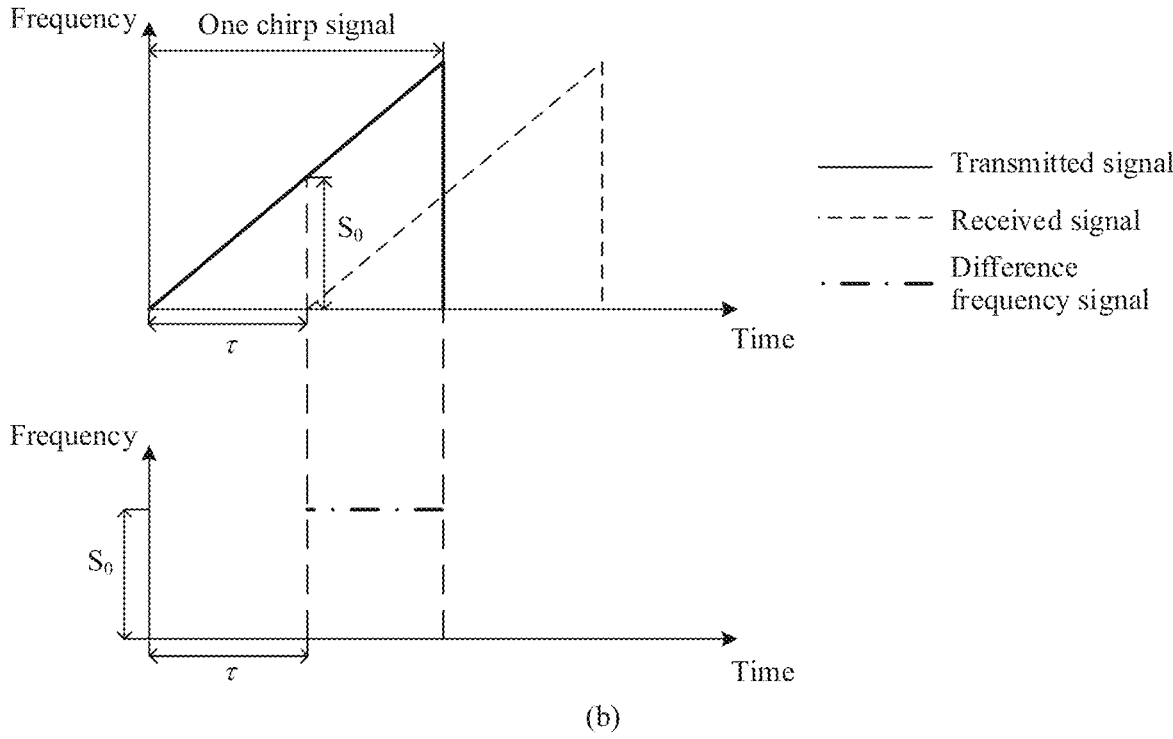
(b)
FIG. 18

~
TO

Two transmit antennas and four receive antennas

One transmit antenna and eight receive antennas

~
TO

S2100: A millimeter-wave radar module receives a reflected signal

S2101: The millimeter-wave radar module performs a two-dimensional fast Fourier transform on a digital difference frequency signal Range FFT

↓

Doppler FFT

S2102: The millimeter-wave radar module obtains a distance between a reflection point and the millimeter-wave radar and a radial speed S2103: The millimeter-wave radar module determines a signal coming direction of the reflected signal S2104: The millimeter-wave radar module determines coordinates of the reflection point in a fourth coordinate system S2105: The millimeter-wave radar module determines coordinates of a smart device or a user in the fourth coordinate system S2106: The millimeter-wave radar module tracks the smart device or the user

FIG. 21

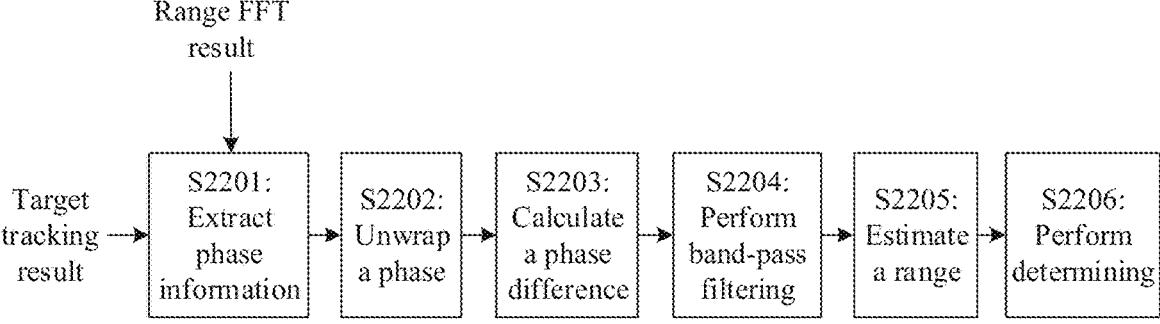

Range FFT result

↓

Target tracking result → S2201: Extract phase information → S2202: Unwrap a phase → S2203: Calculate a phase difference → S2204: Perform band-pass filtering → S2205: Estimate a range → S2206: Perform determining

S1: Establish a first coordinate system, a second coordinate system, a third coordinate system, a fourth coordinate system, and a fifth coordinate system, and obtain position information of a device, a region, and a user in the fifth coordinate system through conversion from the first coordinate system, the second coordinate system, the third coordinate system, and the fourth coordinate system to the fifth coordinate system S2: A second electronic device performs a preset operation based on the position information of the user and position information of the second electronic device (a)

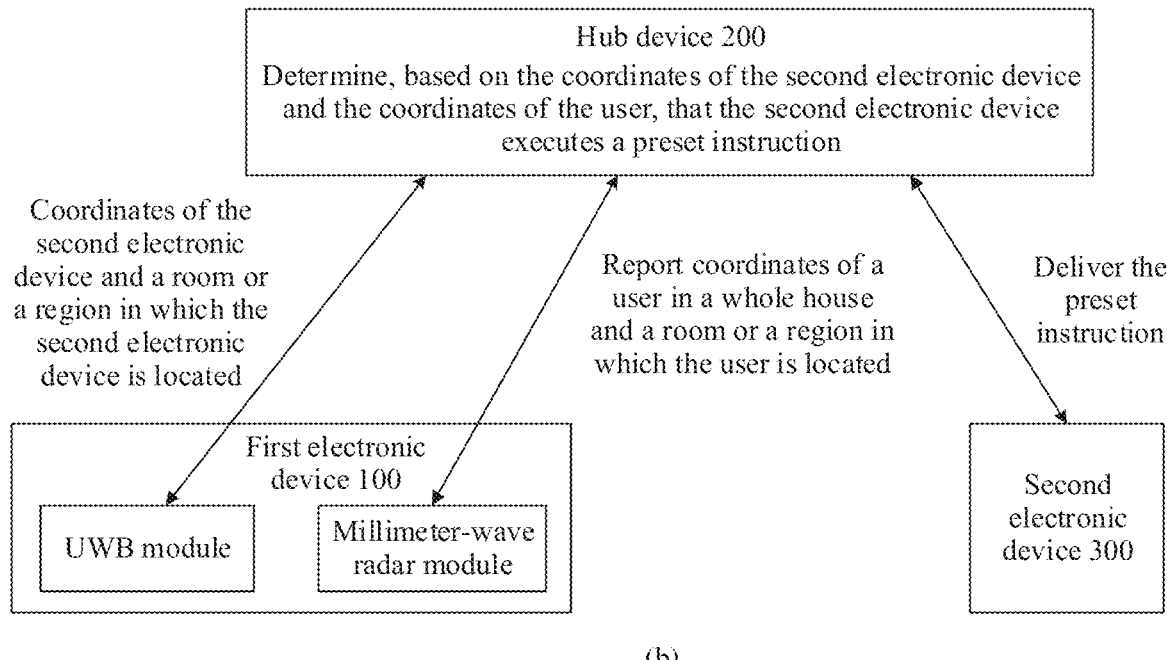

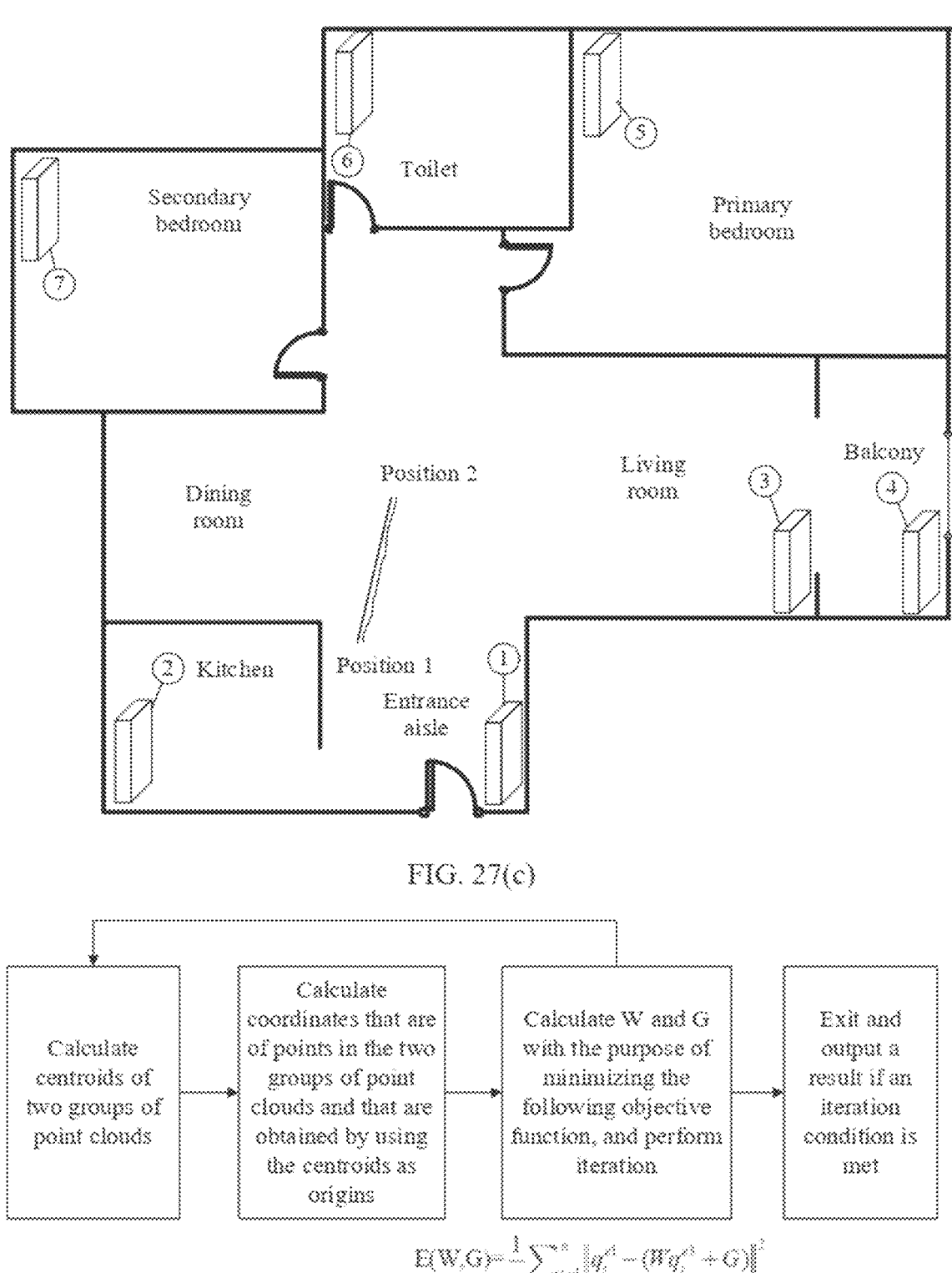

FIG. 27(c)

Calculate centroids of two groups of point clouds → Calculate coordinates that are of points in the two groups of point clouds and that are obtained by using the centroids as origins → Calculate W and G with the purpose of minimizing the following objective function, and perform iteration → Exit and output a result if an iteration condition is met $$E(W,G) = \frac{1}{n}\sum\nolimits_{i=1}^{n}\left\| q_i' - (Wq_i' + G)\right\|^2$$

FIG. 28

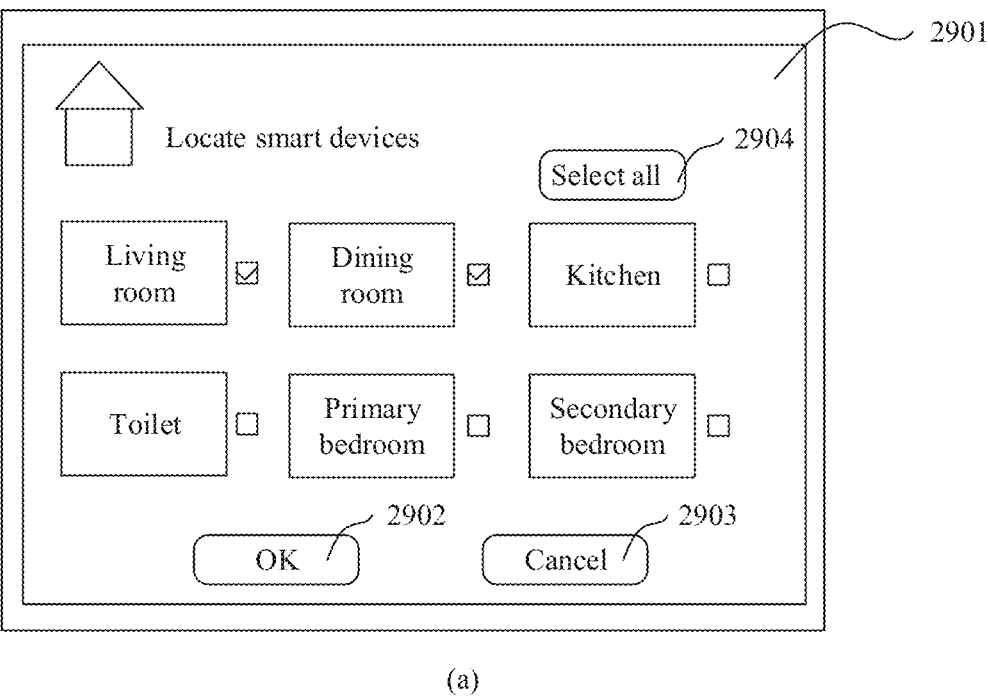
(a)
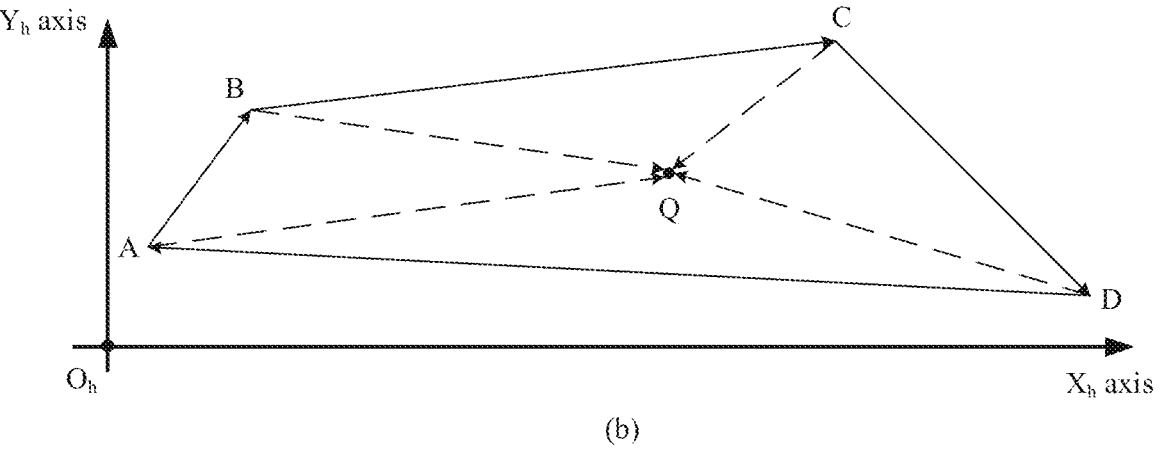
(b)
FIG. 29

First electronic device

Second electronic device

HUMAN SENSING-BASED AUTOMATIC CONTROL METHOD, FIRST ELECTRONIC DEVICE, AND SYSTEM

This application is a National Stage of International Application No. PCT/CN2022/115867, filed on Aug. 30, 2022, which claims priority to Chinese Patent Application No. 202111243792.1, filed with the China National Intellectual Property Administration on Oct. 25, 2021. The disclosures of the aforementioned applications are hereby incorporated herein by reference in its entirety.

TECHNICAL FIELD

This application relates to the field of automatic control, and in particular, to a human sensing-based automatic control method, a first electronic device, and a system.

BACKGROUND

With rapid development of smart homes, more users install internet of things (IoT) devices (which may also be referred to as IoT devices, smart devices, or the like) in places such as homes or offices, and even install IoT devices throughout a house (which may also be referred to as whole-house intelligence, an all-in-one smart home, a smart manager, or the like). The users can experience convenience brought by the IoT devices. However, in the conventional technology, the user needs to carry a mobile device (for example, a smartphone or a wearable device) to implement automatic control of the IoT device through communication and sensing between the mobile device and the IoT device, and the like. The user sometimes forgets to carry the mobile device in places such as the home or the office, and cannot implement automatic control of the IoT device. As a result, inconvenience is brought to the user, and user experience is affected.

SUMMARY

On a basis of the foregoing background, how to make automatic control of an IoT device by a user more convenient, and further improve user experience becomes a problem to be considered.

To resolve the foregoing technical problem, this application provides a human sensing-based automatic control method, a first electronic device, and a system. According to the technical solutions of this application, when a user approaches an IoT device, the IoT device automatically performs an operation, without performing any operation by the user or carrying any electronic device by the user neither. This greatly improves user experience. In addition, hardware of the IoT devices does not need to be modified neither. For example, a smart speaker generally has no camera and does not need to be additionally equipped with a camera.

According to a first aspect, this application provides a human sensing-based communication system. The system includes a hub device, a first electronic device, and a second electronic device. Any two of the hub device, the first electronic device, and the second electronic device communicate in a wired communication or wireless communication manner. The first electronic device includes a first ultra-wide band module and a millimeter-wave radar module. The hub device obtains, based on position measurement for a human body position, and conversion that are performed by the first electronic device, and communication between the hub device and the first electronic device, position information of the second electronic device and position information of a user in a whole-house coordinate system provided by the hub device. The hub device sends a first message to the second electronic device. The second electronic device receives the first message, and adjusts an air supply direction of the second electronic device based on a position of the second electronic device and a position of the user, so that the air supply direction of the second electronic device avoids the user.

In this implementation, an air supply device automatically adjusts an air supply direction based on the position of the user, so that the air supply direction avoids the user. The user does not need to perform a manual operation, and the user does not need to carry any device neither. This improves convenience and comfort of using the air supply device by the user.

According to the first aspect, the hub device further obtains an area of a region to which the second electronic device belongs, and sends a second message to the second electronic device. The second message includes first indication information. The first indication information indicates the area of the region to which the second electronic device belongs. The second electronic device receives the second message, and adjusts an air supply amount based on the second message.

In this implementation, the air supply device automatically adjusts an air supply amount based on an area of a room or a region to which the air supply device belongs. A larger area indicates a larger air supply amount. This improves convenience of using the air supply device by the user.

According to the first aspect or any implementation of the first aspect, before sending the first message to the second electronic device, the hub device determines, based on the position information of the user and the position information of the second electronic device, that the user is located in the region to which the second electronic device belongs. In other words, if it is determined that the user enters the region to which the air supply device belongs, the air supply direction is automatically adjusted.

According to the first aspect or any implementation of the first aspect, before the hub device obtains the position information of the second electronic device and the position information of the user in the whole-house coordinate system provided by the hub device, the hub device learns that a position change of the user is greater than a first preset range.

In this implementation, if it is determined that the user moves, the air supply device is trigged to adjust the air supply direction, so that the air supply direction avoids the user.

According to a second aspect, this application provides a human sensing-based communication system. The system includes a hub device, a first electronic device, and R second electronic devices. Any two of the hub device, the first electronic device, and any one of the R second electronic devices communicate in a wired communication or wireless communication manner. The first electronic device includes a first ultra-wide band module and a millimeter-wave radar module. The R second electronic devices include a mobile device and a playing device. R is a positive integer greater than or equal to 1. The hub device obtains, based on position measurement for the mobile device, measurement for a human body position, and conversion that are performed by the first electronic device, and communication between the hub device and the first electronic device, position information of a preset position and position information of a first user in a whole-house coordinate system provided by the hub device. The hub device learns that a distance between the first user and the preset position is less than or equal to a preset first distance, and sends a first message to the playing device. The playing device receives the first message, and sends prompt information.

In this implementation, if it is determined that a specified user (for example, a child) approaches the preset position, the prompt information is automatically sent, to avoid danger.

According to the second aspect, if the hub device learns that the first user passes through a line segment connecting two preset positions, the hub device sends the first message to the playing device. The playing device receives the first message, and sends the prompt information.

In this implementation, the preset positions are two points. If the hub device determines that the first user passes through the line segment connecting the two preset points, the hub device determines that the first user approaches the preset position.

According to the second aspect or any implementation of the second aspect, the hub device learns that the first user enters a region including three or more preset positions, and sends the first message to the playing device. The playing device receives the first message, and sends the prompt information.

In this implementation, the preset positions are three or more points. If the hub device determines that the first user enters the three-dimensional region enclosed by the three or more points, the hub device determines that the first user approaches the preset position.

According to a third aspect, this application provides a human sensing-based communication system. The system includes a hub device, a first electronic device, and R second electronic devices. Any two of the hub device, the first electronic device, and any one of the R second electronic devices communicate in a wired communication or wireless communication manner. The first electronic device includes a first ultra-wide band module and a millimeter-wave radar module. The R second electronic devices include a first device and a second device. R is a positive integer greater than or equal to 1. The hub device obtains, based on position measurement for the second electronic device, measurement for a human body position, and conversion that are performed by the first electronic device, and communication between the hub device and the first electronic device, position information of the first device and position information of a user in a whole-house coordinate system provided by the hub device. The hub device sends a first message to the second device if the hub device determines, based on the position information of the first device and the position information of the user, that a distance between at least one user and the first device is less than a preset first distance. The second device receives the first message, and sends prompt information.

In this implementation, if it is determined that the user approaches a specified second electronic device, the prompt information is automatically sent.

According to the third aspect, before the hub device sends the first message to the second device, the hub device learns that duration within which the distance between the at least one user and the first device is less than the first distance is greater than or equal to first duration. In this implementation, if it is determined that the user approaches the specified second electronic device and stays for more than preset duration, the prompt information is automatically sent.

According to the third aspect or any implementation of the third aspect, the second device and the first device are a same device. In other words, a device that plays the prompt information may be the specified second electronic device. For example, the specified second electronic device is a microwave oven. If the user stays beside the microwave oven for a long time, the microwave oven sends the prompt information, to prompt the user to leave.

According to a fourth aspect, this application provides a human sensing-based communication system. The system includes a hub device, a first electronic device, and R second electronic devices. Any two of the hub device, the first electronic device, and any one of the R second electronic devices communicate in a wired communication or wireless communication manner. The first electronic device includes a first ultra-wide band module and a millimeter-wave radar module. The R second electronic devices include a mobile device and a playing device. R is a positive integer greater than or equal to 1. The hub device obtains, based on position measurement for the mobile device, measurement for a human body position, and conversion that are performed by the first electronic device, and communication between the hub device and the first electronic device, position information of the R second electronic devices, position information of at least one piece of furniture, and position information and an attitude of a user in a whole-house coordinate system provided by the hub device. The attitude includes standing, sitting, or lying. The hub device learns that duration within which the user keeps the sitting attitude is greater than or equal to preset duration, and sends a first message to the playing device. The playing device receives the first message, and sends prompt information.

In this implementation, if unhealthy behavior (for example, sedentariness) of the user is detected, the prompt information is automatically sent.

According to the fourth aspect, before the hub device sends the first message to the playing device, the hub device learns that a distance between the user and one piece of furniture is less than a preset error range.

Furniture may include a bed, a sofa, a chair, and the like. If the user is beside the furniture, the attitude may be sitting.

According to a fifth aspect, this application provides a human sensing-based communication system. The system includes a hub device, a first electronic device, and R second electronic devices. Any two of the hub device, the first electronic device, and any one of the R second electronic devices communicate in a wired communication or wireless communication manner. The first electronic device includes a first ultra-wide band module and a millimeter-wave radar module. The R second electronic devices include a playing device. R is a positive integer greater than or equal to 1. The hub device obtains, based on measurement and conversion performed by the first electronic device on a human body position and communication between the hub device and the first electronic device, position information of a user in a whole-house coordinate system provided by the hub device. The hub device learns that an exception of the user occurs, and sends a first message to the playing device. The playing device receives the first message, and sends query information.

In this implementation, if it is detected that the exception of the user occurs, the query information is automatically sent.

According to the fifth aspect, that the hub device learns that the exception of the user occurs includes: The hub device learns that the user falls; or the hub device learns that a heartbeat or a breath of a static user is not detected within first duration.

According to the fifth aspect or any implementation of the fifth aspect, if the playing device receives a user reply speech within preset duration after the playing device sends the query information, the playing device executes a corresponding instruction based on semantics of the user reply speech.

According to the fifth aspect or any implementation of the fifth aspect, that the playing device executes the corresponding instruction based on the semantics of the user reply speech includes: The playing device determines, based on the user reply speech, that the user needs help, and sends alarm information to a remote device; the playing device determines, based on the user reply speech, that the user does not need help, and stops receiving a speech; or the playing device executes a first instruction based on the user reply speech.

According to the fifth aspect or any implementation of the fifth aspect, the playing device sends the alarm information to the remote device if the playing device does not receive a user reply within the preset duration after the playing device sends the query information.

According to the fifth aspect or any implementation of the fifth aspect, the hub device sends the first message to the playing device if the hub device learns, after the playing device sends the query information, that the user moves. The playing device receives the first message, and sends the query information.

According to the fifth aspect or any implementation of the fifth aspect, the playing device is a device that is closest to the user in the R second electronic devices.

According to a sixth aspect, this application provides a human sensing-based automatic control method, applied to a human sensing-based communication system. The system includes a hub device, a first electronic device, and a second electronic device. Any two of the hub device, the first electronic device, and the second electronic device communicate in a wired communication or wireless communication manner. The first electronic device includes a first ultra-wide band module and a millimeter-wave radar module. The method includes: The hub device obtains, based on position measurement for the second electronic device, measurement for a human body position, and conversion that are performed by the first electronic device, and communication between the hub device and the first electronic device, position information of the second electronic device and position information of a user in a whole-house coordinate system provided by the hub device. The hub device sends a first message to the second electronic device. The second electronic device receives the first message, and adjusts an air supply direction of the second electronic device based on a position of the second electronic device and a position of the user, so that the air supply direction of the second electronic device avoids the user.

In this implementation, an air supply device automatically adjusts an air supply direction based on the position of the user, so that the air supply direction avoids the user. The user does not need to perform a manual operation, and the user does not need to carry any device neither. This improves convenience and comfort of using the air supply device by the user.

According to the sixth aspect, the hub device further obtains an area of a region to which the second electronic device belongs, and sends a second message to the second electronic device. The second message includes first indication information. The first indication information indicates the area of the region to which the second electronic device belongs. The second electronic device receives the second message, and adjusts an air supply amount based on the second message.

In this implementation, the air supply device automatically adjusts an air supply amount based on an area of a room or a region to which the air supply device belongs. A larger area indicates a larger air supply amount. This improves convenience of using the air supply device by the user.

According to the sixth aspect or any implementation of the sixth aspect, before sending the first message to the second electronic device, the hub device determines, based on the position information of the user and the position information of the second electronic device, that the user is located in the region to which the second electronic device belongs. In other words, if it is determined that the user enters the region to which the air supply device belongs, the air supply direction is automatically adjusted.

According to the sixth aspect or any implementation of the sixth aspect, before the hub device obtains the position information of the second electronic device and the position information of the user in the whole-house coordinate system provided by the hub device, the hub device learns that a position change of the user is greater than a first preset range.

In this implementation, if it is determined that the user moves, the air supply device is trigged to adjust the air supply direction, so that the air supply direction avoids the user.

According to a seventh aspect, this application provides a human sensing-based automatic control method, applied to a human sensing-based communication system. The system includes a hub device, a first electronic device, and R second electronic devices. Any two of the hub device, the first electronic device, and any one of the R second electronic devices communicate in a wired communication or wireless communication manner. The first electronic device includes a first ultra-wide band module and a millimeter-wave radar module. The R second electronic devices include a mobile device and a playing device. R is a positive integer greater than or equal to 1. The hub device obtains, based on position measurement for the mobile device, measurement for a human body position, and conversion that are performed by the first electronic device, and communication between the hub device and the first electronic device, position information of a preset position and position information of a first user in a whole-house coordinate system provided by the hub device. The hub device learns that a distance between the first user and the preset position is less than or equal to a preset first distance, and sends a first message to the playing device. The playing device receives the first message, and sends prompt information.

In this implementation, if it is determined that a specified user (for example, a child) approaches the preset position, the prompt information is automatically sent, to avoid danger.

According to the seventh aspect, if the hub device learns that the first user passes through a line segment connecting two preset positions, the hub device sends the first message to the playing device. The playing device receives the first message, and sends the prompt information.

In this implementation, the preset positions are two points. If the hub device determines that the first user passes through the line segment connecting the two preset points, the hub device determines that the first user approaches the preset position.

According to the seventh aspect or any implementation of the seventh aspect, the hub device learns that the first user enters a region including three or more preset positions, and sends the first message to the playing device. The playing device receives the first message, and sends the prompt information.

In this implementation, the preset positions are three or more points. If the hub device determines that the first user enters the three-dimensional region enclosed by the three or more points, the hub device determines that the first user approaches the preset position.

According to an eighth aspect, this application provides a human sensing-based automatic control method, applied to a human sensing-based communication system. The system includes a hub device, a first electronic device, and R second electronic devices. Any two of the hub device, the first electronic device, and any one of the R second electronic devices communicate in a wired communication or wireless communication manner. The first electronic device includes a first ultra-wide band module and a millimeter-wave radar module. The R second electronic devices include a first device and a second device. R is a positive integer greater than or equal to 1. The hub device obtains, based on position measurement for the second electronic device, measurement for a human body position, and conversion that are performed by the first electronic device, and communication between the hub device and the first electronic device, position information of the first device and position information of a user in a whole-house coordinate system provided by the hub device. The hub device sends a first message to the second device if the hub device determines, based on the position information of the first device and the position information of the user, that a distance between at least one user and the first device is less than a preset first distance. The second device receives the first message, and sends prompt information.

In this implementation, if it is determined that the user approaches a specified second electronic device, the prompt information is automatically sent.

According to the eighth aspect, before the hub device sends the first message to the second device, the hub device learns that duration within which the distance between the at least one user and the first device is less than the first distance is greater than or equal to first duration. In this implementation, if it is determined that the user approaches the specified second electronic device and stays for more than preset duration, the prompt information is automatically sent.

According to the eighth aspect or any implementation of the eighth aspect, the second device and the first device are a same device. In other words, a device that plays the prompt information may be the specified second electronic device. For example, the specified second electronic device is a microwave oven. If the user stays beside the microwave oven for a long time, the microwave oven sends the prompt information, to prompt the user to leave.

According to a ninth aspect, this application provides a human sensing-based automatic control method, applied to a human sensing-based communication system. The system includes a hub device, a first electronic device, and R second electronic devices. Any two of the hub device, the first electronic device, and any one of the R second electronic devices communicate in a wired communication or wireless communication manner. The first electronic device includes a first ultra-wide band module and a millimeter-wave radar module. The R second electronic devices include a mobile device and a playing device. R is a positive integer greater than or equal to 1. The hub device obtains, based on position measurement for the mobile device, measurement for a human body position, and conversion that are performed by the first electronic device, and communication between the hub device and the first electronic device, position information of the R second electronic devices, position information of at least one piece of furniture, and position information and an attitude of a user in a whole-house coordinate system provided by the hub device. The attitude includes standing, sitting, or lying. The hub device learns that duration within which the user keeps the sitting attitude is greater than or equal to preset duration, and sends a first message to the playing device. The playing device receives the first message, and sends prompt information.

In this implementation, if unhealthy behavior (for example, sedentariness) of the user is detected, the prompt information is automatically sent.

According to the ninth aspect, before the hub device sends the first message to the playing device, the hub device learns that a distance between the user and one piece of furniture is less than a preset error range.

Furniture may include a bed, a sofa, a chair, and the like. If the user is beside the furniture, the attitude may be sitting.

According to a tenth aspect, this application provides a human sensing-based automatic control method, applied to a human sensing-based communication system. The system includes a hub device, a first electronic device, and R second electronic devices. Any two of the hub device, the first electronic device, and any one of the R second electronic devices communicate in a wired communication or wireless communication manner. The first electronic device includes a first ultra-wide band module and a millimeter-wave radar module. The R second electronic devices include a playing device. R is a positive integer greater than or equal to 1. The hub device obtains, based on measurement and conversion performed by the first electronic device on a human body position and communication between the hub device and the first electronic device, position information of a user in a whole-house coordinate system provided by the hub device. The hub device learns that an exception of the user occurs, and sends a first message to the playing device. The playing device receives the first message, and sends query information.

In this implementation, if it is detected that the exception of the user occurs, the query information is automatically sent.

According to the tenth aspect, that the hub device learns that an exception of the user occurs includes: The hub device learns that the user falls; or the hub device learns that a heartbeat or a breath of a static user is not detected within first duration.

According to the tenth aspect or any implementation of the tenth aspect, if the playing device receives a user reply speech within preset duration after the playing device sends the query information, the playing device executes a corresponding instruction based on semantics of the user reply speech.

According to the tenth aspect or any implementation of the tenth aspect, that the playing device executes a corresponding instruction based on semantics of the user reply speech includes: The playing device determines, based on the user reply speech, that the user needs help, and sends alarm information to a remote device; the playing device determines, based on the user reply speech, that the user does not need help, and stops receiving a speech; or the playing device executes a first instruction based on the user reply speech.

According to the tenth aspect or any implementation of the tenth aspect, the playing device sends the alarm information to the remote device if the playing device does not receive a user reply within the preset duration after the playing device sends the query information.

According to the tenth aspect or any implementation of the tenth aspect, the hub device sends the first message to the playing device if the hub device learns, after the playing device sends the query information, that the user moves. The playing device receives the first message, and sends the query information.

According to the tenth aspect or any implementation of the tenth aspect, the playing device is a device that is closest to the user in the R second electronic devices.

According to an eleventh aspect, this application provides a hub device. Any two of the hub device, a first electronic device, and a second electronic device communicate in a wired communication or wireless communication manner. The first electronic device includes a first ultra-wide band module and a millimeter-wave radar module. The hub device obtains, based on position measurement for the second electronic device, measurement for a human body position, and conversion that are performed by the first electronic device, and communication between the hub device and the first electronic device, position information of the second electronic device and position information of a user in a whole-house coordinate system provided by the hub device. The hub device sends a first message to the second electronic device. The first message indicates to adjust an air supply direction of the second electronic device based on a position of the second electronic device and a position of the user, so that the air supply direction of the second electronic device avoids the user.

In this implementation, an air supply device automatically adjusts an air supply direction based on the position of the user, so that the air supply direction avoids the user. The user does not need to perform a manual operation, and the user does not need to carry any device neither. This improves convenience and comfort of using the air supply device by the user.

According to the eleventh aspect, the hub device further obtains an area of a region to which the second electronic device belongs, and sends a second message to the second electronic device. The second message includes first indication information. The first indication information indicates the area of the region to which the second electronic device belongs. The second message indicates the second electronic device to adjust an air supply amount based on the second message.

In this implementation, the air supply device automatically adjusts an air supply amount based on an area of a room or a region to which the air supply device belongs. A larger area indicates a larger air supply amount. This improves convenience of using the air supply device by the user.

According to the eleventh aspect or any implementation of the eleventh aspect, before sending the first message to the second electronic device, the hub device determines, based on the position information of the user and the position information of the second electronic device, that the user is located in the region to which the second electronic device belongs. In other words, if it is determined that the user enters the region to which the air supply device belongs, the air supply direction is automatically adjusted.

According to the eleventh aspect or any implementation of the eleventh aspect, before the hub device obtains the position information of the second electronic device and the position information of the user in the whole-house coordinate system provided by the hub device, the hub device learns that a position change of the user is greater than a first preset range.

In this implementation, if it is determined that the user moves, the air supply device is trigged to adjust the air supply direction, so that the air supply direction avoids the user.

According to a twelfth aspect, this application provides a hub device. Any two of the hub device, a first electronic device, and any one of R second electronic devices communicate in a wired communication or wireless communication manner. The first electronic device includes a first ultra-wide band module and a millimeter-wave radar module. The R second electronic devices include a mobile device and a playing device. R is a positive integer greater than or equal to 1. The hub device obtains, based on position measurement for the mobile device, measurement for a human body position, and conversion that are performed by the first electronic device, and communication between the hub device and the first electronic device, position information of a preset position and position information of a first user in a whole-house coordinate system provided by the hub device. The hub device learns that a distance between the first user and the preset position is less than or equal to a preset first distance, and sends a first message to the playing device. The first message indicates the playing device to send prompt information.

In this implementation, if it is determined that a specified user (for example, a child) approaches the preset position, the prompt information is automatically sent, to avoid danger.

According to the twelfth aspect, if the hub device learns that the first user passes through a line segment connecting two preset positions, the hub device sends the first message to the playing device.

In this implementation, the preset positions are two points. If the hub device determines that the first user passes through the line segment connecting the two preset points, the hub device determines that the first user approaches the preset position.

According to the twelfth aspect or any implementation of the twelfth aspect, the hub device learns that the first user enters a region including three or more preset positions, and sends the first message to the playing device.

In this implementation, the preset positions are three or more points. If the hub device determines that the first user enters the three-dimensional region enclosed by the three or more points, the hub device determines that the first user approaches the preset position.

According to a thirteenth aspect, this application provides a hub device. Any two of the hub device, a first electronic device, and any one of R second electronic devices communicate in a wired communication or wireless communication manner. The first electronic device includes a first ultra-wide band module and a millimeter-wave radar module. The R second electronic devices include a first device and a second device. R is a positive integer greater than or equal to 1. The hub device obtains, based on position measurement for the second electronic device, measurement for a human body position, and conversion that are performed by the first electronic device, and communication between the hub device and the first electronic device, position information of the first device and position information of a user in a whole-house coordinate system provided by the hub device. The hub device sends a first message to the second device if the hub device determines, based on the position information of the first device and the position information of the user, that a distance between at least one user and the first device is less than a preset first distance. The first message indicates the second device to send prompt information.

In this implementation, if it is determined that the user approaches a specified second electronic device, the prompt information is automatically sent.

According to the thirteenth aspect, before the hub device sends the first message to the second device, the hub device learns that duration within which the distance between the at least one user and the first device is less than the first distance is greater than or equal to first duration. In this implementation, if it is determined that the user approaches the specified second electronic device and stays for more than preset duration, the prompt information is automatically sent.

According to a fourteenth aspect, this application provides a hub device. Any two of the hub device, a first electronic device, and any one of R second electronic devices communicate in a wired communication or wireless communication manner. The first electronic device includes a first ultra-wide band module and a millimeter-wave radar module. The R second electronic devices include a mobile device and a playing device. R is a positive integer greater than or equal to 1. The hub device obtains, based on position measurement for the mobile device, measurement for a human body position, and conversion that are performed by the first electronic device, and communication between the hub device and the first electronic device, position information of the R second electronic devices, position information of at least one piece of furniture, and position information and an attitude of a user in a whole-house coordinate system provided by the hub device. The attitude includes standing, sitting, or lying. The hub device learns that duration within which the user keeps the sitting attitude is greater than or equal to preset duration, and sends a first message to the playing device. The first message indicates the playing device to send prompt information.

In this implementation, if unhealthy behavior (for example, sedentariness) of the user is detected, the prompt information is automatically sent.

According to the fourteenth aspect, before the hub device sends the first message to the playing device, the hub device learns that a distance between the user and one piece of furniture is less than a preset error range.

Furniture may include a bed, a sofa, a chair, and the like. If the user is beside the furniture, the attitude may be sitting.

According to a fifteenth aspect, this application provides a hub device. Any two of the hub device, a first electronic device, and any one of R second electronic devices communicate in a wired communication or wireless communication manner. The first electronic device includes a first ultra-wide band module and a millimeter-wave radar module. The R second electronic devices include a playing device. R is a positive integer greater than or equal to 1. The hub device obtains, based on measurement and conversion performed by the first electronic device on a human body position and communication between the hub device and the first electronic device, position information of a user in a whole-house coordinate system provided by the hub device. The hub device learns that an exception of the user occurs, and sends a first message to the playing device. The first message indicates the playing device to send query information.

In this implementation, if it is detected that the exception of the user occurs, the query information is automatically sent.

According to the fifteenth aspect, that the hub device learns that the exception of the user occurs includes: The hub device learns that the user falls; or the hub device learns that a heartbeat or a breath of a static user is not detected within first duration.

According to the fifteenth aspect or any implementation of the fifteenth aspect, the hub device sends the first message to the playing device if the hub device learns, after the playing device sends the query information, that the user moves. The playing device receives the first message, and sends the query information.

According to a sixteenth aspect, this application provides a human sensing-based automatic control method, applied to a hub device. Any two of the hub device, a first electronic device, and a second electronic device communicate in a wired communication or wireless communication manner. The first electronic device includes a first ultra-wide band module and a millimeter-wave radar module. The hub device obtains, based on position measurement for the second electronic device, measurement for a human body position, and conversion that are performed by the first electronic device, and communication between the hub device and the first electronic device, position information of the second electronic device and position information of a user in a whole-house coordinate system provided by the hub device. The hub device sends a first message to the second electronic device. The first message indicates to adjust an air supply direction of the second electronic device based on a position of the second electronic device and a position of the user, so that the air supply direction of the second electronic device avoids the user.

In this implementation, an air supply device automatically adjusts an air supply direction based on the position of the user, so that the air supply direction avoids the user. The user does not need to perform a manual operation, and the user does not need to carry any device neither. This improves convenience and comfort of using the air supply device by the user.

According to the sixteenth aspect, the hub device further obtains an area of a region to which the second electronic device belongs, and sends a second message to the second electronic device. The second message includes first indication information. The first indication information indicates the area of the region to which the second electronic device belongs. The second message indicates the second electronic device to adjust an air supply amount based on the second message.

In this implementation, the air supply device automatically adjusts an air supply amount based on an area of a room or a region to which the air supply device belongs. A larger area indicates a larger air supply amount. This improves convenience of using the air supply device by the user.

According to the sixteenth aspect or any implementation of the sixteenth aspect, before sending the first message to the second electronic device, the hub device determines, based on the position information of the user and the position information of the second electronic device, that the user is located in the region to which the second electronic device belongs. In other words, if it is determined that the user enters the region to which the air supply device belongs, the air supply direction is automatically adjusted.

According to the sixteenth aspect or any implementation of the sixteenth aspect, before the hub device obtains the position information of the second electronic device and the position information of the user in the whole-house coordinate system provided by the hub device, the hub device learns that a position change of the user is greater than a first preset range.

In this implementation, if it is determined that the user moves, the air supply device is trigged to adjust the air supply direction, so that the air supply direction avoids the user.

According to a seventeenth aspect, this application provides a human sensing-based automatic control method, applied to a hub device. Any two of the hub device, a first electronic device, and any one of R second electronic devices communicate in a wired communication or wireless communication manner. The first electronic device includes a first ultra-wide band module and a millimeter-wave radar module. The R second electronic devices include a mobile device and a playing device. R is a positive integer greater than or equal to 1. The hub device obtains, based on position measurement for the mobile device, measurement for a human body position, and conversion that are performed by the first electronic device, and communication between the hub device and the first electronic device, position information of a preset position and position information of a first user in a whole-house coordinate system provided by the hub device. The hub device learns that a distance between the first user and the preset position is less than or equal to a preset first distance, and sends a first message to the playing device. The first message indicates the playing device to send prompt information.

In this implementation, if it is determined that a specified user (for example, a child) approaches the preset position, the prompt information is automatically sent, to avoid danger.

According to the seventeenth aspect, if the hub device learns that the first user passes through a line segment connecting two preset positions, the hub device sends the first message to the playing device.

In this implementation, the preset positions are two points. If the hub device determines that the first user passes through the line segment connecting the two preset points, the hub device determines that the first user approaches the preset position.

According to the seventeenth aspect or any implementation of the seventeenth aspect, the hub device learns that the first user enters a region including three or more preset positions, and sends the first message to the playing device.

In this implementation, the preset positions are three or more points. If the hub device determines that the first user enters the three-dimensional region enclosed by the three or more points, the hub device determines that the first user approaches the preset position.

According to an eighteenth aspect, this application provides a human sensing-based automatic control method, applied to a hub device. Any two of the hub device, a first electronic device, and any one of R second electronic devices communicate in a wired communication or wireless communication manner. The first electronic device includes a first ultra-wide band module and a millimeter-wave radar module. The R second electronic devices include a first device and a second device. R is a positive integer greater than or equal to 1. The hub device obtains, based on position measurement for the second electronic device, measurement for a human body position, and conversion that are performed by the first electronic device, and communication between the hub device and the first electronic device, position information of the first device and position information of a user in a whole-house coordinate system provided by the hub device. The hub device sends a first message to the second device if the hub device determines, based on the position information of the first device and the position information of the user, that a distance between at least one user and the first device is less than a preset first distance. The first message indicates the second device to send prompt information.

In this implementation, if it is determined that the user approaches a specified second electronic device, the prompt information is automatically sent.

According to the eighteenth aspect, before the hub device sends the first message to the second device, the hub device learns that duration within which the distance between the at least one user and the first device is less than the first distance is greater than or equal to first duration. In this implementation, if it is determined that the user approaches the specified second electronic device and stays for more than preset duration, the prompt information is automatically sent.

According to a nineteenth aspect, this application provides a human sensing-based automatic control method, applied to a hub device. Any two of the hub device, a first electronic device, and any one of R second electronic devices communicate in a wired communication or wireless communication manner. The first electronic device includes a first ultra-wide band module and a millimeter-wave radar module. The R second electronic devices include a mobile device and a playing device. R is a positive integer greater than or equal to 1. The hub device obtains, based on position measurement for the mobile device, measurement for a human body position, and conversion that are performed by the first electronic device, and communication between the hub device and the first electronic device, position information of the R second electronic devices, position information of at least one piece of furniture, and position information and an attitude of a user in a whole-house coordinate system provided by the hub device. The attitude includes standing, sitting, or lying. The hub device learns that duration within which the user keeps the sitting attitude is greater than or equal to preset duration, and sends a first message to the playing device. The first message indicates the playing device to send prompt information.

In this implementation, if unhealthy behavior (for example, sedentariness) of the user is detected, the prompt information is automatically sent.

According to the nineteenth aspect, before the hub device sends the first message to the playing device, the hub device learns that a distance between the user and one piece of furniture is less than a preset error range.

Furniture may include a bed, a sofa, a chair, and the like. If the user is beside the furniture, the attitude may be sitting.

According to a twentieth aspect, this application provides a human sensing-based automatic control method, applied to a hub device. Any two of the hub device, a first electronic device, and any one of R second electronic devices communicate in a wired communication or wireless communication manner. The first electronic device includes a first ultra-wide band module and a millimeter-wave radar module. The R second electronic devices include a playing device. R is a positive integer greater than or equal to 1. The hub device obtains, based on measurement and conversion performed by the first electronic device on a human body position and communication between the hub device and the first electronic device, position information of a user in a whole-house coordinate system provided by the hub device. The hub device learns that an exception of the user occurs, and sends a first message to the playing device. The first message indicates the playing device to send query information.

In this implementation, if it is detected that the exception of the user occurs, the query information is automatically sent.

According to the twentieth aspect, that the hub device learns that an exception of the user occurs includes: The hub device learns that the user falls; or the hub device learns that a heartbeat or a breath of a static user is not detected within first duration.

According to the twentieth aspect or any implementation of the twentieth aspect, the hub device sends the first message to the playing device if the hub device learns, after the playing device sends the query information, that the user moves. The playing device receives the first message, and sends the query information.

According to a twenty-first aspect, this application provides a computer-readable storage medium. The computer-readable storage medium includes a computer program. When the computer program is run on an electronic device, the electronic device is enabled to perform the method according to the sixteenth aspect or any implementation of the sixteenth aspect, perform the method according to the seventeenth aspect or any implementation of the seventeenth aspect, perform the method according to the eighteenth aspect or any implementation of the eighteenth aspect, perform the method according to the nineteenth aspect or any implementation of the nineteenth aspect, or perform the method according to the twentieth aspect or any implementation of the twentieth aspect.

According to a twenty-second aspect, this application provides a computer program product. When the computer program product runs on an electronic device, the electronic device is enabled to perform the method according to the sixteenth aspect or any implementation of the sixteenth aspect, perform the method according to the seventeenth aspect or any implementation of the seventeenth aspect, perform the method according to the eighteenth aspect or any implementation of the eighteenth aspect, perform the method according to the nineteenth aspect or any implementation of the nineteenth aspect, or perform the method according to the twentieth aspect or any implementation of the twentieth aspect.

The twenty-first aspect and any implementation of the twenty-first aspect respectively correspond to the sixteenth aspect and any implementation of the sixteenth aspect, the seventeenth aspect and any implementation of the seventeenth aspect, the eighteenth aspect and any implementation of the eighteenth aspect, the nineteenth aspect and any implementation of the nineteenth aspect, or the twentieth aspect and any implementation of the twentieth. For technical effects corresponding to the twenty-first aspect and the any implementation of the twenty-first aspect, refer to the technical effects corresponding to the foregoing corresponding implementations. Details are not described herein again.

The twenty-second aspect and any implementation of the twenty-second aspect respectively correspond to the sixteenth aspect and any implementation of the sixteenth aspect, the seventeenth aspect and any implementation of the seventeenth aspect, the eighteenth aspect and any implementation of the eighteenth aspect, the nineteenth aspect and any implementation of the nineteenth aspect, or the twentieth aspect and any implementation of the twentieth. For technical effects corresponding to the twenty-second aspect and the any implementation of the twenty-second aspect, refer to the technical effects corresponding to the foregoing corresponding implementations. Details are not described herein again.

BRIEF DESCRIPTION OF DRAWINGS

FIG. 9 is a schematic diagram of several manners of establishing a first coordinate system when a UWB module of a first electronic device includes three antennas according to an embodiment of this application;

FIG. 10 is a schematic diagram of a manner of establishing a second coordinate system according to an embodiment of this application;

a yaw $$\psi_e^b,$$

and a roll $$\theta_e^b$$

Figure 16:
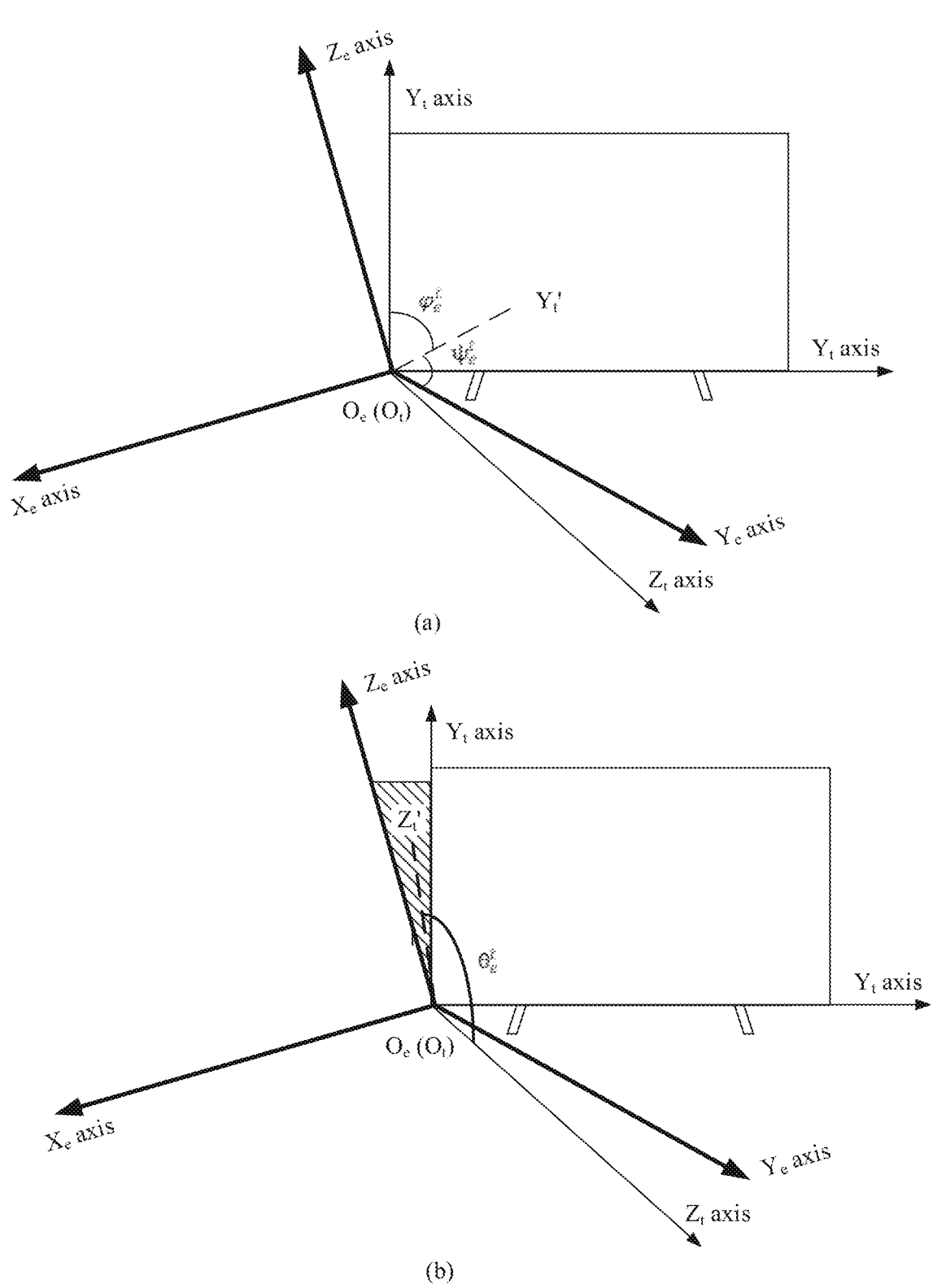
Figure 17:
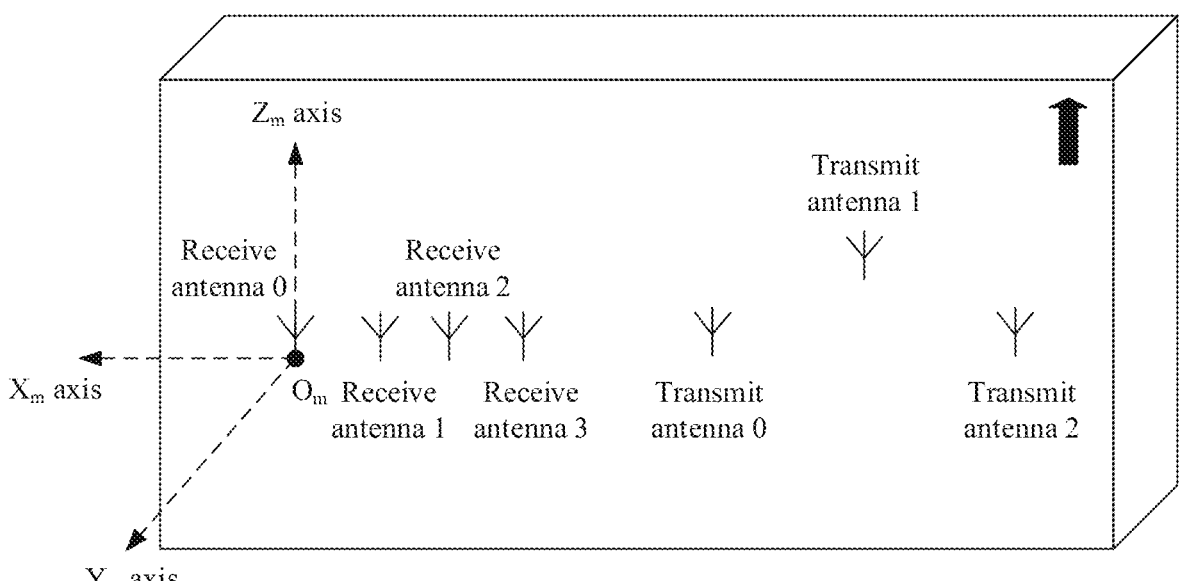
Figure 18:
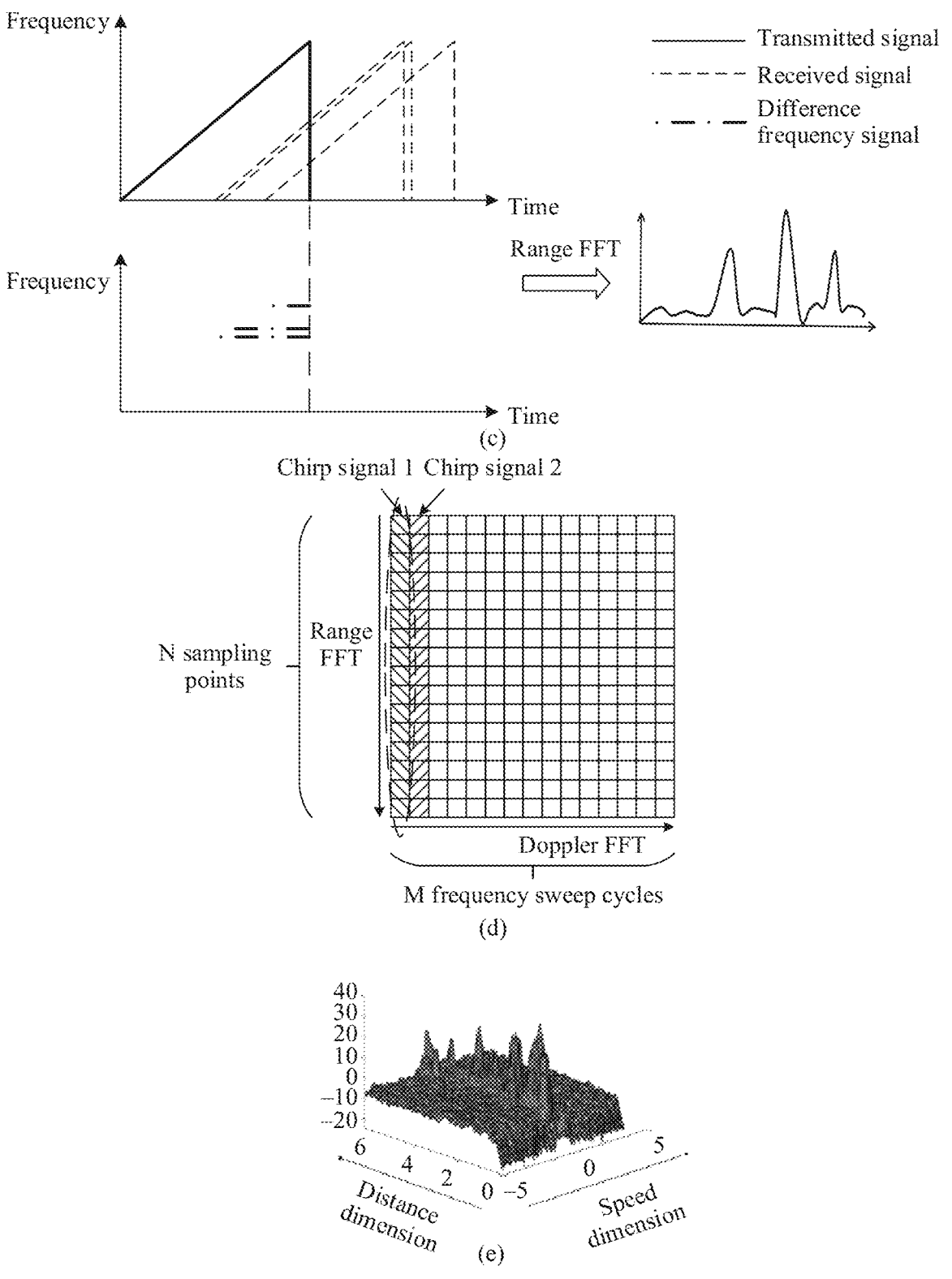
Figure 19A:
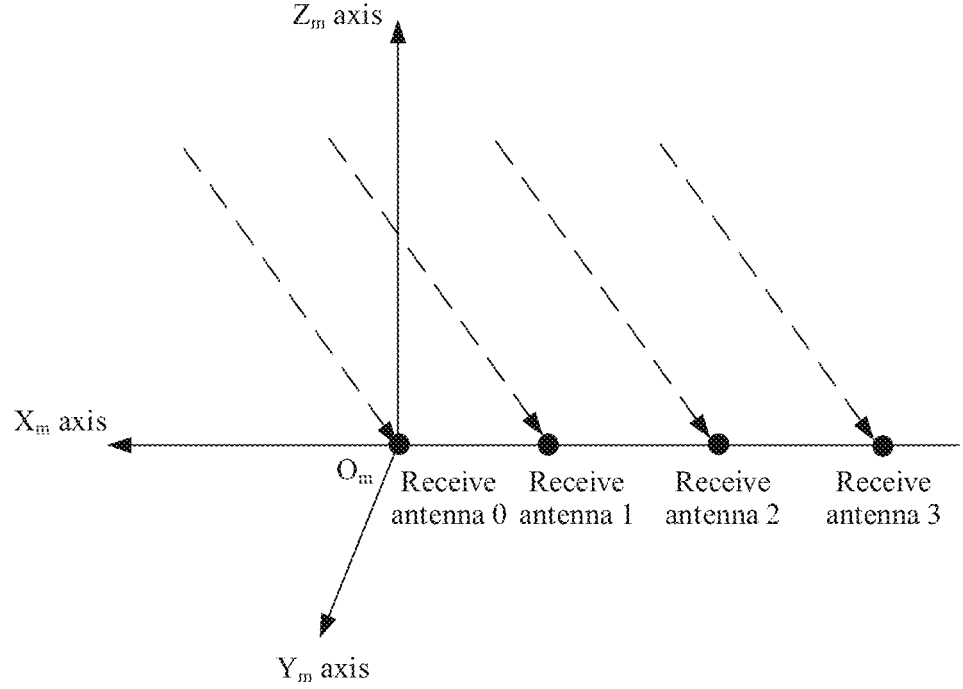
Figures 1, 2, 19B:
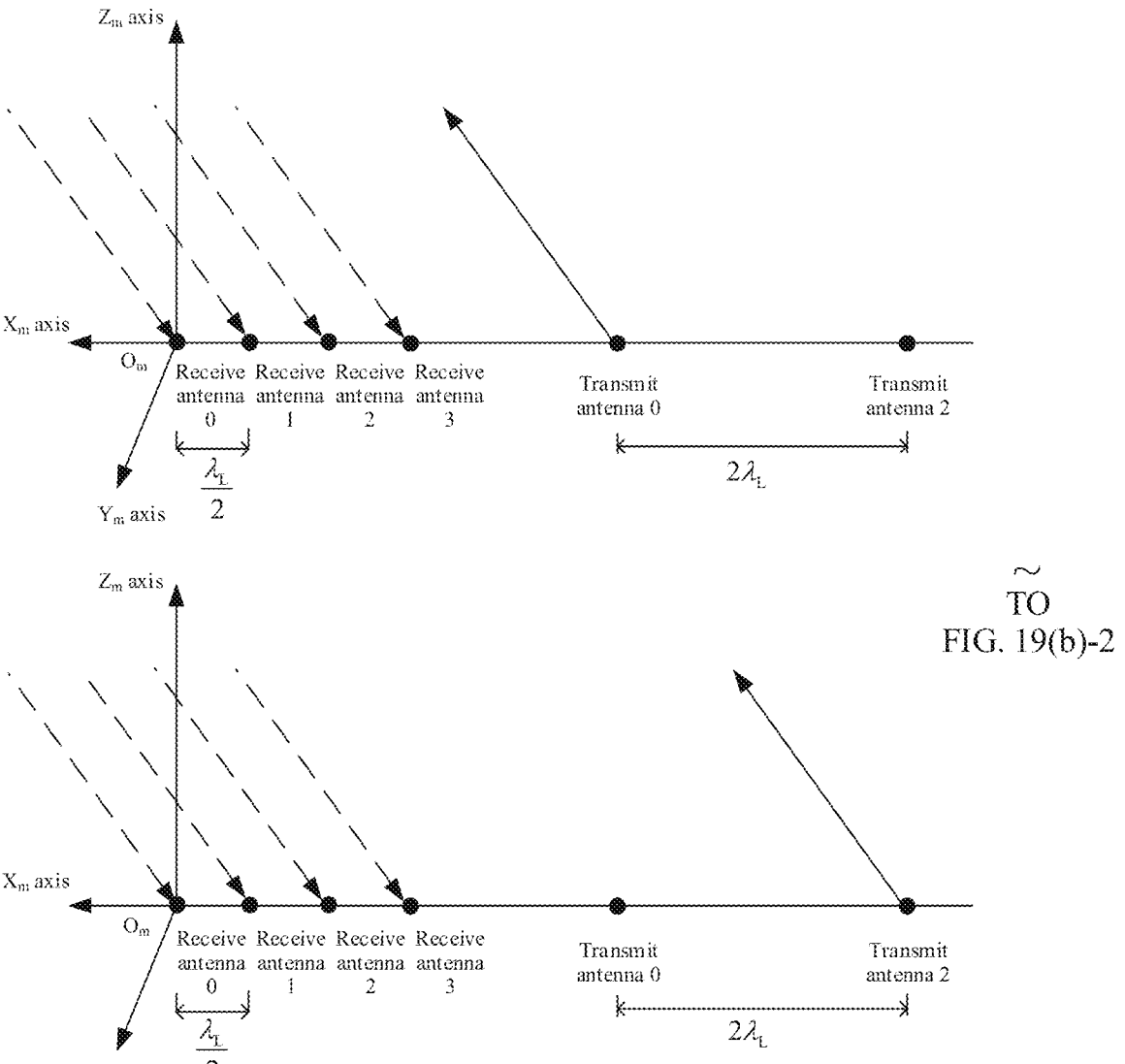
Figures 2, 19B:
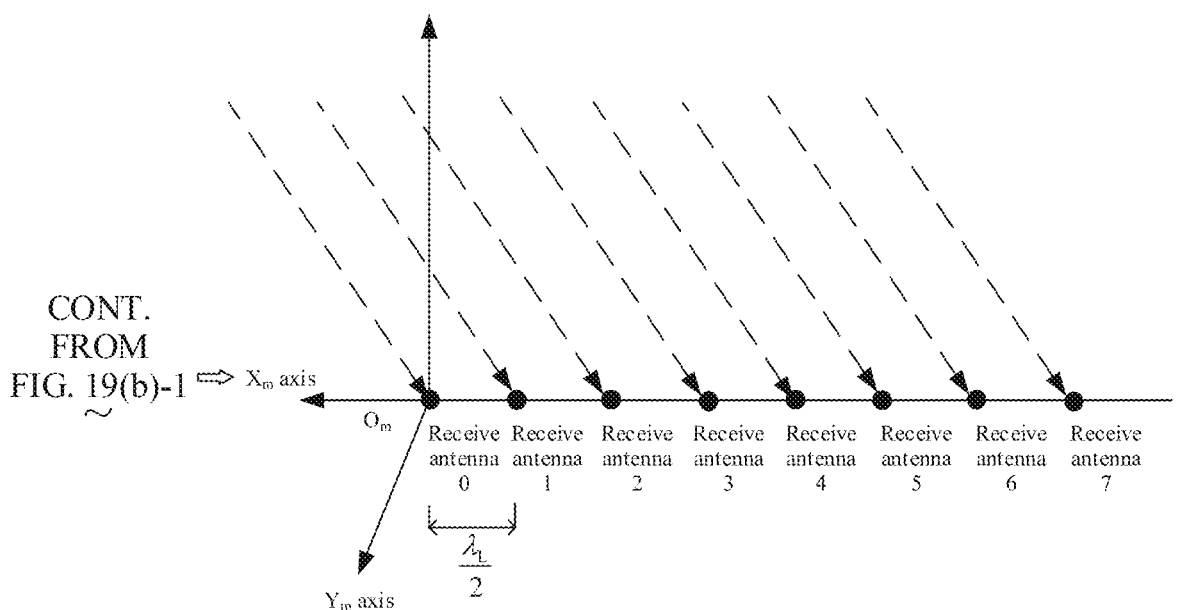
Figures 1, 2, 19C:
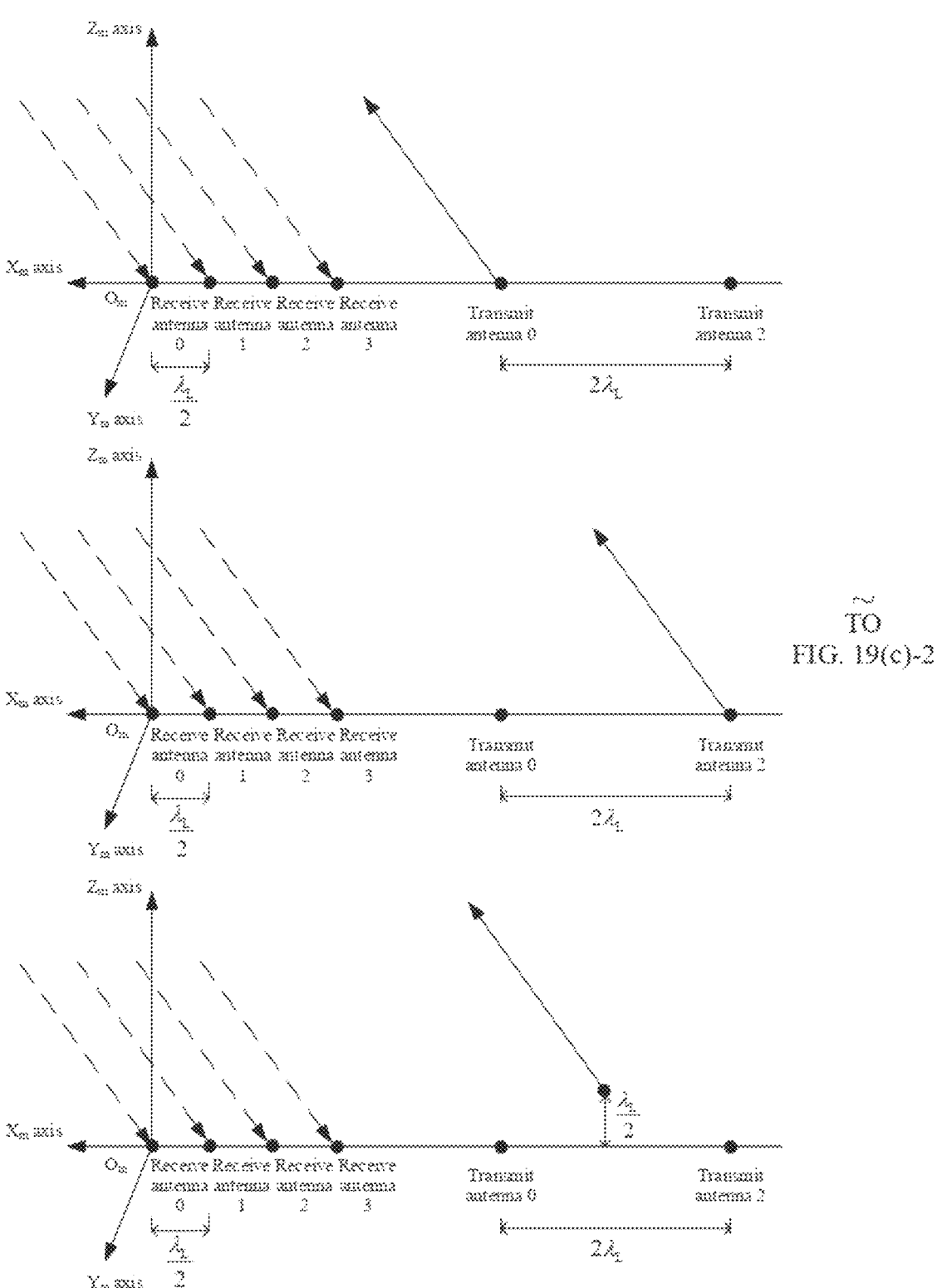
Figures 2, 19C:
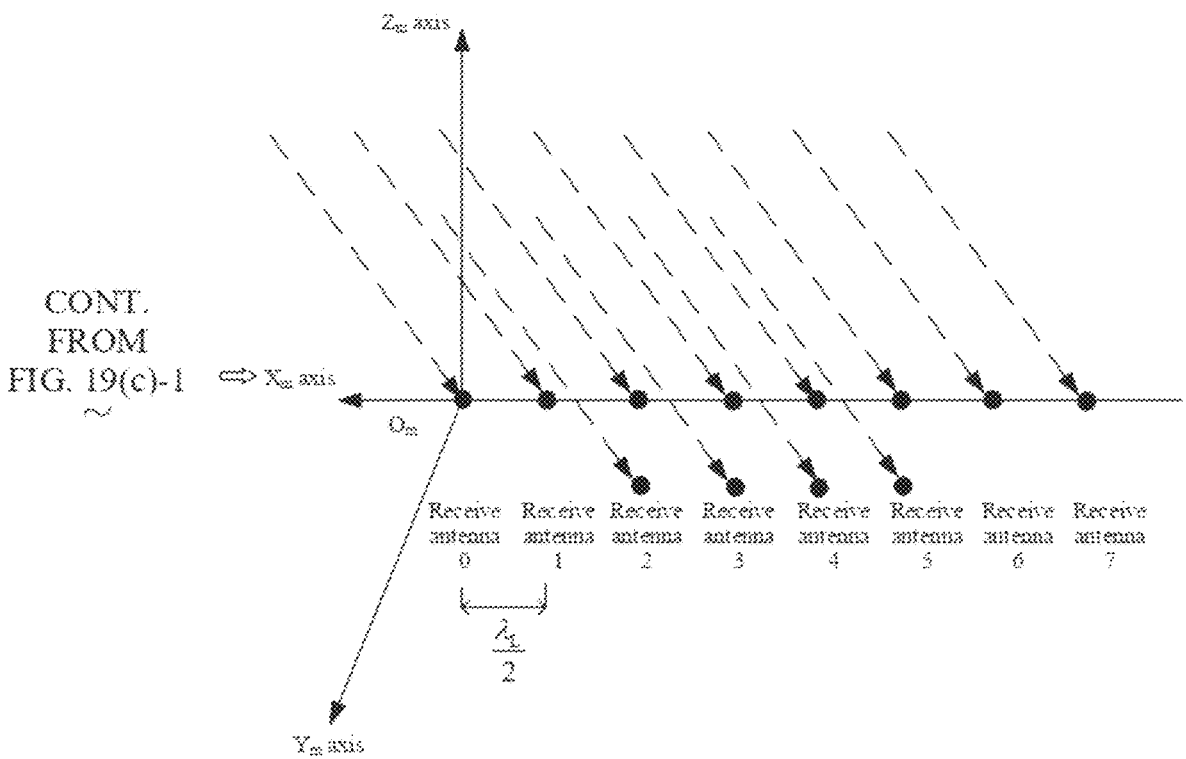
Figure 20:
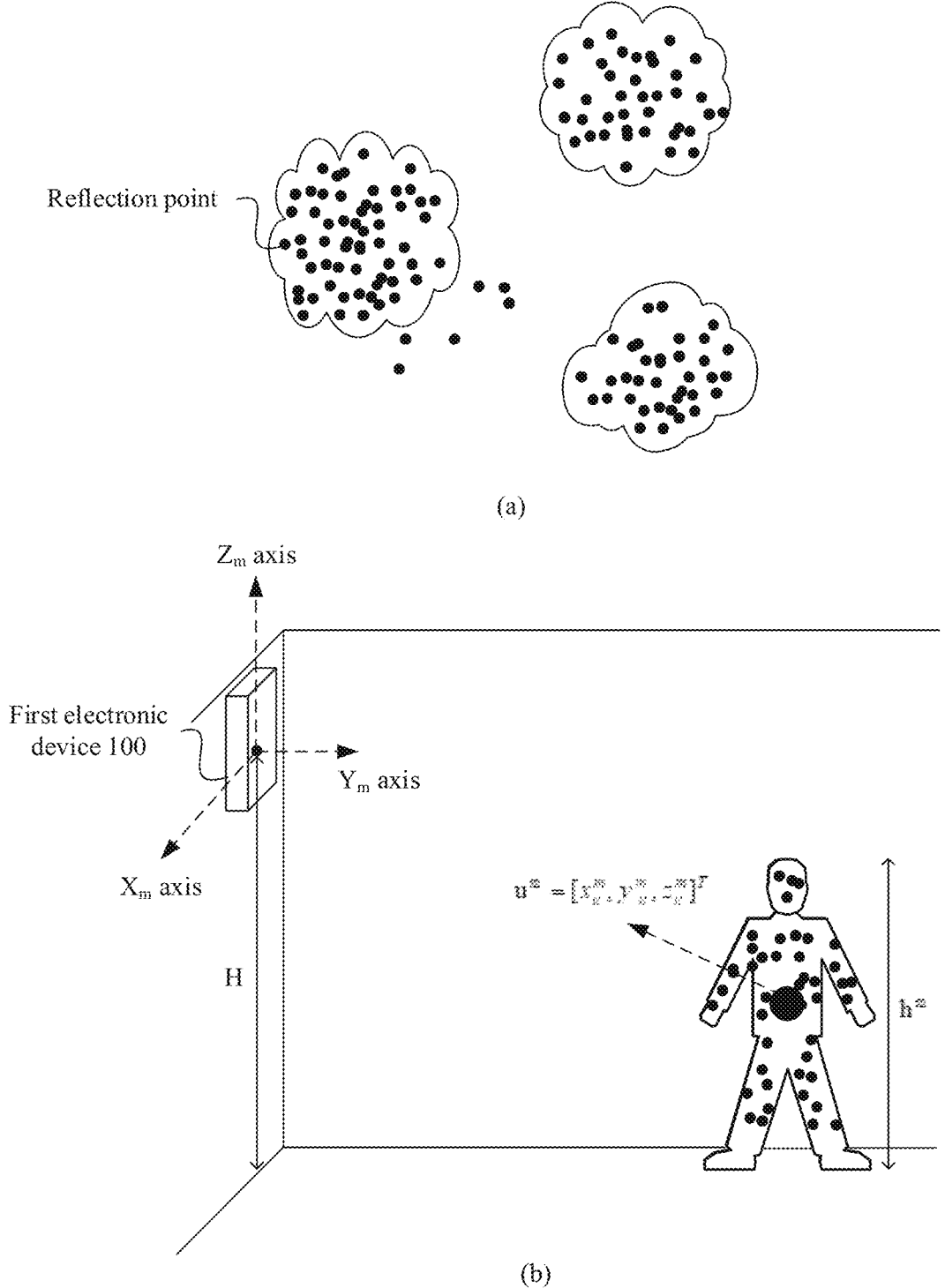
Figure 23:
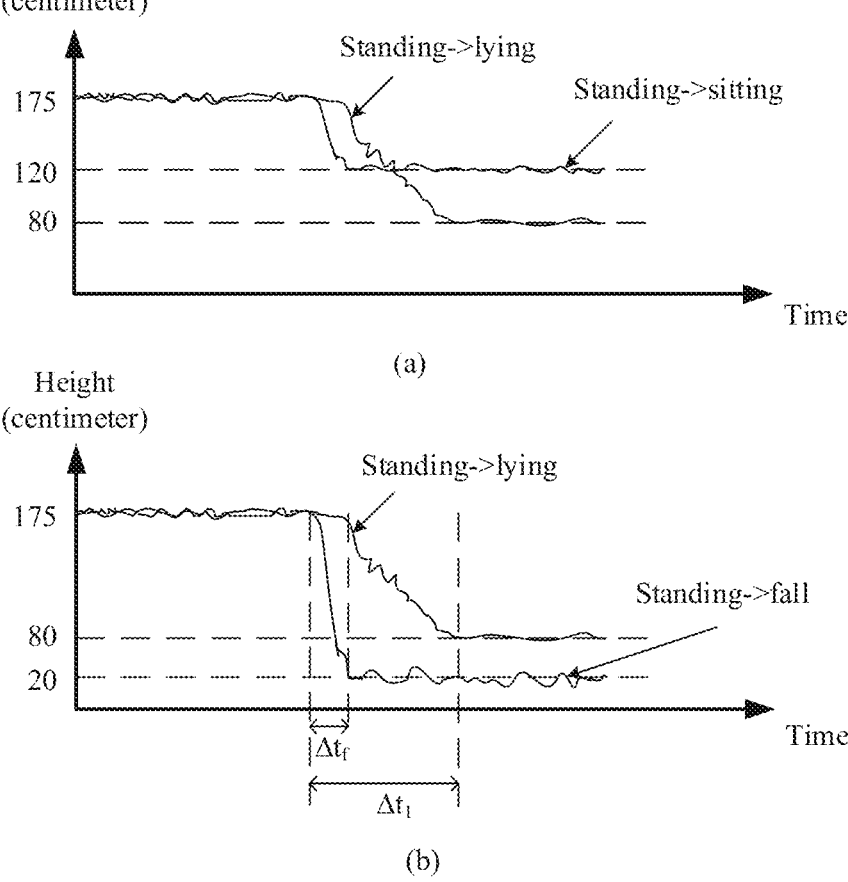
Figure 24:
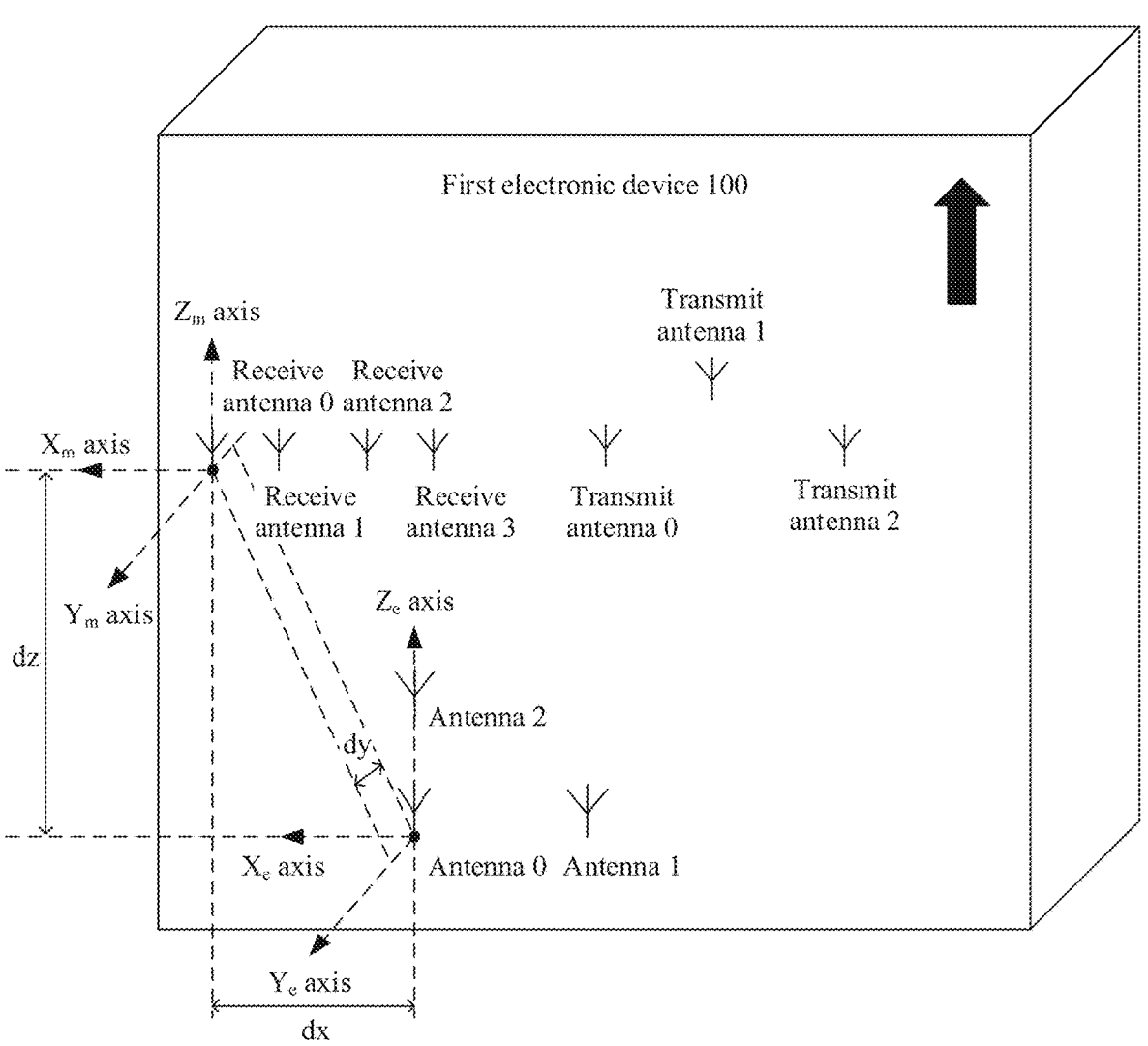
Figure 25:
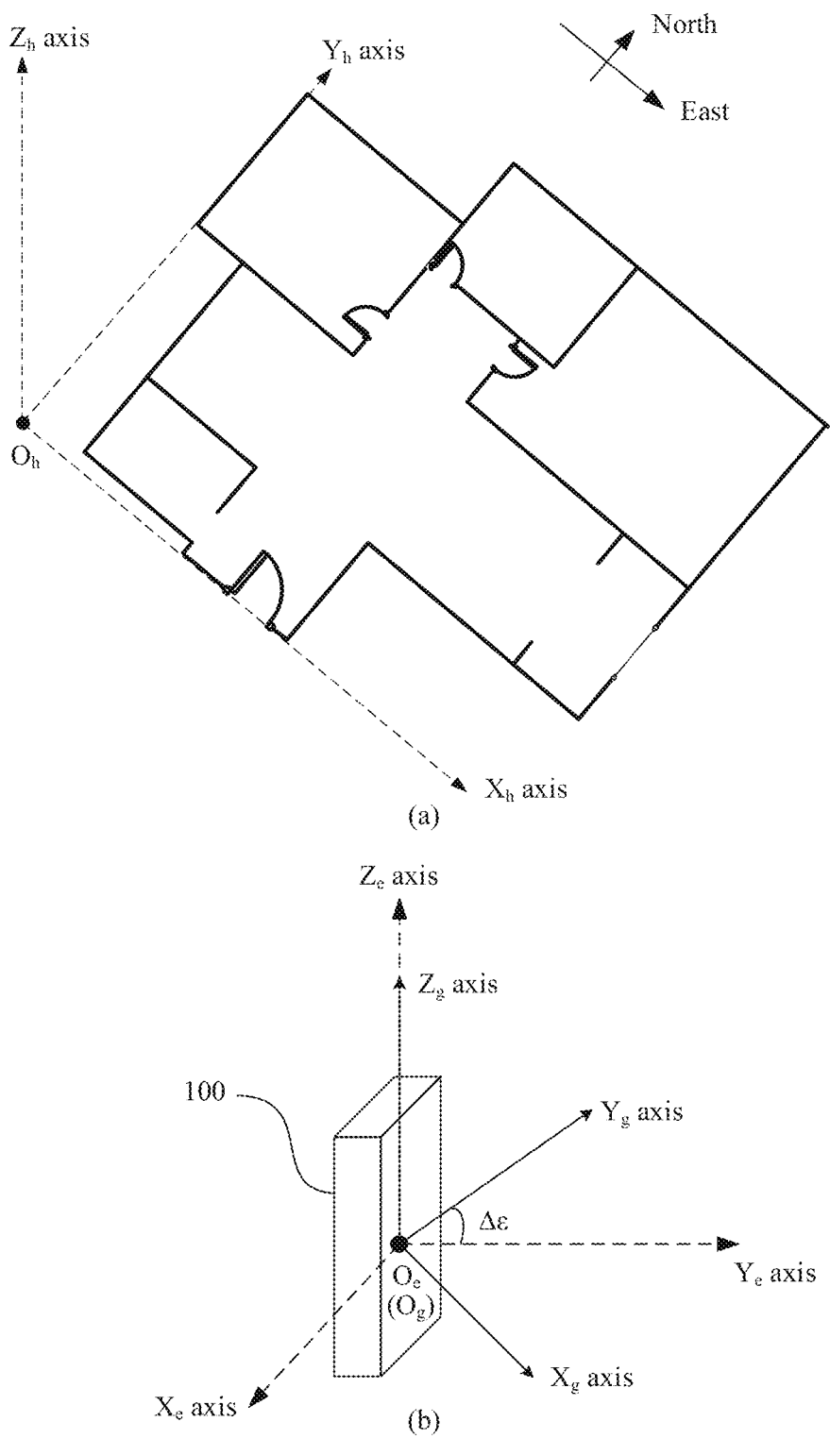
Figure 27A:
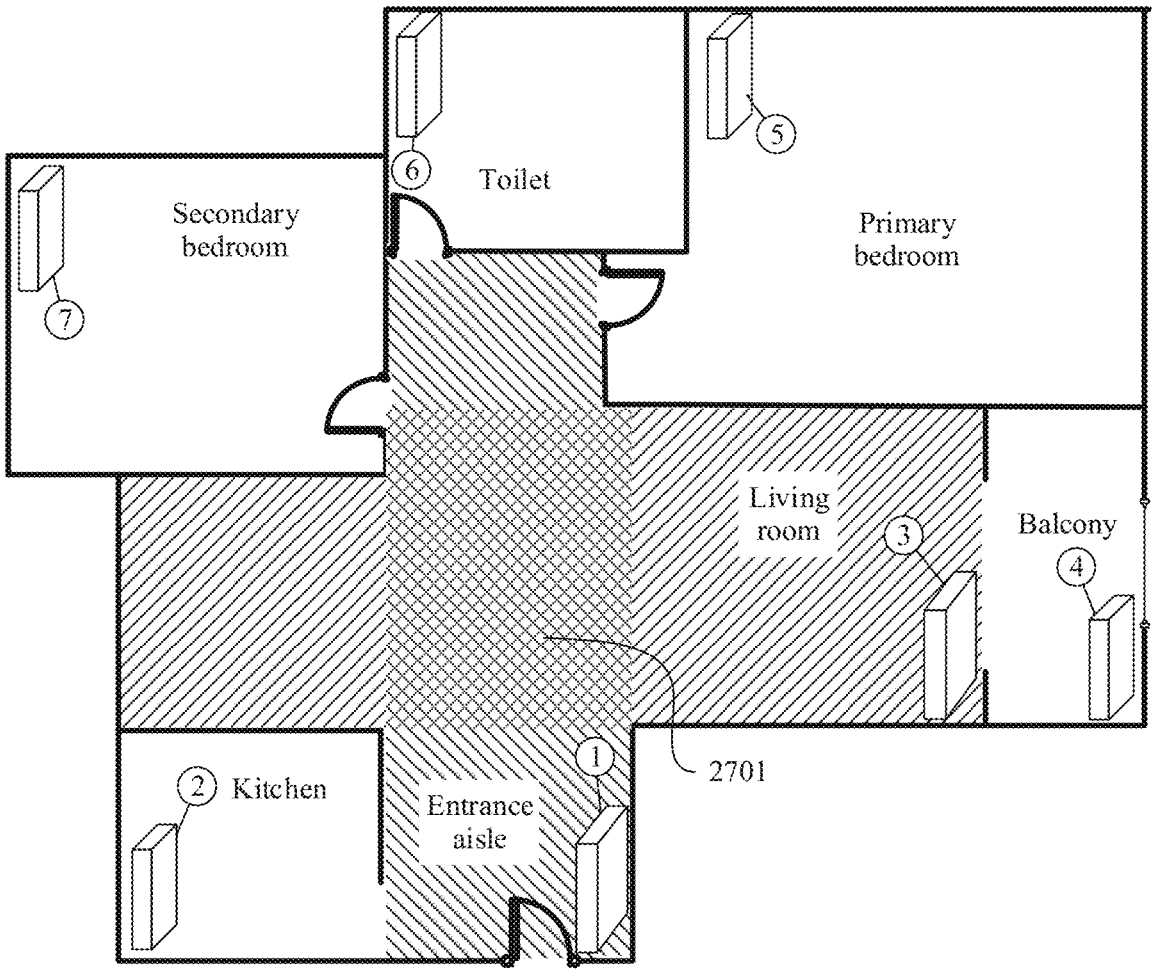
Figure 27B:
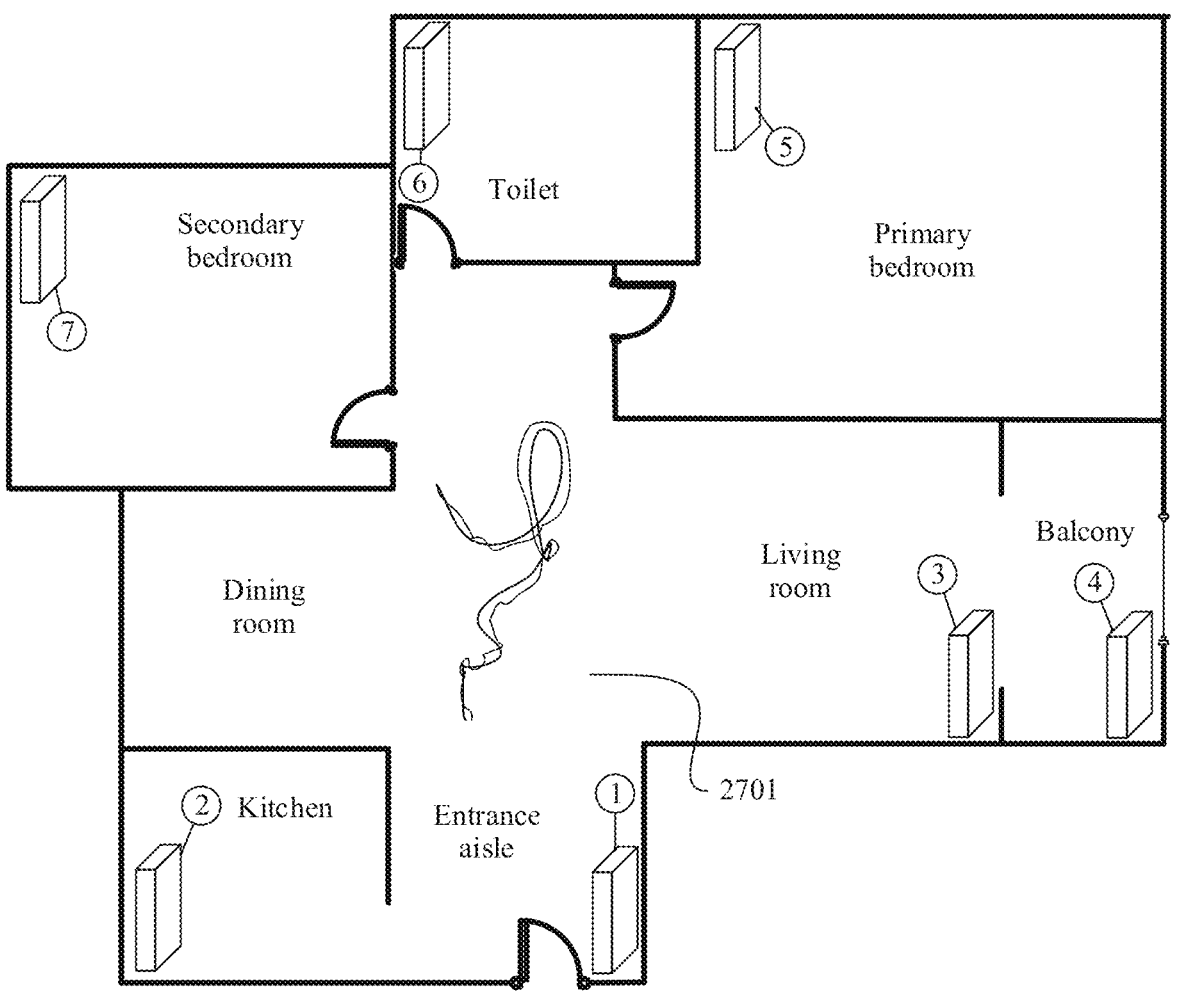
Figure 30:
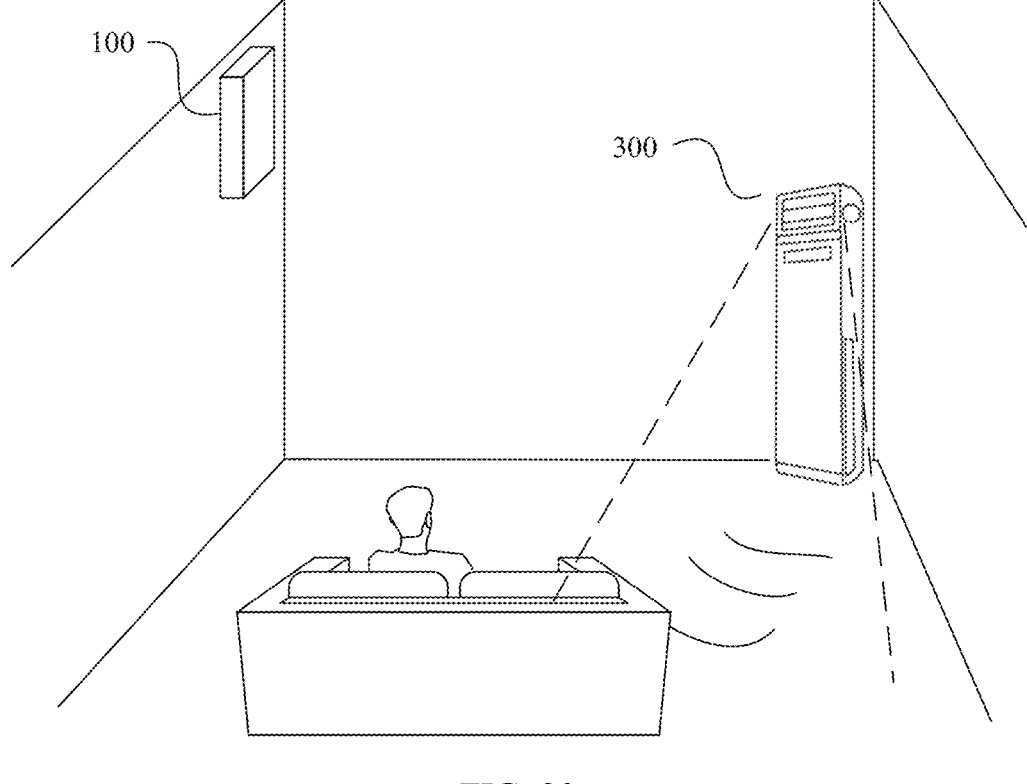
Figure 31:
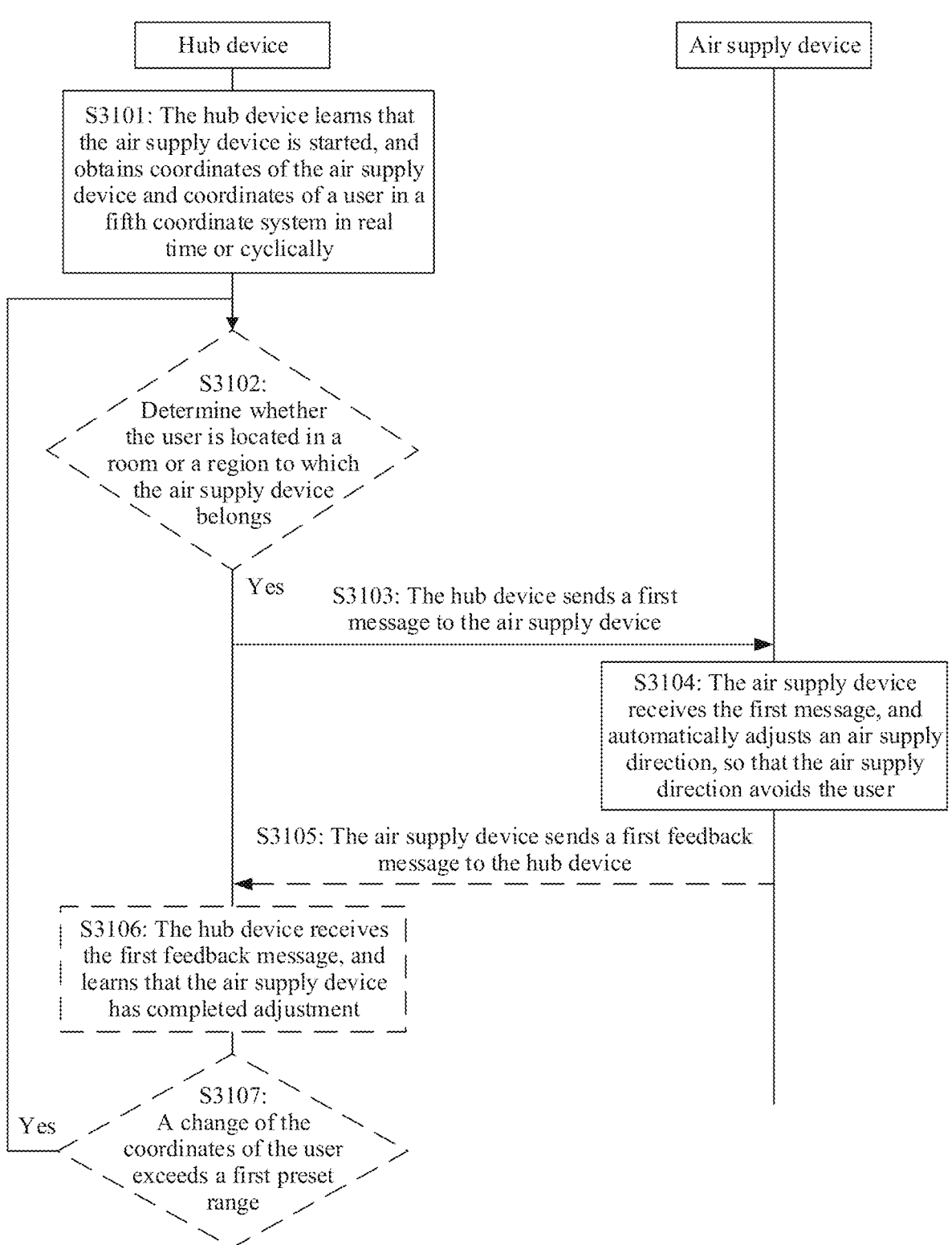
Figure 32:
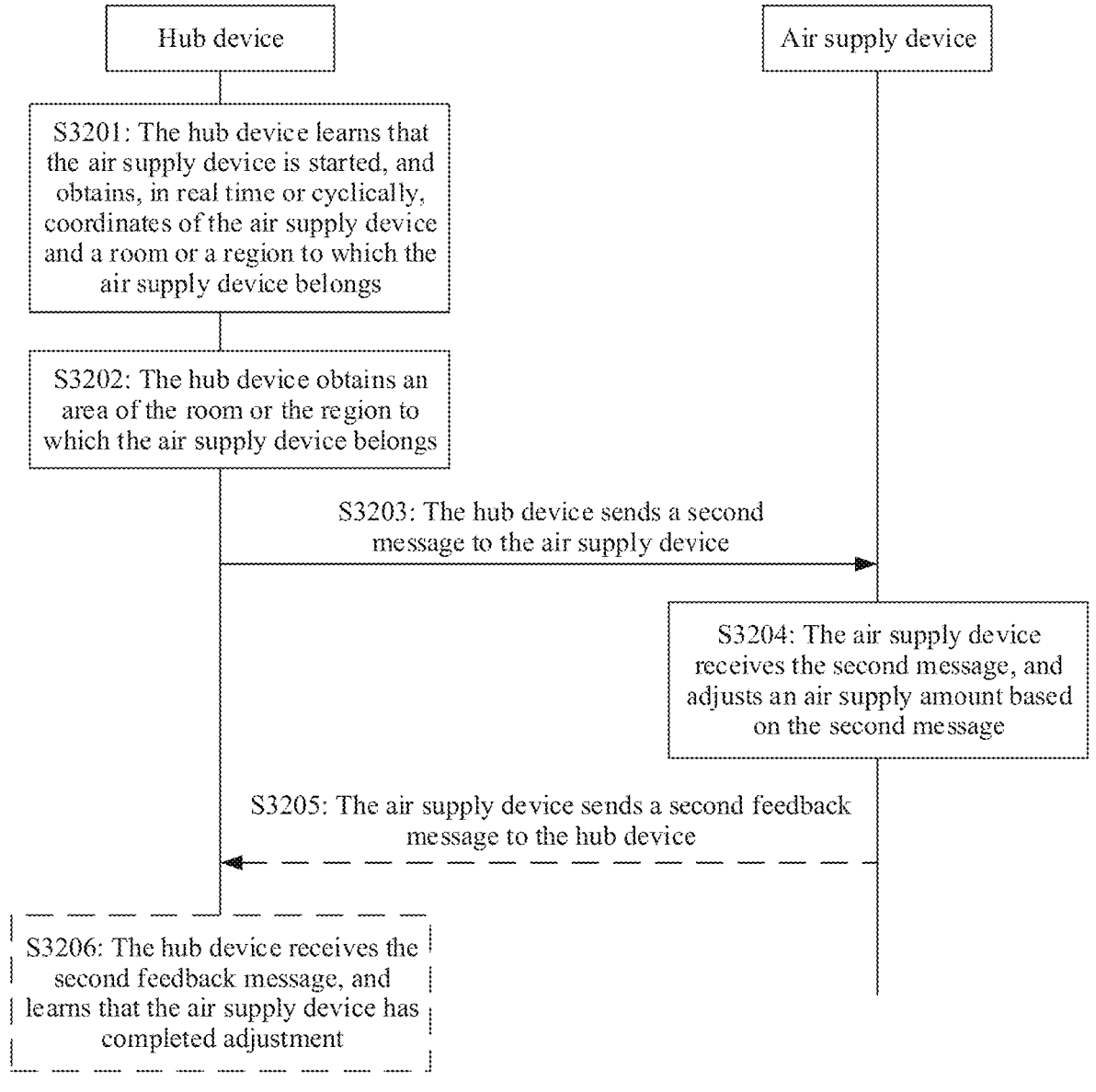
Figure 33:
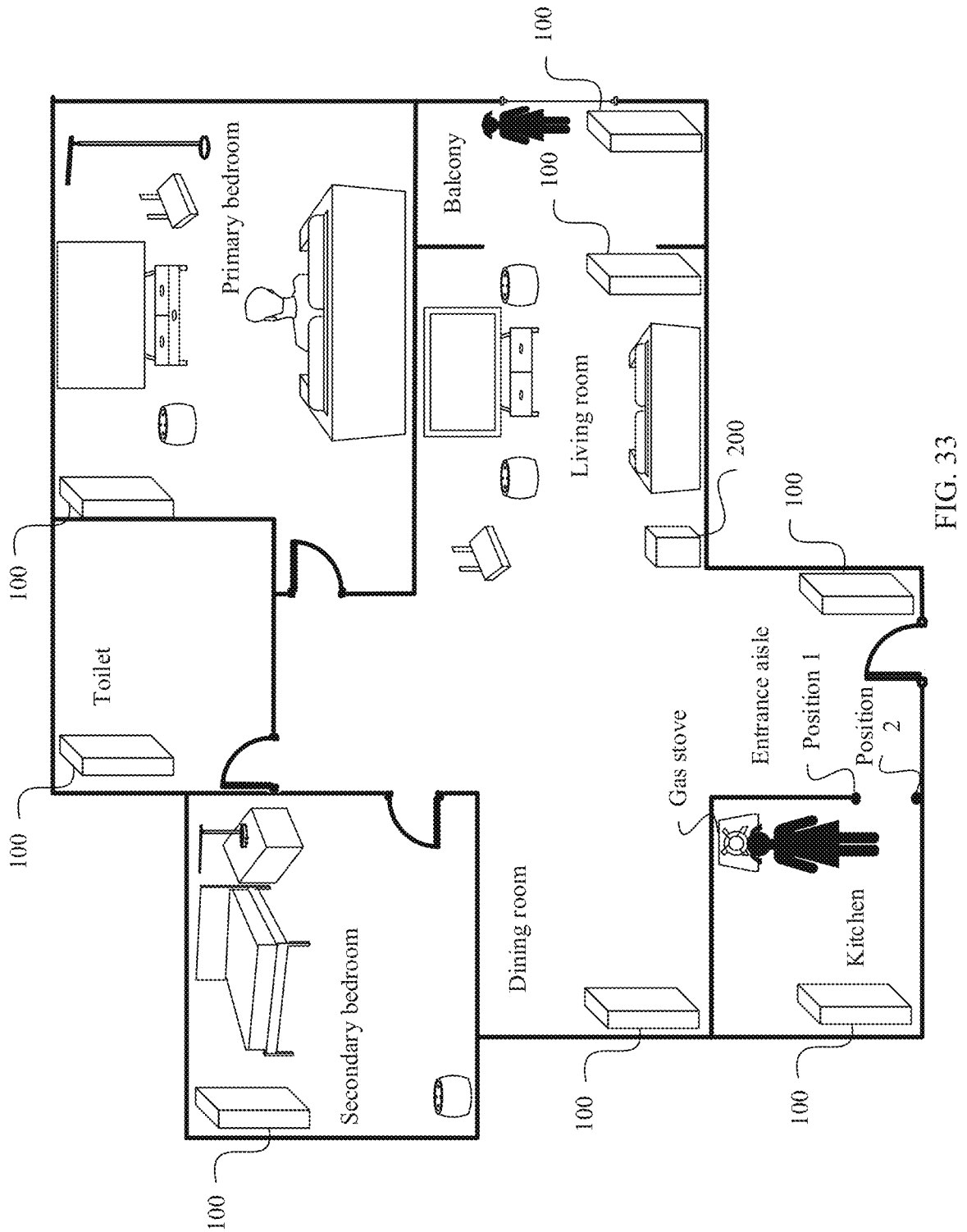
Figure 34:
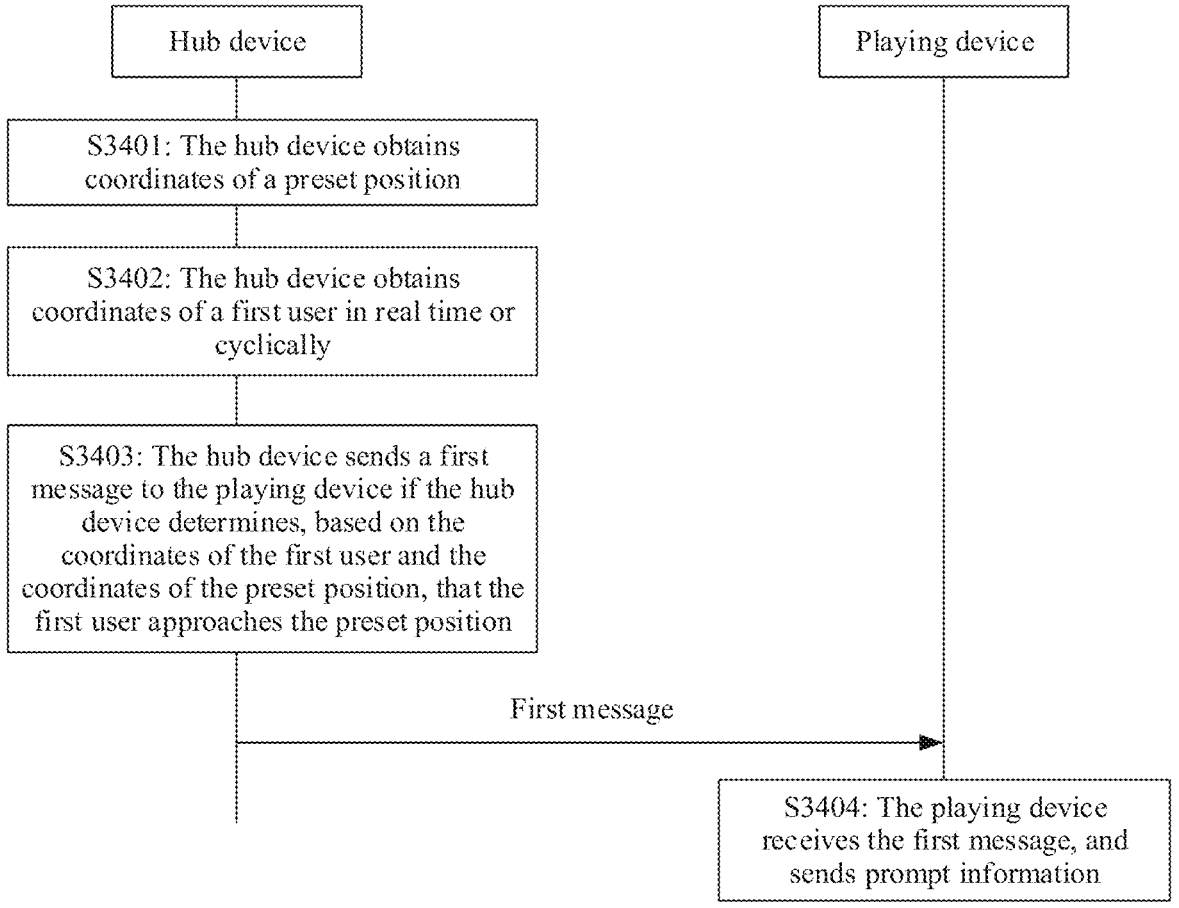
Figure 35:
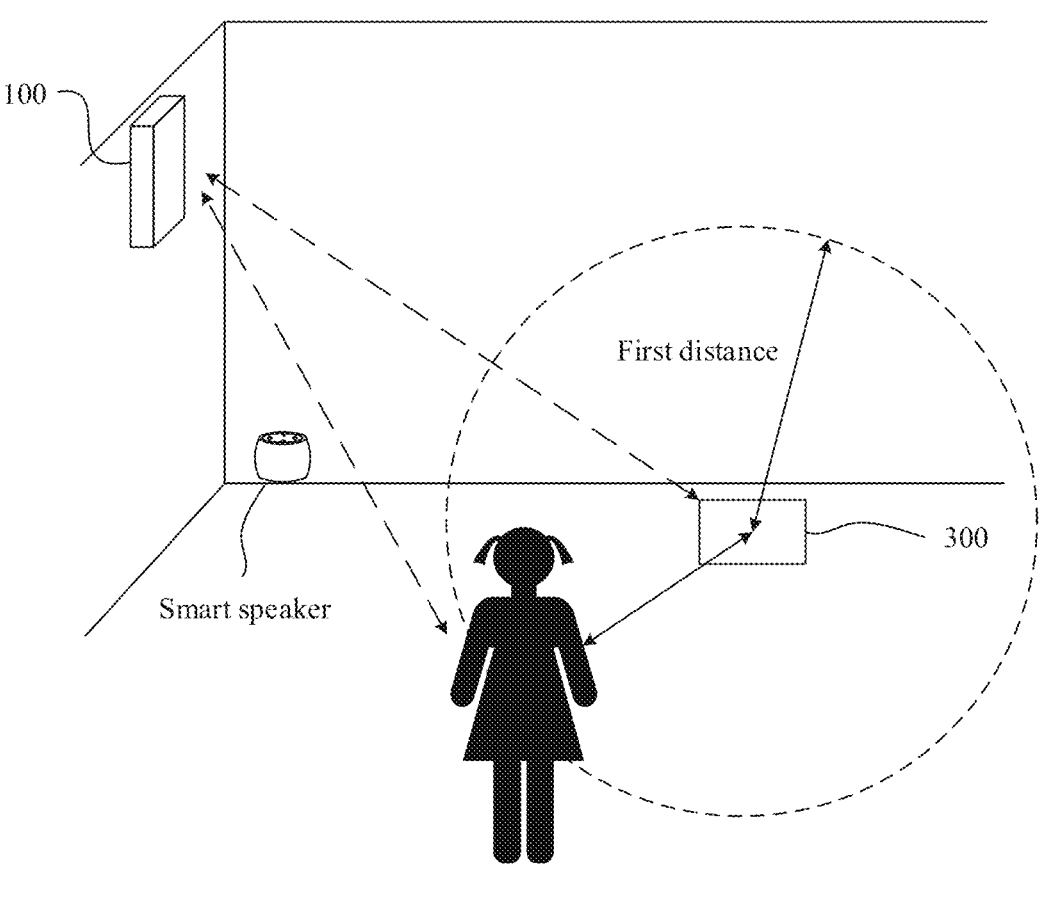
Figure 36:
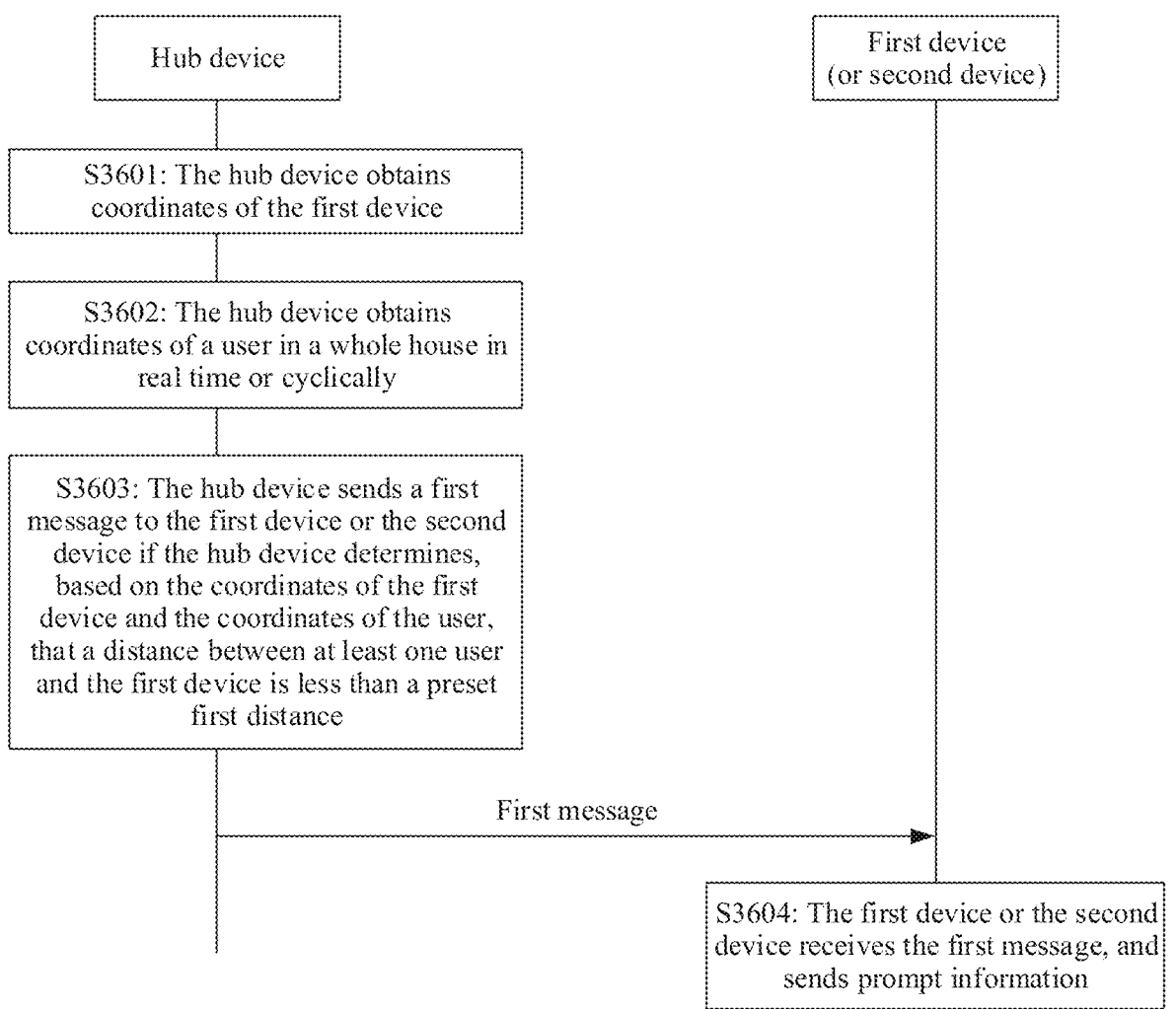
Figure 37:
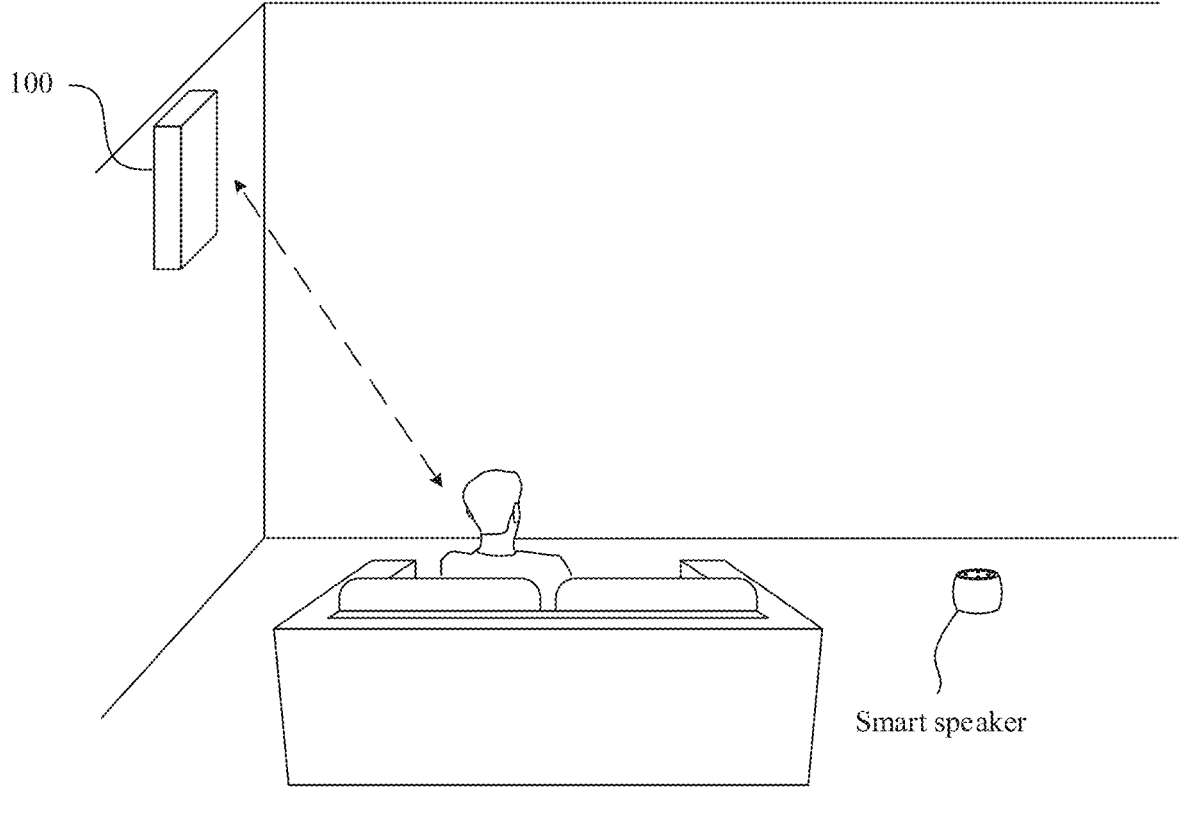
Figure 38:
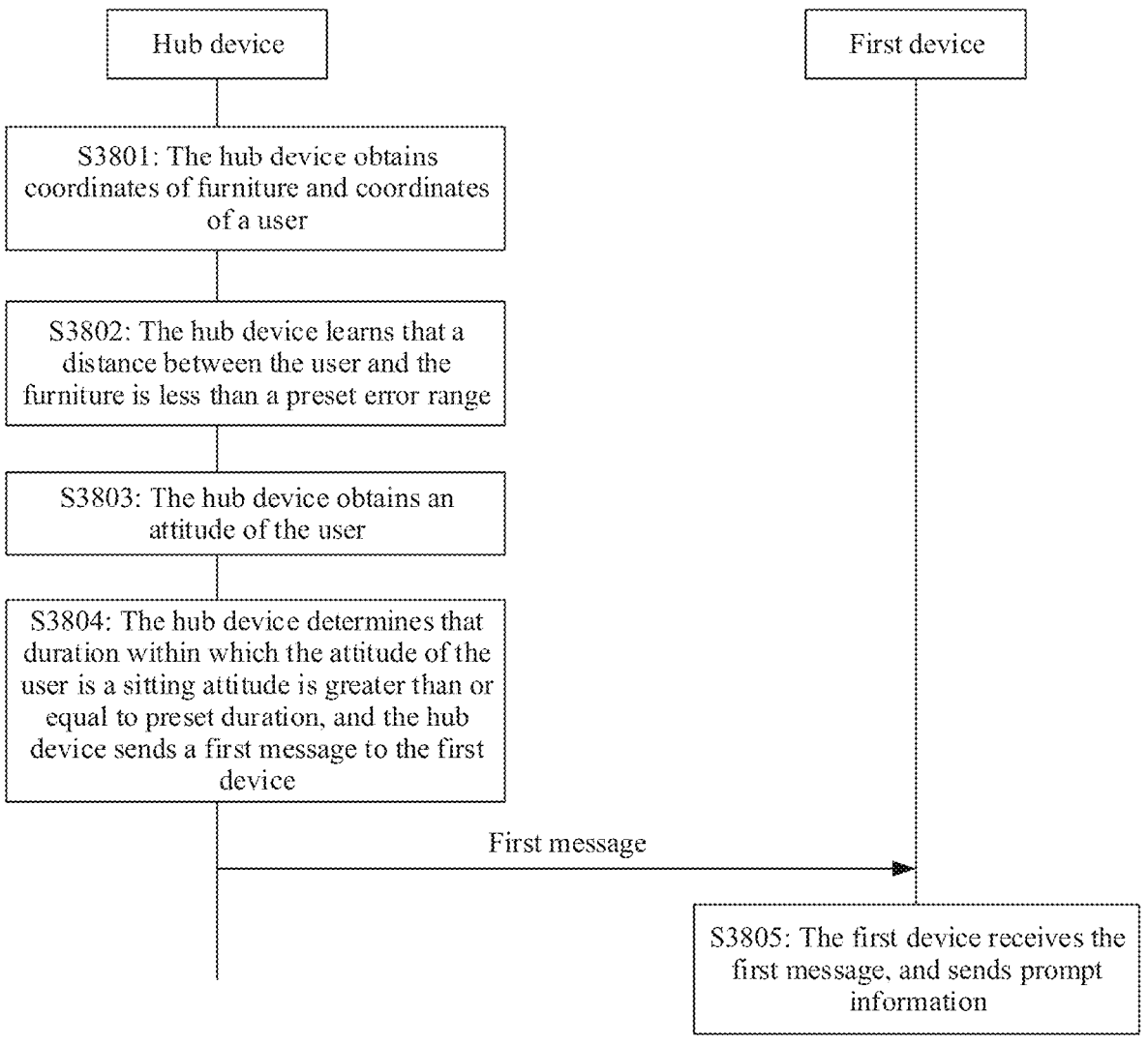
Figure 39:
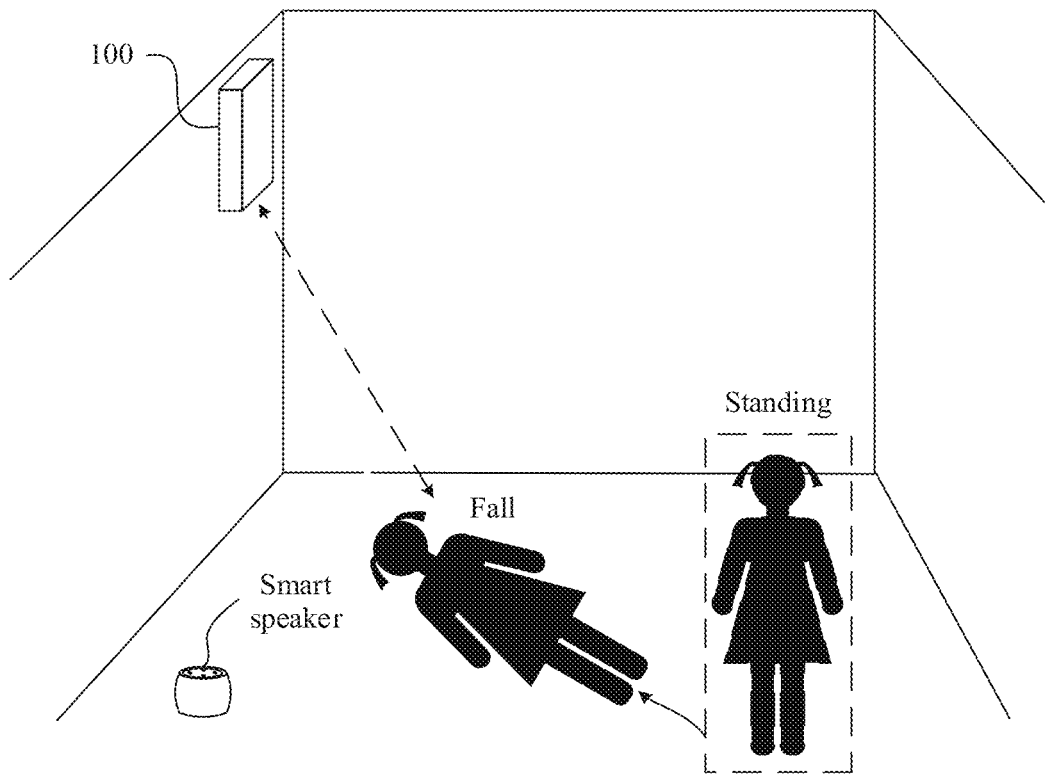
Figure 40:
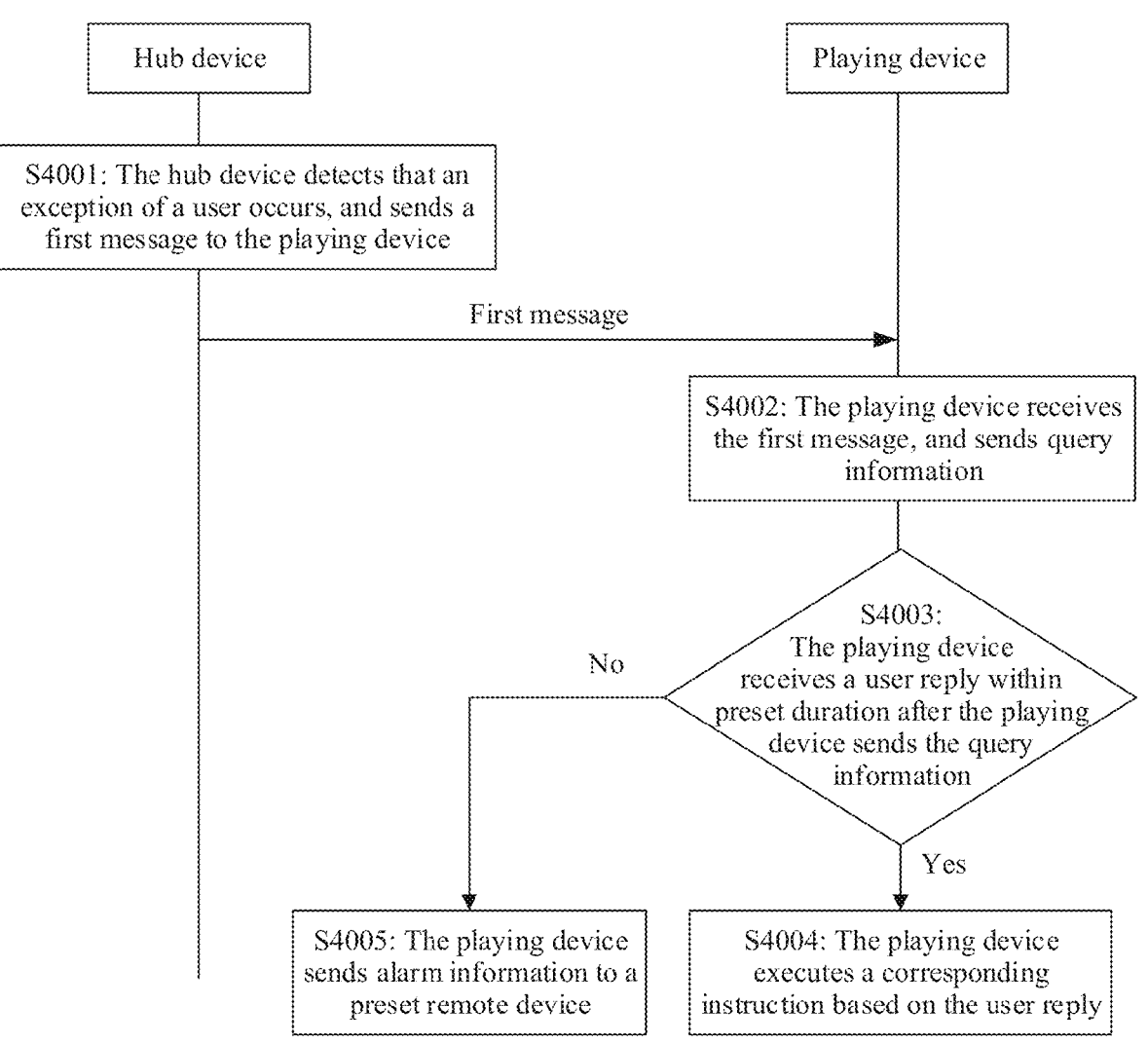
Figure 41:
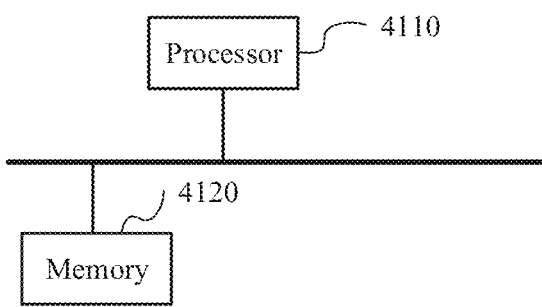
Figure 42:
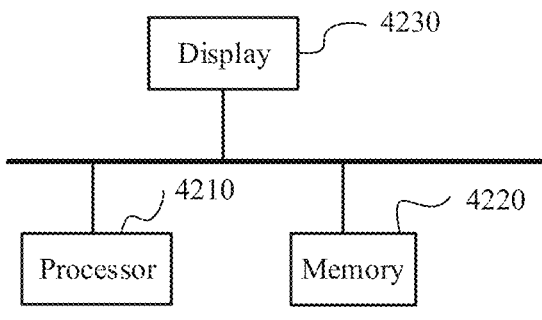

of a second coordinate system relative to a first coordinate system according to an embodiment of this application;

FIG. 16 is a schematic diagram of a pitch $$\varphi_e^t,$$

a yaw $$\psi_e^t,$$

and a roll $$\theta_e^t$$

of a third coordinate system relative to a first coordinate system according to an embodiment of this application;

FIG. 17 is a schematic diagram of a manner of establishing a fourth coordinate system according to an embodiment of this application;

FIG. 18 is a schematic diagram of a principle of determining a distance and a radial speed of a reflection point by a millimeter-wave radar according to an embodiment of this application;

FIG. 19(*a*) to FIG. 19(*c*)-2 are a schematic diagram of a principle of determining a signal coming direction of a reflected signal from a reflection point by a millimeter-wave radar according to an embodiment of this application;

FIG. 20 is a schematic diagram of a principle of determining coordinates of a user by a first electronic device in a fourth coordinate system according to an embodiment of this application;

FIG. 21 is a schematic diagram of a method for determining coordinates of a user by a first electronic device in a fourth coordinate system according to an embodiment of this application;

FIG. 22 is a schematic diagram of a method for obtaining a breath frequency and a heartbeat frequency of a user by a millimeter-wave radar according to an embodiment of this application;

FIG. 23 is a schematic diagram of a method for determining a human body attitude of a user by a millimeter-wave radar according to an embodiment of this application;

FIG. 24 is a schematic diagram of conversion between a first coordinate system and a fourth coordinate system on a first electronic device according to an embodiment of this application;

FIG. 25 is a schematic diagram of an example of establishing a whole-house coordinate system (a fifth coordinate system), a first coordinate system, and a sixth coordinate system (a geographical coordinate system) according to an embodiment of this application;

FIG. 26 is a schematic diagram of a flowchart and a principle of a human sensing-based automatic control method in a whole-house scenario according to an embodiment of this application;

FIG. 27(*a*) to FIG. 27(*c*) are a schematic flowchart of correcting an installation error of a first electronic device according to an embodiment of this application;

FIG. 28 is a schematic diagram of a principle of an ICP algorithm according to an embodiment of this application;

FIG. 29 is a schematic diagram of region division and a user interface according to an embodiment of this application;

FIG. 30 is a schematic diagram of a scenario of a human sensing-based automatic air supply method for an air supply device in a whole-house scenario according to an embodiment of this application;

FIG. 31 is a flowchart of a human sensing-based automatic air supply method for an air supply device in a whole-house scenario according to an embodiment of this application;

FIG. 32 is another flowchart of a human sensing-based automatic air supply method for an air supply device in a whole-house scenario according to an embodiment of this application;

FIG. 33 is a schematic diagram of a scenario of a human sensing-based automatic prompt method for a specified user approaching a preset position in a whole-house scenario according to an embodiment of this application;

FIG. 34 is a flowchart of a human sensing-based automatic prompt method for a specified user approaching a preset position in a whole-house scenario according to an embodiment of this application;

FIG. 35 is a schematic diagram of a scenario and a principle of a human sensing-based automatic prompt method for a user approaching a specified electronic device in a whole-house scenario according to an embodiment of this application;

FIG. 36 is a flowchart of a human sensing-based automatic prompt method for a user approaching a specified electronic device in a whole-house scenario according to an embodiment of this application;

FIG. 37 is a schematic diagram of a scenario of a human sensing-based sedentariness automatic prompt method for a user in a whole-house scenario according to an embodiment of this application;

FIG. 38 is a flowchart of a human sensing-based sedentariness automatic prompt method for a user in a whole-house scenario according to an embodiment of this application;

FIG. 39 is a schematic diagram of a scenario of a human sensing-based exception automatic alarm method for a user in a whole-house scenario according to an embodiment of this application;

FIG. 40 is a flowchart of a human sensing-based exception automatic alarm method for a user in a whole-house scenario according to an embodiment of this application;

FIG. 41 is a schematic diagram of a structure of a first electronic device according to an embodiment of this application; and FIG. 42 is a schematic diagram of a structure of a second electronic device according to an embodiment of this application.

DESCRIPTION OF EMBODIMENTS

The following describes the technical solutions in embodiments of this application with reference to the accompanying drawings in embodiments of this application. In the descriptions of embodiments of this application, terms used in the following embodiments are merely intended for a purpose of describing specific embodiments, but are not intended to limit this application. The terms "a", "the", "the foregoing", "this", and "the one" of singular forms used in this specification and the appended claims of this application are also intended to include forms such as "one or more", unless otherwise specified in the context clearly. It should be further understood that, in the following embodiments of this application, "at least one" and "one or more" mean one or more than two (including two). The term "and/or" is for describing an association relationship between associated objects and indicates that three relationships may exist. For example, A and/or B may indicate the following cases: Only A exists, both A and B exist, and only B exists, where A and B each may be singular or plural. The character "/" generally indicates an "or" relationship between associated objects.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in other embodiments" that appear in different places in this specification do not necessarily mean referring to a same embodiment. Instead, the statements mean "one or more but not all of embodiments", unless otherwise specifically emphasized in another manner. The terms "include", "comprise", "have", and variants of the terms all mean "include but are not limited to", unless otherwise specifically emphasized in other ways. The term "connection" includes a direct connection and an indirect connection, unless otherwise stated. "First" and "second" are merely intended for a purpose of description, and shall not be understood as an indication or implication of relative importance or implicit indication of a quantity of indicated technical features.

In embodiments of this application, the word "example", "for example", or the like is for representing giving an example, an illustration, or a description. Any embodiment or design scheme described as an "example" or "for example" in embodiments of this application should not be explained as being more preferred or having more advantages than another embodiment or design scheme. Exactly, use of the term "example", "for example", or the like is intended to present a related concept in a specific manner.

1. DESCRIPTION OF OVERALL SCENARIO

Figure 1:
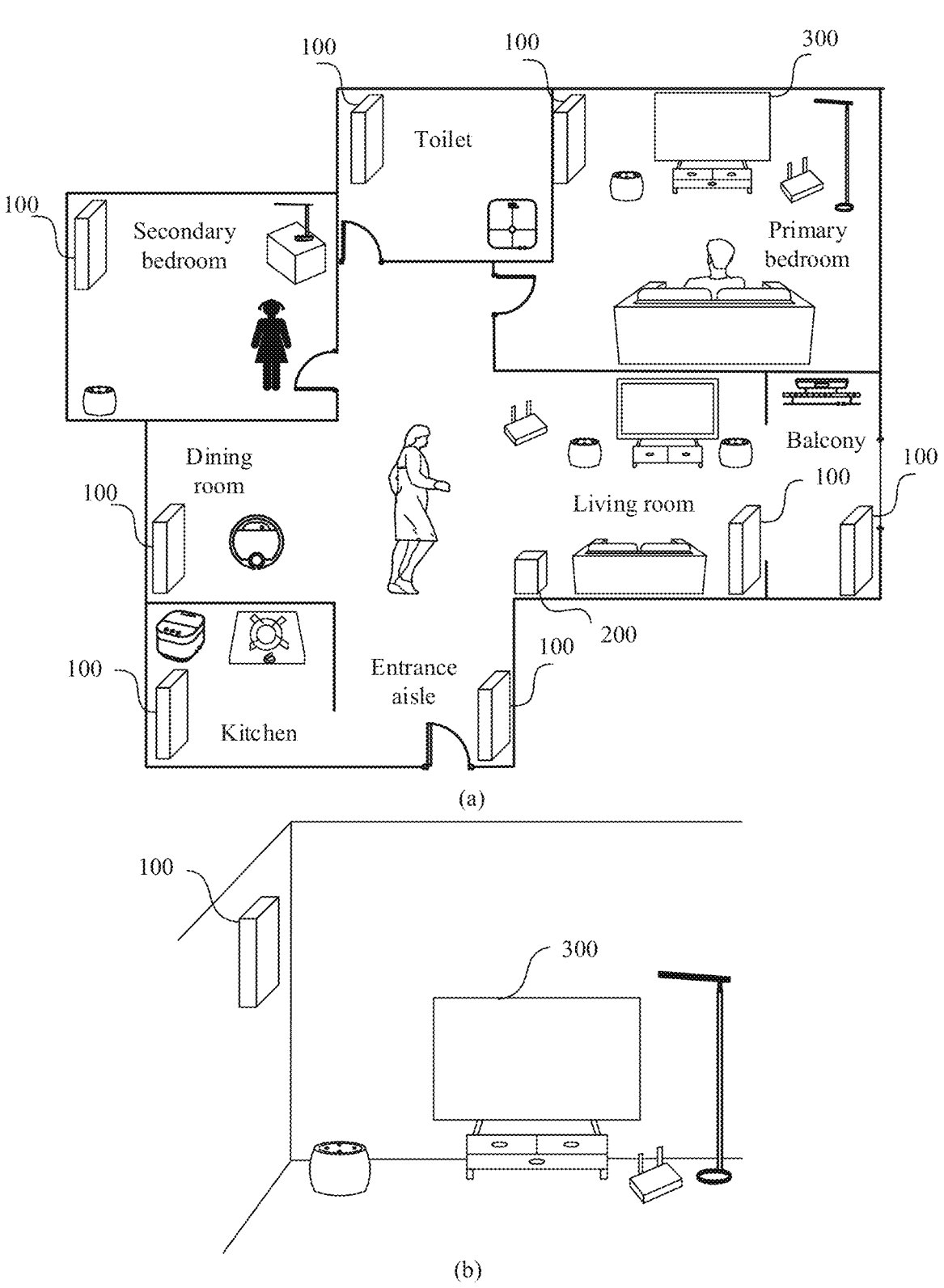
FIG. 1 is a schematic diagram of a scenario of a human sensing-based automatic control method according to an embodiment of this application.

For example, FIG. 1 is a schematic diagram of a scenario of a human sensing-based automatic control method according to an embodiment of this application. As shown in (a) in FIG. 1, a whole house includes an entrance aisle, a kitchen, a dining room, a living room, a balcony, a primary bedroom, a secondary bedroom, a toilet, and the like. At least one first electronic device is disposed in the whole house. For example, each room or region includes at least one first electronic device. A second electronic device (for example, an IoT device) is further disposed in the whole house. Specifically, an electric rice cooker or an electric pressure cooker, a gas device, and the like are disposed in the kitchen. A speaker (for example, a smart speaker), a television (for example, a smart television, also referred to as a smart screen, a large screen, or the like), a routing device, and the like are disposed in the living room. A clothes hanger (for example, a smart clothes hanger) is disposed on the balcony. A floor-sweeping robot and the like are disposed in the dining room. A television (for example, a smart television), a speaker (for example, a smart speaker), a floor lamp (for example, a smart floor lamp), a routing device, and the like are disposed in the primary bedroom. A desk lamp (for example, a smart desk lamp), a speaker (for example, a smart speaker), and the like are disposed in the secondary bedroom. A body fat scale and the like are disposed in the toilet.

The human sensing-based automatic control method provided in embodiments of this application includes a human sensing-based automatic control method in a whole-house scenario, and further includes a human sensing-based automatic control method in a single room or region. The human sensing-based automatic control method provided in embodiments of this application is applied to a communication system. Correspondingly, the communication system includes a human sensing-based communication system in the whole-house scenario (which may also be referred to as a whole-house intelligent system), and a human sensing-based communication system in the single room or region (which may also be referred to as a room intelligent system or a region intelligent system). The communication system includes at least one first electronic device 100 and at least one second electronic device 300. In addition, the communication system may further include a hub device 200.

The first electronic device 100 is configured to locate the second electronic device 300 and/or a user. The first electronic device 100 may include a sensor. In an example, the first electronic device 100 includes an ultra-wide band (UWB) module and a millimeter-wave radar module. The UWB module is configured to locate the second electronic device 300, and the millimeter-wave radar module is configured to locate the user.

A UWB technology is a radio communication technology that does not use a carrier modulated signal, but uses an energy pulse sequence below a nanosecond level or a microsecond level, and extends a pulse to a frequency range through orthogonal frequency division modulation or direct sequencing. UWB has features such as a wide spectrum, high precision, low power consumption, a strong anti-multipath capability, high security, and low system complexity, is widely used in short-range and high-speed wireless communication, and especially has a great advantage in the field of indoor locating. Generally, locating accuracy of a UWB system may reach a centimeter level. The UWB system includes a UWB base station and a UWB tag. The UWB base station determines a position (coordinates) of the UWB tag by detecting a distance between the UWB tag and the UWB base station and a signal coming direction of the UWB tag, that is, locates the UWB tag. Locating by using UWB is performed based on a UWB coordinate system (also referred to as a first coordinate system).

In an example, the second electronic device includes a UWB module. The UWB module of the first electronic device 100 implements a function of the UWB base station. The UWB module of the second electronic device implements a function of the UWB tag. The UWB module of the second electronic device is located by using the UWB module of the first electronic device 100, so that the first electronic device 100 can locate the second electronic device.

In another example, some second electronic devices include no UWB module. Usually, the second electronic device including the UWB module is a mobile device (for example, a smartphone or a remote control). Consequently, the second electronic device including the UWB module may be used to mark the second electronic device including no UWB module, so that the first electronic device 100 locates the second electronic device including no UWB module. A specific marking method is described in detail later.

The millimeter-wave radar operates in a millimeter-wave band, is mainly configured to detect a moving object, and has an operating frequency band distributed in a 30 to 300 GHz frequency domain (a wavelength is 1 to 10 mm). The millimeter-wave radar continuously transmits (radiates) a specific form of radio magnetic signal when operating, receives an electromagnetic echo signal reflected by an object, and determines spatial information of the object by comparing a difference between the transmitted signal and the received signal. The millimeter-wave radar has features of a small size and high spatial resolution, is deployed indoors, and may be configured to detect information about a position, a physiological feature (for example, a breath frequency or a heartbeat frequency), an identity category (for example, an adult or a child), and a human body attitude (for example, standing, sitting, or lying) of a human body (the user) in a whole house. Consequently, by using the integrated millimeter-wave radar module, the first electronic device 100 can locate the user, and even detect the information such as the physiological feature, the identity category, and the human body attitude of the user. A specific method is described in detail later.

Locating by using the millimeter-wave radar is implemented based on a millimeter-wave radar coordinate system (also referred to as a second coordinate system). Coordinates respectively located in the second coordinate system and the first coordinate system need to be converted or unified to a same coordinate system. A specific coordinate system conversion method is described in detail later.

It should be noted that, in this embodiment of this application, an example in which the first electronic device 100 includes the UWB module and the millimeter-wave radar is used for description. In some other embodiments, the first electronic device 100 may include only the UWB module or the millimeter-wave radar. The first electronic device 100 including the UWB module is configured to locate the second electronic device 300. The first electronic device 100 including the millimeter-wave radar is configured to locate the user. The two types of first electronic devices 100 cooperate with each other to implement the human sensing-based automatic control method provided in embodiments of this application. This is not limited in embodiments of this application.

The first electronic device 100 may obtain a position of the second electronic device 300 (that is, locate the second electronic device), and may further obtain a position of a user in a room or a region (that is, locate the user). The whole house includes at least one room or region. If only one first electronic device is disposed in the whole house, signal attenuation or the like may be caused due to a reason, for example, wall blockage. In this case, the first electronic device cannot cover all regions in the whole house. Therefore, a plurality of first electronic devices are generally disposed in the whole house. For example, one first electronic device is disposed in each piece of relatively independent space (for example, the living room, a bedroom, a study, the balcony, the toilet, the kitchen, or an aisle), and is configured to locate a second electronic device and a user in the independent space. In this way, a second electronic device or a user at any position in the whole house can be detected by the first electronic device.

For example, as shown in (a) in FIG. 1, a signal receiving and sending range of the first electronic device disposed in the entrance aisle may cover the entrance aisle. A signal receiving and sending range of the first electronic device disposed in the kitchen may cover the kitchen. A signal sending and receiving range of the first electronic device disposed in the living room may cover the living room. A signal sending and receiving range of the first electronic device disposed in the dining room may cover the dining room. A signal sending and receiving range of the first electronic device disposed on the balcony may cover the balcony. A signal receiving and sending range of a first electronic device disposed in the primary bedroom may cover the primary bedroom. A signal sending and receiving range of the first electronic device disposed in the toilet may cover the toilet. A signal receiving and sending range of a first electronic device disposed in the secondary bedroom may cover the secondary bedroom. In an example, as shown in (b) in FIG. 1, the first electronic device may be disposed on a wall of the room or the region. In an example, the first electronic device may be disposed on a ceiling or the like of the room or the region. In this way, blockage of a signal by an object, for example, furniture in the whole house, can be reduced, and reduction of detection accuracy of the first electronic device due to blockage of the signal can be avoided. In an example, the first electronic device may be disposed on the ground or the like of the room or the region. Optionally, the first electronic device 100 may exist independently, or may be integrated with the second electronic device. This is not limited in this application. For example, the first electronic device 100 and a smart air conditioner are integrated into one device.

Optionally, some rooms or regions may not need to be equipped with a first electronic device. In other words, not all rooms or regions each are equipped with at least one first electronic device. For example, the dining room may be equipped with no first electronic device. One first electronic device may be shared in the entrance aisle and the dining room, or one first electronic device may be shared in the dining room and the living room.

It should be noted that, although the smart television is only shown as the second electronic device 300 in (a) in FIG. 1, a person skilled in the art should know that the second electronic device 300 includes but is not limited to the smart television, a smart speaker, a smart lamp (for example, a ceiling lamp, a smart desk lamp, or an aromatherapy lamp), a floor-sweeping robot, a body fat scale, a smart clothes hanger, a smart electric rice cooker, an air purifier, a humidifier, a desktop computer, a routing device, a smart socket, a water dispenser, a smart refrigerator, a smart air conditioner, a smart switch, a smart lock, and the like. It should be noted that, alternatively, the second electronic device 300 may not be a smart home device, but a portable device, for example, a personal computer (PC), a tablet computer, a mobile phone, or a smart remote control. A specific form of the second electronic device 300 is not limited in embodiments of this application.

The second electronic device 300 and the first electronic device 100 may be connected to the hub device 200 in a wired (for example, power line communication (PLC)) manner and/or a wireless (for example, wireless fidelity (Wi-Fi)—or Bluetooth) manner. It may be understood that the second electronic device 300 and the first electronic device 100 may be connected to the hub device 200 in a same manner or different manners. For example, both the second electronic device 300 and the first electronic device 100 are connected to the hub device 200 in the wireless manner. Alternatively, the second electronic device 300 is connected to the hub device 200 in the wireless manner, and the first electronic device 100 is connected to the hub device

200 in the wired manner. Alternatively, devices such as the smart speaker, the smart television, the body fat scale, and the floor-sweeping robot in the second electronic device 300 are connected to the hub device 200 in the wireless (for example, Wi-Fi) manner. Devices such as the smart desk lamp, the smart clothes hanger, and the smart lock in the second electronic device 300 are connected to the hub device 200 in the wired (for example, a PLC) manner. Preferably, the first electronic device 100 communicates with the second electronic device 300 in the wireless manner.

In an example, the first electronic device 100 may upload, to the hub device 200 in the wired or wireless manner, at least one of position information of the second electronic device 300 and the information such as the position, the physiological feature, the identity category, and the human body attitude of the user, that are obtained through detection.

The hub device 200, also referred to as a hub, a central control system, a host, or the like, is configured to receive the information sent by the first electronic device 100. Optionally, the hub device 200 is further configured to: construct a whole-house map, establish a whole-house coordinate system, and unify, to the whole-house coordinate system for unified measurement, position information obtained by all the first electronic devices 100. In this way, position information of the second electronic device 300 or the user obtained by all the first electronic devices 100 through detection can be unified to the whole-house coordinate system, and a specific position of the second electronic device 300 or the user in the whole house can be determined. The hub device 200 further notifies or controls the second electronic device 300 based on the received information (including but not limited to the position information). Correspondingly, conversion between coordinate systems is also mentioned, and is described in detail later.

In an implementation, the hub device 200 receives the information that is sent by the first electronic device 100 and that includes the position information of the second electronic device 300 and at least one of the position, the physiological feature, the identity category, the human body attitude, and the like of the user. The hub device 200 notifies or controls, based on the position information of the second electronic device 300 and at least one of the position, the physiological feature, the identity category, the human body attitude, and the like of the user, the second electronic device 300 to execute a preset instruction. For example, when the user wakes up a smart speaker by a voice, the hub device 200 notifies or controls, based on positions of a plurality of smart speakers in the whole house, one or more smart speakers, that are closest to the user, to wake up. For example, when the user moves from one room to another room in the whole house, the hub device 200 controls a smart speaker in the room, from which the user leaves, to stop playing an audio, and controls a smart speaker in the room, that the user enters, to start playing (for example, continuing to play) the audio. For another example, the hub device 200 controls, based on distances between two smart speakers (the two smart speakers respectively play a left-channel audio and a right-channel audio of a same audio) and the user, playing volume of the smart speakers, so that volume of the left-channel audio received by the user is consistent with that of the right-channel audio received by the user. For another example, the user watches a video (for example, the video includes violent content) in a room by using a smart television, and it is detected that a child user enters the room, and the hub device 200 controls the smart television to stop playing the video. For another example, the hub device 200 notifies or controls, based on a position (for example, a distance or an orientation) of the user relative to a smart television, the smart television to start playing or stop playing a video.

Optionally, as shown in (a) in FIG. 1, at least one hub device 200 is disposed in the whole house. A first electronic device in each room or each region may send, to the hub device 200, all detected position information of a user and position information of one or more second electronic devices in the room or the region. The hub device 200 obtains detection data (including but not limited to the position information) of each room or each region in the whole house, so that when a preset condition is met, the hub device 200 can notify or control a corresponding second electronic device in a corresponding room or a corresponding region.

Optionally, a hub device (not shown in the figure) may be alternatively disposed in each room or each region in the whole house. The first electronic device in each room or each region may send, to the hub device in the room or the region, detected position information of a user and detected position information of one or more second electronic devices in the room or the region. The hub device in the current room or the current region is then sent to the hub device 200 in the whole house. The hub device 200 in the whole house obtains the detection data of each room or each region in the whole house, so that when a preset condition is met, a hub device 200 in a corresponding room or a corresponding region may be notified or controlled. The hub device in the corresponding room or the corresponding region then notifies or controls a corresponding second electronic device.

Optionally, the hub device in each room or each region and the hub device in the whole house may exist independently, or may be integrated with the first electronic device or the second electronic device into one device, or may be integrated with the first electronic device and the second electronic device into one device. This is not limited in this application.

Optionally, some rooms or regions may not need to be equipped with a hub device. In other words, not all rooms or regions each are equipped with at least one hub device. For example, the dining room may be equipped with no hub device. A hub device is shared in the dining room and the entrance aisle, or a hub device is shared in the dining room and the living room.

Optionally, the hub device 200 in the whole house may further assume a function of a hub device in a room or a region. For example, the hub device 200 in the whole house may further assume a function of a hub device in the living room. In an example, a hub device is disposed in each room or each region other than a room or a region (for example, the living room). When communicating with the second electronic device in each room or each region other than the room or the region (for example, the living room), the hub device 200 in the whole house still performs communication through the hub device in each room or each region. However, when communicating with the second electronic device in the room or the region (for example, the living room), the hub device 200 in the whole house no longer performs communication through the hub device in the room or the region (for example, the living room).

In an example, the communication system further includes a routing device (for example, a router). The routing device is configured to: connect to a local area network or an internet, and uses a specific protocol to select and set a path for sending a signal. For example, one or more routers are deployed in the whole house to constitute a local area network, or to access the local area network or the internet. The second electronic device 300 or the first electronic device 100 accesses the router, and performs data transmission with a device in the local area network or a device in the internet through a Wi-Fi channel established by the router. In an implementation, the hub device 200 may be integrated with the routing device into one device. For example, the hub device 200 and the routing device are integrated into a routing device, that is, the routing device has a function of the hub device 200. The routing device may be one or more routing devices in a parent-child routing device, or may be an independent routing device.

In an example, the communication system further includes a gateway. The gateway is also referred to as an inter-network connector or a protocol converter. In an implementation, the gateway is configured to forward, to the routing device or the hub device 200, the information from the first electronic device 100. In another implementation, the function of the hub device 200 may be implemented by the gateway.

In an example, the communication system further includes a server (for example, a cloud server). The hub device 200, the routing device, or the gateway may send, to the server, the received information from the first electronic device 100. Further, the hub device 200, the routing device, or the gateway may further send, to the server, control information of the hub device 200 for the second electronic device 300. Further, the hub device 200, the routing device, or the gateway may further upload, to the server, various types of information generated in a running process of the second electronic device 300, to provide the various types of information for the user for viewing.

In an example, the communication system further includes one or more input devices (for example, the input device is a control panel). For example, a human-machine interaction interface of the communication system is displayed on the control panel. The user may view, on the man-machine interaction interface, information (for example, connection information of each device in the communication system) about the communication system, running information of the second electronic device 300, the control information of the hub device 200 for the second electronic device 300, and/or the like. The user may further input a control instruction on the man-machine interaction interface in a manner, for example, tapping a screen or a voice, to control a device in the communication system.

The foregoing content is merely some descriptions of the human sensing-based automatic control method provided in embodiments of this application. It should be noted that, in the examples or optional manners described above, any content may be freely combined, and combined content also falls within the scope of this application.

2. DESCRIPTION OF A HARDWARE STRUCTURE OF AN ELECTRONIC DEVICE

Figure 2:
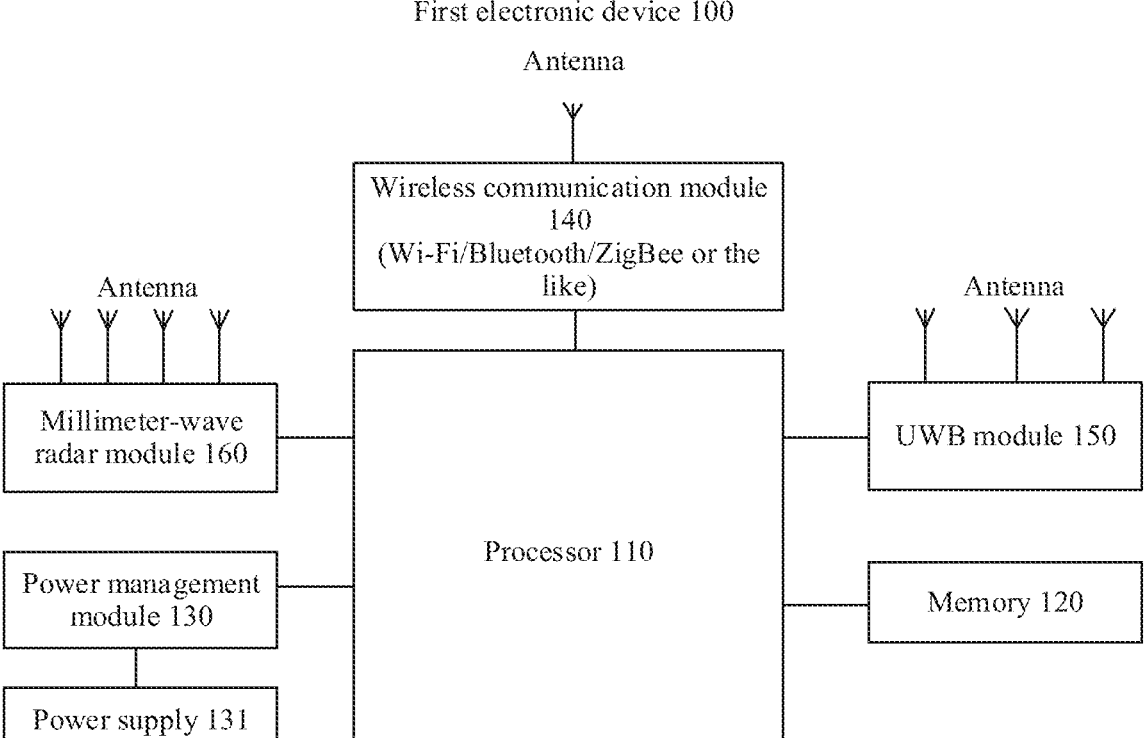
FIG. 2 is a schematic diagram of a structure of a first electronic device in an automatic control method according to an embodiment of this application.

For example, FIG. 2 is a schematic diagram of a structure of a first electronic device 100.

As shown in FIG. 2, the first electronic device 100 may include a processor 110, a memory 120, a power management module 130, a power supply 131, a wireless communication module 140, a UWB module 150, a millimeter-wave radar module 160, and the like.

It may be understood that the structure shown in FIG. 2 constitutes no specific limitation on the first electronic device 100. In some other embodiments of this application, the first electronic device 100 may include more or fewer components than those shown in the figure, or combine some of the components, or split some of the components, or have different arrangements of the components. The components shown in the figure may be implemented by using hardware, software, or a combination of software and hardware.

The processor 110 may include one or more processing units. Different processing units may be independent components, or may be integrated into one or more processors. For example, the processor 110 is a central processing unit (CPU), or an application-specific integrated circuit (ASIC), or may be configured as one or more integrated circuits implementing embodiments of this application, for example, one or more microprocessors (DSPs) or one or more field programmable gate arrays (FPGAs).

The memory 120 may be configured to store computer-executable program code. The executable program code includes instructions. For example, the memory 120 may further store data processed by the processor 110. In addition, the memory 120 may include a high-speed random access memory, and may further include a non-volatile memory, for example, at least one magnetic disk storage component, a flash memory component, or a universal flash storage (UFS). The processor 110 runs the instructions stored in the memory 120 and/or instructions stored in a memory disposed in the processor, to perform various function applications of the first electronic device 100 and data processing.

The power management module 130 is configured to receive an input from the power supply 131. The power supply 131 may be a battery, or may be a mains supply. The power management module 130 receives power supplying from the battery and/or the mains supply, and supplies power to components of the first electronic device 100, such as the processor 110, the memory 120, the wireless communication module 140, the UWB module 150, and the millimeter-wave radar module 160.

Figure 4:
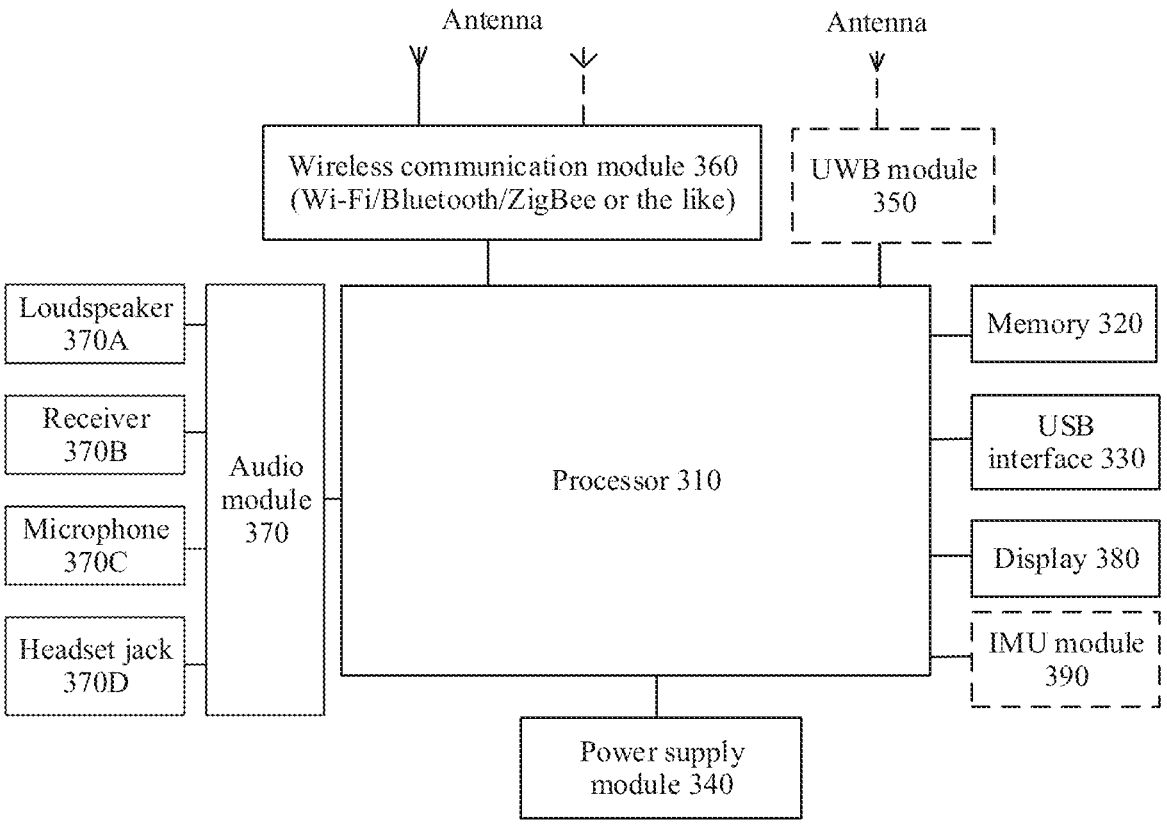
FIG. 4 is a schematic diagram of a structure of a second electronic device in an automatic control method according to an embodiment of this application.

The wireless communication module 140 may provide a solution that is applied to the first electronic device 100 and includes wireless communication such as a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and ZigBee. The wireless communication module 140 may be one or more components integrating at least one communication processing module. The wireless communication module 140 receives an electromagnetic wave through an antenna, performs frequency modulation and filtering processing on an electromagnetic wave signal, and sends a processed signal to the processor 110. The wireless communication module 140 may further receive a to-be-sent signal from the processor 110, perform frequency modulation and amplification on the to-be-sent signal, and convert a processed signal into an electromagnetic wave for radiation through the antenna. It should be noted that quantities of antennas of the wireless communication module 140, the UWB module 150, and the millimeter-wave radar module 160 in FIG. 4 are merely examples for description. It may be understood that the communication module 140, the UWB module 150, and the millimeter-wave radar module 160 each may include more or fewer antennas. This is not limited in embodiments of this application.

The UWB module 150 may provide a solution that is applied to the first electronic device 100 and includes wireless communication based on a UWB technology. For example, the UWB module 150 is configured to implement a function of the foregoing UWB base station. In an embodiment of this application, the UWB base station may locate a UWB tag. Specifically, duration within which a UWB signal flies in the air may be calculated with reference to some locating algorithms by detecting the UWB signal. A distance between the UWB tag and the UWB base station is obtained by multiplying the duration by a rate (for example, a light speed) at which the UWB signal is transmitted in the air. In an embodiment of this application, the UWB base station may further determine a direction of the UWB tag relative to the UWB base station (namely, a signal coming direction of the UWB tag) based on a phase difference obtained when the UWB signal sent by the UWB tag reaches different antennas of the UWB base station. The signal coming direction includes a horizontal coming direction and a vertical coming direction.

Figure 3:
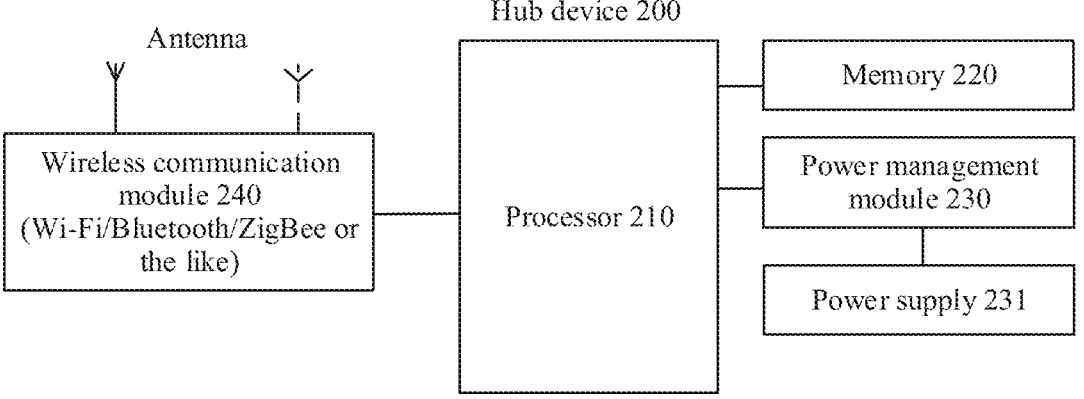
FIG. 3 is a schematic diagram of a structure of a hub device in an automatic control method according to an embodiment of this application.

For example, FIG. 3 is a schematic diagram of a structure of a hub device 200.

As shown in FIG. 3, the hub device 200 may include a processor 210, a memory 220, a power management module 230, a power supply 231, a wireless communication module 240, and the like.

It may be understood that the structure shown in FIG. 3 constitutes no specific limitation on the hub device 200. In some other embodiments of this application, the hub device 200 may include more or fewer components than those shown in the figure, or combine some of the components, or split some of the components, or have different arrangements of the components. The components shown in the figure may be implemented by using hardware, software, or a combination of software and hardware.

The processor 210 may include one or more processing units. Different processing units may be independent components, or may be integrated into one or more processors. For example, the processor 210 is a central processing unit (CPU), or an application-specific integrated circuit (ASIC), or may be configured as one or more integrated circuits implementing embodiments of this application, for example, one or more microprocessors (DSPs) or one or more field programmable gate arrays (FPGAs).

The memory 220 may be configured to store computer-executable program code. The executable program code includes instructions. For example, the memory 220 may further store data processed by the processor 210. In addition, the memory 220 may include a high-speed random access memory, and may further include a non-volatile memory, for example, at least one magnetic disk storage component, a flash memory component, or a universal flash storage (UFS). The processor 210 runs the instructions stored in the memory 220 and/or instructions stored in a memory disposed in the processor, to perform various function applications of the hub device 200 and data processing.

The power management module 230 is configured to receive an input from the power supply 231. The power supply 231 may be a battery, or may be a mains supply. The power management module 230 receives power supplying from the battery and/or the mains supply, and supplies power to components of the hub device 200, such as the processor 210, the memory 220, and the wireless communication module 240.

The wireless communication module 240 may provide a solution that is applied to the hub device 200 and includes wireless communication such as a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and ZigBee. The wireless communication module 240 may be one or more components integrating at least one communication processing module. The wireless communication module 240 receives an electromagnetic wave through an antenna, performs frequency modulation and filtering processing on an electromagnetic wave signal, and sends a processed signal to the processor 210. The wireless communication module 240 may further receive a to-be-sent signal from the processor 210, perform frequency modulation and amplification on the to-be-sent signal, and convert a processed signal into an electromagnetic wave for radiation through the antenna.

For example, FIG. 4 is a schematic diagram of a structure of a second electronic device 300.

As shown in FIG. 4, the second electronic device 300 may include a processor 310, a memory 320, a universal serial bus (USB) interface 330, a power supply module 340, a UWB module 350, a wireless communication module 360, and the like. Optionally, the second electronic device 300 may further include an audio module 370, a loudspeaker 370A, a receiver 370B, a microphone 370C, a headset jack 370D, a display 380, a sensor module 390, and the like.

It may be understood that the structure shown in FIG. 4 constitutes no specific limitation on the second electronic device 300. In some other embodiments of this application, the second electronic device 300 may include more or fewer components than those shown in the figure, or combine some of the components, or split some of the components, or have different arrangements of the components. The components shown in the figure may be implemented by using hardware, software, or a combination of software and hardware. In addition, an interface connection relationship between the modules that is shown in FIG. 4 is merely an example for description, and constitutes no limitation on the structure of the second electronic device 300. In some other embodiments of this application, the second electronic device 300 may alternatively use an interface connection manner different from that in FIG. 4, or use a combination of a plurality of interface connection manners.

The processor 310 may include one or more processing units. For example, the processor 310 may include an application processor (AP), a modem processor, a graphics processing unit (GPU), an image signal processor (ISP), and a video codec, and a digital signal processor (DSP). Different processing units may be independent components, or may be integrated into one or more processors.

The memory 320 may be configured to store computer-executable program code. The executable program code includes instructions. For example, the memory 320 may further store data processed by the processor 310. In addition, the memory 320 may include a high-speed random access memory, and may further include a non-volatile memory, for example, at least one magnetic disk storage component, a flash memory component, or a universal flash storage (UFS). The processor 310 runs the instructions stored in the memory 320 and/or instructions stored in a memory disposed in the processor, to perform various function applications of the second electronic device 300 and data processing.

The USB interface 330 is an interface that conforms to a USB standard specification, and may be specifically a mini USB interface, a micro USB interface, a USB Type-C interface, or the like. The USB interface 330 may be configured to connect to a charger to charge the second electronic device 300, or may be configured to transmit data between the second electronic device 300 and a peripheral device.

The power supply module 340 is configured to supply power to components of the second electronic device 300, for example, the processor 310 and the memory 320.

The UWB module 350 may provide a solution that is applied to the second electronic device 300 and includes wireless communication based on a UWB technology. For example, the UWB module 350 is configured to implement a function of the foregoing UWB tag.

The wireless communication module 360 may provide a solution that is applied to the second electronic device 300 and includes wireless communication such as a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and ZigBee. The wireless communication module 360 may be one or more components integrating at least one communication processing module. The wireless communication module 360 receives an electromagnetic wave through an antenna, performs frequency modulation and filtering processing on an electromagnetic wave signal, and sends a processed signal to the processor 310. The wireless communication module 360 may further receive a to-be-sent signal from the processor 310, perform frequency modulation and amplification on the to-be-sent signal, and convert a processed signal into an electromagnetic wave for radiation through the antenna. The wireless communication module 360 and the UWB module 350 may be integrated together or disposed separately. This is not limited in this application.

The second electronic device 300 may implement an audio function by using the audio module 370, the loudspeaker 370A, the receiver 370B, the microphone 370C, the headset jack 370D, the application processor, and the like, for example, audio playing or recording.

The audio module 370 is configured to convert digital audio information into an analog audio signal output, and is further configured to convert an analog audio input into a digital audio signal. The audio module 370 may be further configured to: encode and decode an audio signal. In some embodiments, the audio module 370 may be disposed in the processor 310, or some functional modules of the audio module 370 are disposed in the processor 310.

The loudspeaker 370A, also referred to as a "speaker", is configured to convert an audio electrical signal into a sound signal. The second electronic device 300 may be for listening to an audio through the loudspeaker 370A.

The receiver 370B, also referred to as an "earpiece", is configured to convert an audio electrical signal into a sound signal.

The microphone 370C, also referred to as a "mike" or a "mic", is configured to convert a sound signal into an electrical signal. A user may make a sound near the microphone 370C through the mouth of the user, to input a sound signal to the microphone 370C.

The headset jack 370D is configured to connect to a wired headset. The headset jack 370D may be a USB interface 330, or may be a 3.5 mm open mobile terminal platform (OMTP) standard interface or cellular telecommunications industry association of the USA (CTIA) standard interface.

The display 380 is configured to display an image, a video, and the like. The display 380 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like.

Optionally, the sensor module 390 includes an inertial measurement unit (IMU) module and the like. The IMU module may include a gyroscope, an accelerometer, and the like. The gyroscope and the accelerometer may be configured to determine a motion attitude of the second electronic device 300. In some embodiments, angular velocities of the second electronic device 300 around three axes may be determined by using the gyroscope. The accelerometer may be configured to detect magnitude of accelerations of the second electronic device 300 in various directions (generally on three axes). When the second electronic device 300 is still, magnitude and a direction of gravity may be detected. In an embodiment of this application, a device attitude of the second electronic device 300 may be obtained based on the angular speed and the acceleration that are measured by the IMU module. Optionally, some second electronic devices each may include an IMU module, and some second electronic devices each include no IMU module.

Optionally, the second electronic device 300 further includes a filter (for example, a Kalman filter). For example, an output of the IMU module and the output of the UWB module 350 may be superimposed, and a signal obtained after the output of the MU module and the output of the UWB module 350 are superimposed may be input to the Kalman filter for filtering, to reduce an error.

Figure 5A:
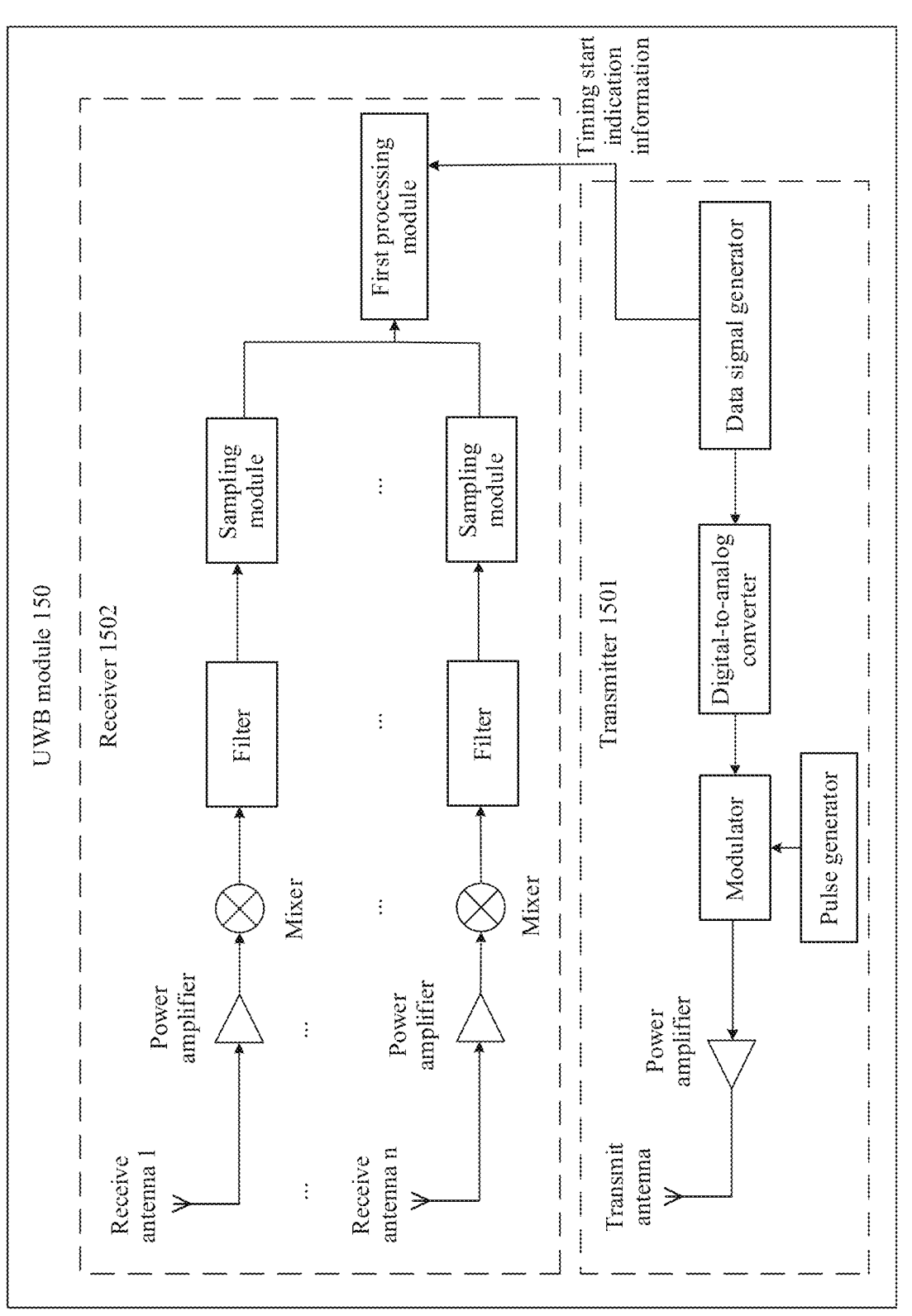
FIG. 5A is a schematic diagram of a structure of an ultra-wide band (UWB) module in a first electronic device according to this application.

For example, FIG. 5A shows a structure of the UWB module in the first electronic device according to an embodiment of this application. As shown in FIG. 5A, the UWB module 150 includes a transmitter 1501 and a receiver 1502. The transmitter 1501 and the receiver 1502 may run independently. The transmitter 1501 includes a data signal generator, a pulse generator, a modulator, a digital-to-analog converter, a power amplifier, a transmit antenna, and the like. The data signal generator is configured to generate a data signal, and is further configured to send timing start indication information to the receiver 1502 when starting to generate the data signal. The pulse generator is configured to generate cyclical pulse signals. The digital-to-analog converter is configured to convert a digital signal into an analog signal. A data signal that needs to be sent is modulated by the modulator to the pulse signal generated by the pulse generator, and undergoes power amplification performed by the power amplifier. Then, a UWB signal is transmitted through the transmit antenna. The receiver 1502 includes a receive antenna, a mixer, a filter, a sampling module, a first processing module, and the like. Any receive antenna receives the UWB signal (for example, in a form of a pulse sequence). The received UWB signal is mixed by the mixer, filtered and amplified by the filter, and undergoes analog-to-digital conversion performed by the sampling module, to obtain a baseband digital signal. The first processing module is configured to process the baseband digital signal, to detect the UWB signal. For example, the first processing module calculates time of flight (ToF) of the UWB signal based on the timing start indication information and a moment at which the pulse sequence is received, and calculates, based on the ToF and a rate (for example, a light speed) at which the UWB signal is transmitted in the air, a distance between the first electronic device 100 and the second electronic device 300 including the UWB module 350. For another example, the first processing module calculates, based on a phase difference between pulse sequences received by a plurality of receive antennas, a signal coming direction of the second electronic device 300 including the UWB module 350. It should be noted that, in FIG. 5A, a pulse sequence received by each receive antenna passes through a power amplifier, a mixer, a filter, and a sampling module that are in a group, which indicates a procedure of processing the pulse sequence. Optionally, the receiver 1502 may include only a power amplifier, a mixer, a filter, and a sampling module that are in one group. In an implementation, one antenna may implement a function of one transmit antenna in the transmitter 1501 and a function of one receive antenna in the receiver 1502, that is, the transmit antenna and the receive antenna are integrated into a same antenna.

Figure 5B:
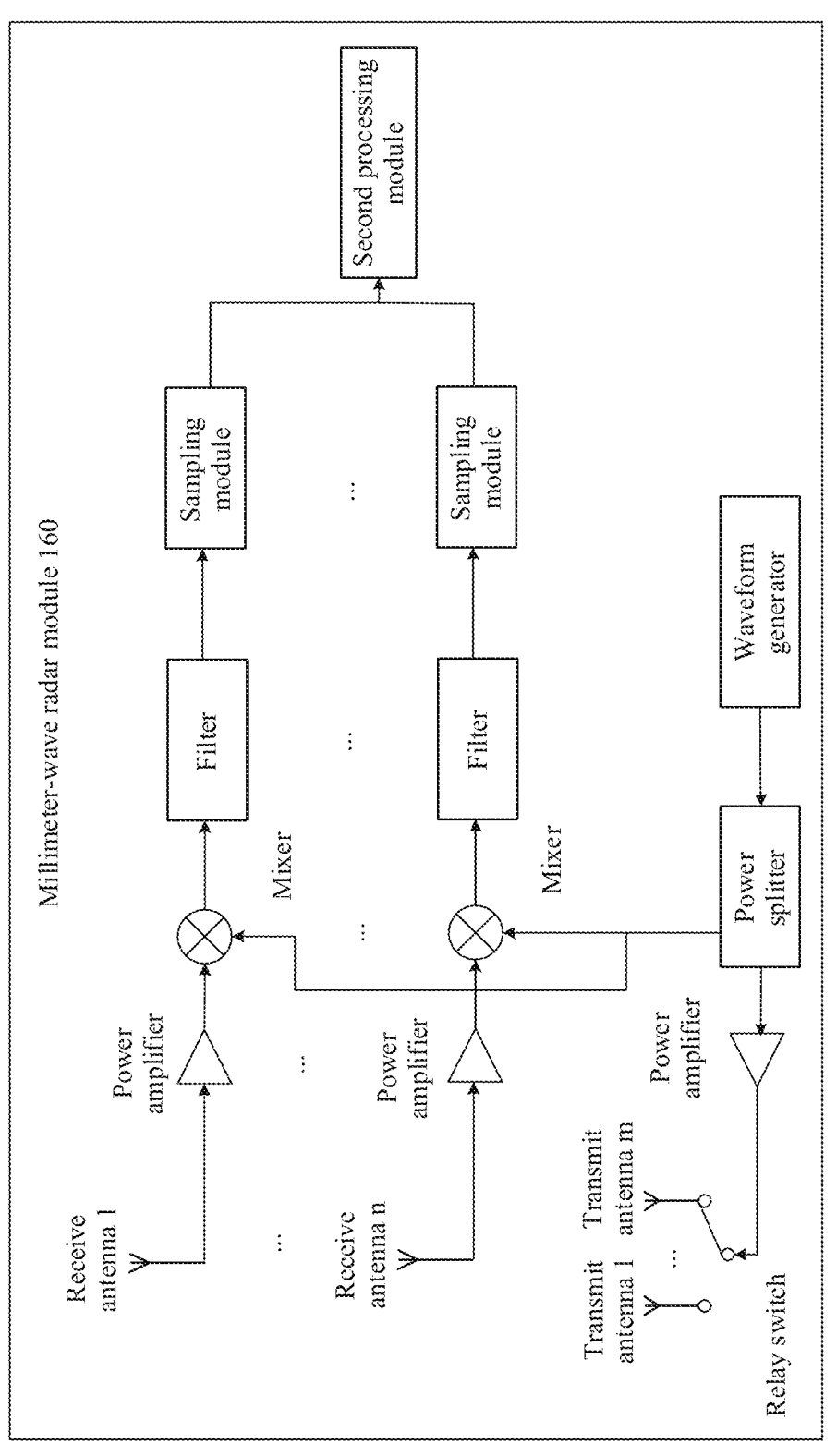
FIG. 5B is a schematic diagram of a structure of a millimeter-wave radar module in a first electronic device according to an embodiment of this application.

For example, FIG. 5B shows a structure of the millimeter-wave radar module in the first electronic device according to an embodiment of this application. As shown in FIG. 5B, the millimeter-wave radar module 160 includes a transmit antenna, a relay switch, a receive antenna, a waveform generator, a mixer, a filter, a second processing module, and the like. The waveform generator is configured to generate a to-be-transmitted signal. For example, the to-be-transmitted signal is a linear frequency-modulated continuous signal (LFMCW). After the to-be-transmitted signal passes through a power splitter, one part of the to-be-transmitted signal undergoes power amplification performed by the power amplifier. Then, the relay switch selects a transmit antenna to transmit a millimeter-wave signal. The other part of the transmitted signal is used as a local oscillator signal, and is mixed, by the mixer, with a millimeter-wave signal received by the receive antenna. A signal output by the mixer is a difference frequency signal. The difference frequency signal is filtered and amplified by the filter, and undergoes analog-to-digital conversion (sampling) performed by the sampling module, to become a digital difference frequency signal. The second processing module detects a target by processing the digital difference frequency signal, and obtains information such as a distance and a signal coming direction of the target. In FIG. 5B, n and m are positive integers greater than or equal to 1.

Figure 6:
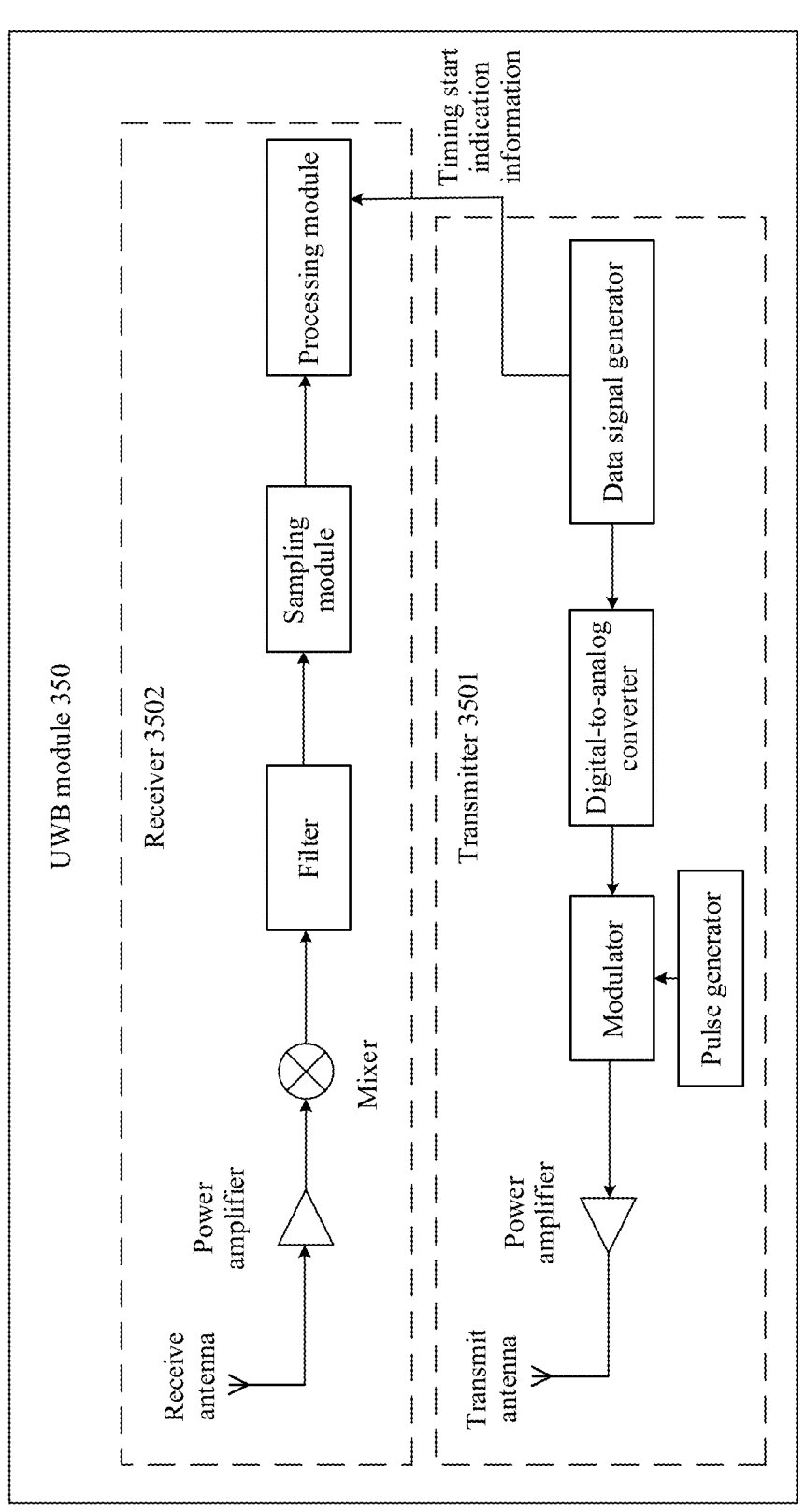
FIG. 6 is a schematic diagram of a structure of a UWB module in a second electronic device according to an embodiment of this application.

For example, FIG. 6 shows a structure of the UWB module in the second electronic device. As shown in FIG. 6, the UWB module 350 includes a transmitter 3501 and a receiver 3502. The transmitter 3501 and the receiver 3502 may run independently. The transmitter 3501 includes a data signal generator, a pulse generator, a modulator, a digital-to-analog converter, a power amplifier, a transmit antenna, and the like. The data signal generator is configured to generate a data signal. The pulse generator is configured to generate cyclical pulse signals. The digital-to-analog converter is configured to convert a digital signal into an analog signal. A data signal that needs to be sent is modulated by the modulator to the pulse signal generated by the pulse generator, and undergoes power amplification performed by the power amplifier. Then, a UWB signal is transmitted through the transmit antenna. The receiver 3502 includes a receive antenna, a mixer, a filter, a sampling module, a processing module, and the like. The receive antenna receives the UWB signal (for example, in a form of a pulse sequence). The received UWB signal is mixed by the mixer, filtered and amplified by the filter, and undergoes analog-to-digital conversion performed by the sampling module, to obtain a baseband digital signal. The processing module is configured to process the baseband digital signal, to detect the UWB signal. In an implementation, the transmit antennas in the transmitter 3501 and the receive antennas in the receiver 3502 may be integrated into a same antenna.

Figure 7A:
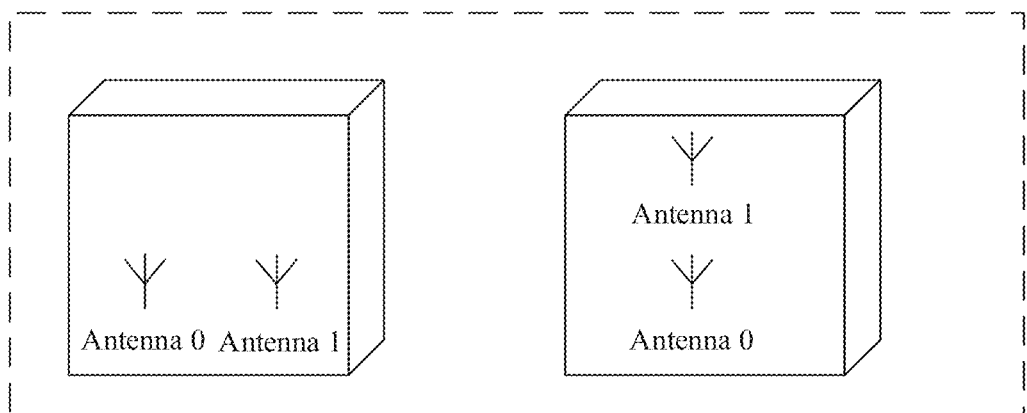
FIG. 7($a$) to FIG. 7($e$) are a schematic diagram of several antenna distributions of a UWB module in a first electronic device according to an embodiment of this application.

For example, FIG. 7(a) to FIG. 7(e) show several antenna distributions of the UWB module in the first electronic device according to an embodiment of this application. FIG. 7(a) shows examples of two two-antenna structures. One two-antenna structure is a transverse (for example, horizontal) antenna structure, and the other two-antenna structure is a longitudinal (for example, vertical) antenna structure. Preferably, a distance between an antenna 0 and an antenna 1 is $\lambda/2$, and $\lambda$ is a wavelength of the UWB signal. The transverse antenna structure may be configured to measure a transverse coming direction (for example, a horizontal coming direction) of the UWB signal. The longitudinal antenna structure may be configured to measure a longitudinal coming direction (for example, a vertical coming direction) of the UWB signal. In an implementation, a first electronic device on the left shown in FIG. 7(a) may cooperate with a first electronic device on the right (for example, the two first electronic devices are arranged at a specific angle), to detect a signal coming direction of the second electronic device including the UWB module.

Figure 7B:
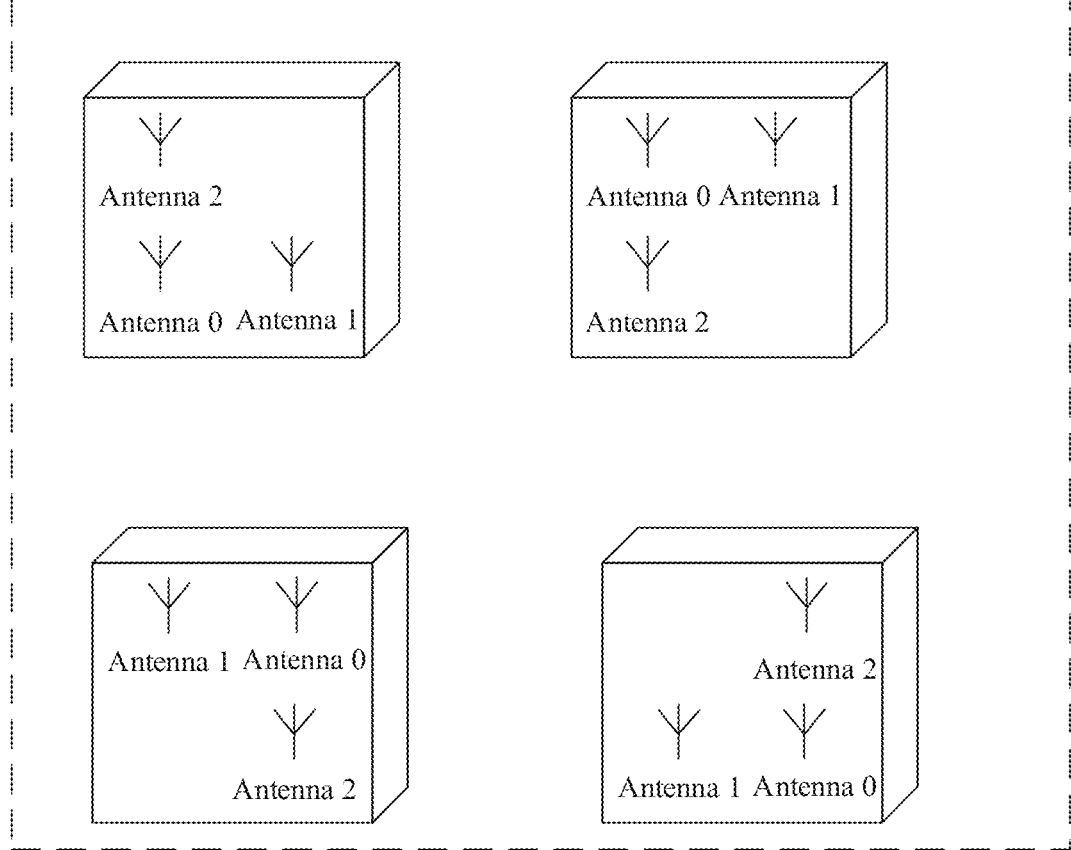
Figure 7C:
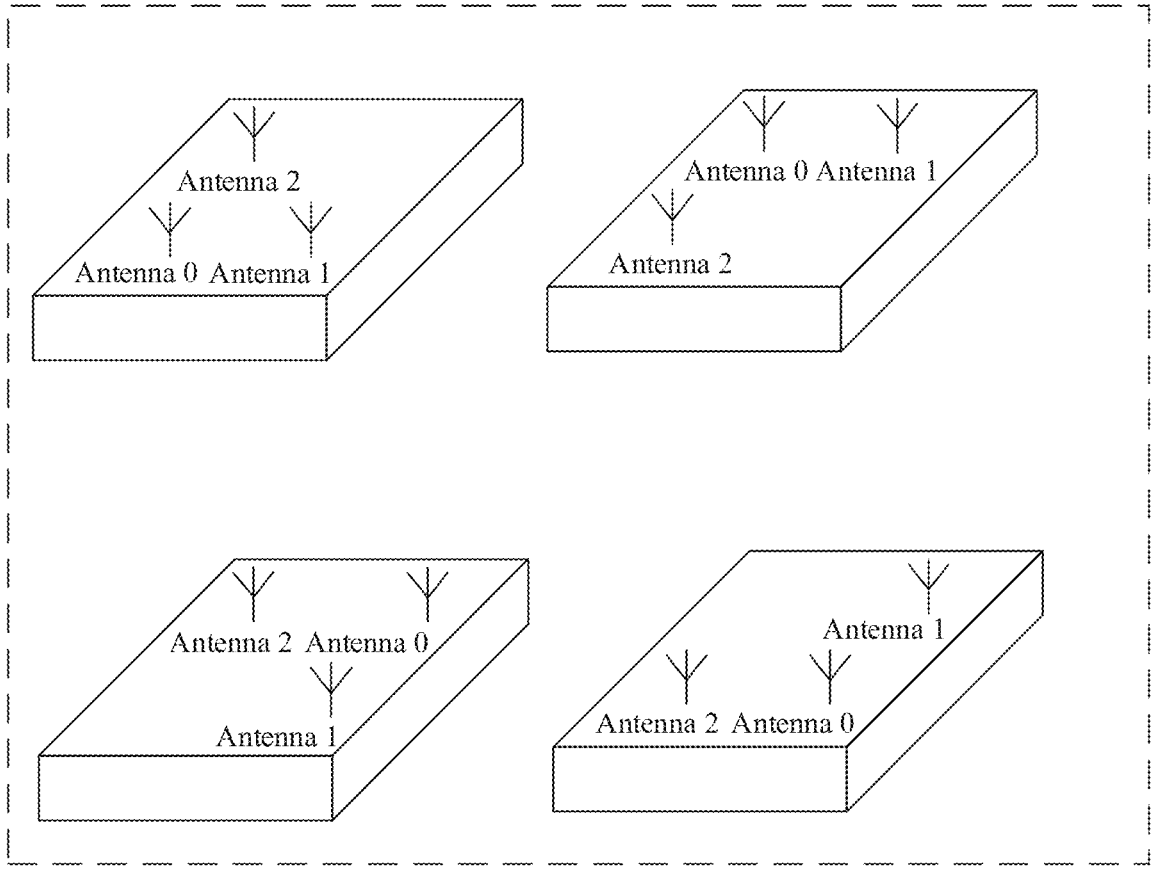

FIG. 7(b) and FIG. 7(c) show examples of a three-antenna structure. As shown in FIG. 7(b) and FIG. 7(c), three antennas have a structural relationship in an L shape (or referred to as a right triangle). As shown in FIG. 7(b), an antenna 0 and an antenna 1 are aligned in a transverse direction (for example, a horizontal direction). The antenna 0 and an antenna 2 are aligned in a longitudinal direction (for example, a vertical direction). To be specific, a plane on which the antenna 0, the antenna 1, and the antenna 2 are located is a longitudinal plane (for example, a longitudinal plane), and has a distribution relationship in the L shape on the longitudinal plane. As shown in FIG. 7(c), a plane on which an antenna 0, an antenna 1, and an antenna 2 are located is a transverse plane (for example, a horizontal plane), and a connection line between the antenna 0 and the antenna 1 (it is assumed that there is a connection line between the antenna 0 and the antenna 1) is perpendicular to a connection line between the antenna 0 and the antenna 2 (it is assumed that there is a connection line between the antenna 0 and the antenna 2). To be specific, the antenna 0, the antenna 1, and the antenna 2 have a distribution relationship in the L shape on the transverse plane. For example, when the antenna 0, the antenna 1, and the antenna 2 are distributed in the L shape, a distance between the antenna 0 and the antenna 1 and a distance between the antenna 0 and the antenna 2 may be less than or equal to $\lambda/2$, where $\lambda$ is a wavelength of the UWB signal. The distance between the antenna 0 and the antenna 1 and the distance between the antenna 0 and the antenna 2 may be the same or different.

Figure 7D:
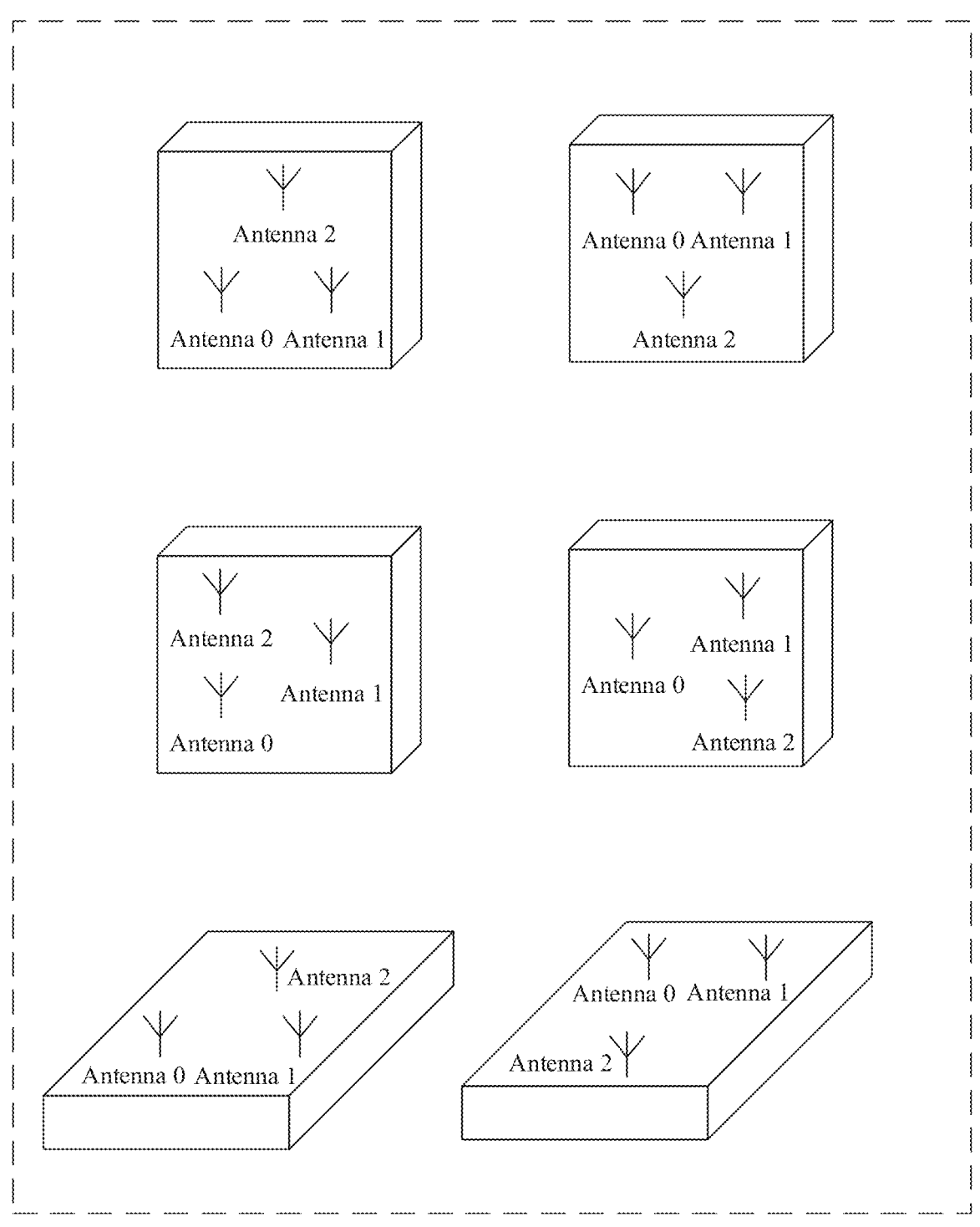

FIG. 7(d) shows examples of some other three-antenna structures. As shown in FIG. 7(d), three antennas have a structural relationship in shape of a triangle (for example, an equilateral triangle or an isosceles triangle). For example, a plane on which an antenna 0, an antenna 1, and an antenna 2 are located is a longitudinal plane (for example, a vertical plane), and are distributed in the shape of the triangle on the longitudinal plane. For another example, an antenna 0, an antenna 1, and an antenna 2 are distributed in the shape of the triangle on a transverse plane (for example, a horizontal plane). For example, when the antenna 0, the antenna 1, and the antenna 2 are distributed in the shape of the triangle, a distance between any two of the antenna 0, the antenna 1, and the antenna 2 may be less than or equal to $\lambda/2$, where $\lambda$ is a wavelength of the UWB signal. In addition, distances between any two of the antenna 0, the antenna 1, and the antenna 2 may be the same or different. For example, a distance between the antenna 0 and the antenna 1 is $\lambda/2$, and a distance between the antenna 0 and the antenna 2 is $13\lambda/2$.

Figure 7E:
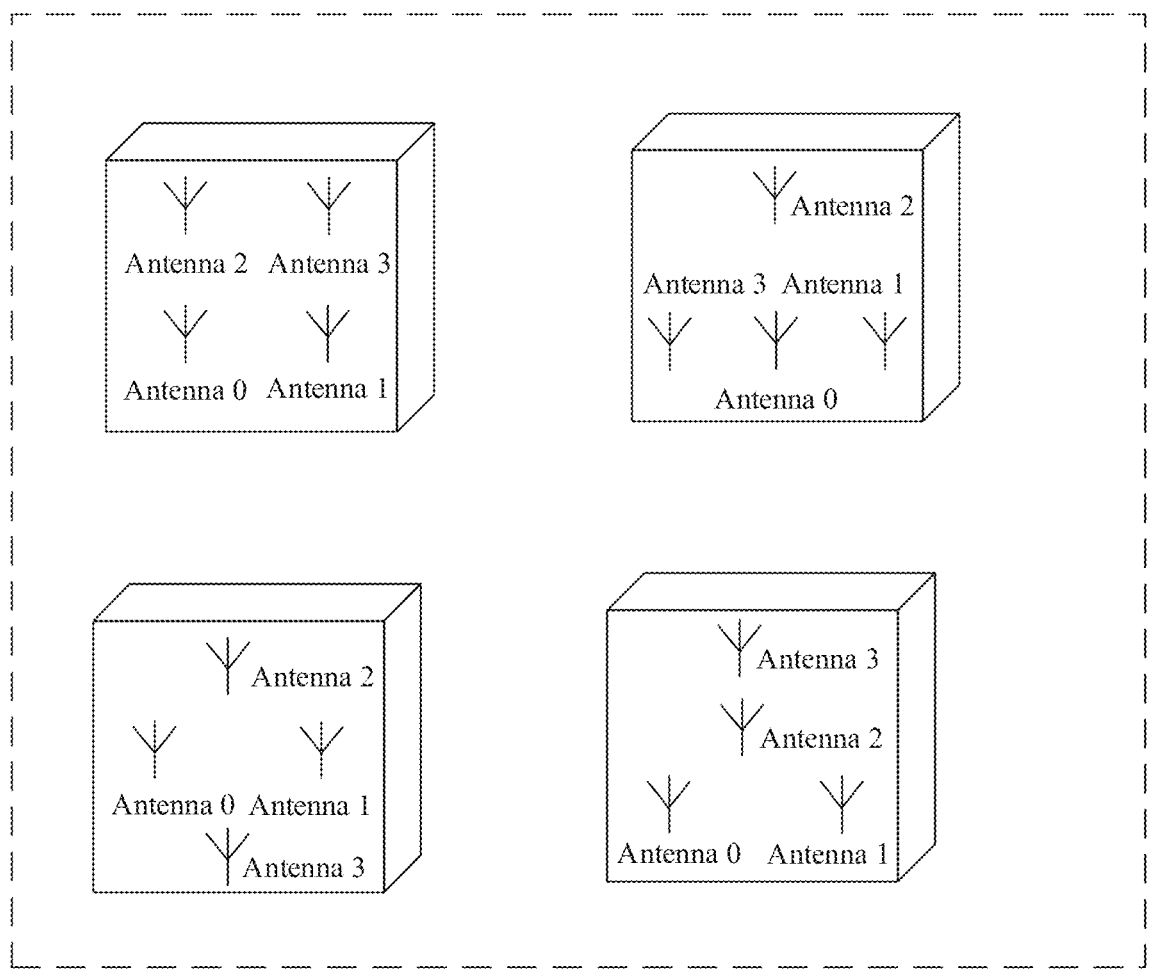

It may be understood that a case in which there are more than three antennas also falls within the scope of this application. For example, as shown in FIG. 7(e), four antennas, namely, an antenna 0, an antenna 1, an antenna 2, and an antenna 3, are distributed in a shape of a rectangle. Any three of the four antennas are distributed in the foregoing L shape or distributed in the forging shape of the triangle.

For example, the first electronic device 100 obtains a transverse coming direction of the UWB signal based on a phase difference obtained when the UWB signal from the second electronic device 300 reaches two transversely distributed antennas of the UWB module 150, and obtains a longitudinal coming direction of the UWB signal based on a phase difference obtained when the UWB signal from the second electronic device 300 reach two longitudinally distributed antennas of the UWB module 150. Further, the first electronic device 100 obtains a coming direction of the UWB signal based on the transverse coming direction and the longitudinal coming direction.

In some other examples, the UWB module 150 of the first electronic device 100 may include only one antenna. In this case, at least three first electronic devices 100 need to be used. The at least three first electronic devices 100 need to be distributed in an L shape or in a shape of a triangle, and cooperate with each other to obtain a coming direction of the UWB signal. A specific principle is similar to the foregoing descriptions. Details are not described herein again.

A quantity and a distribution of antennas in the UWB module of the first electronic device 100 are not limited in embodiments of this application provided that the coming direction of the UWB signal can be obtained.

Figure 8:
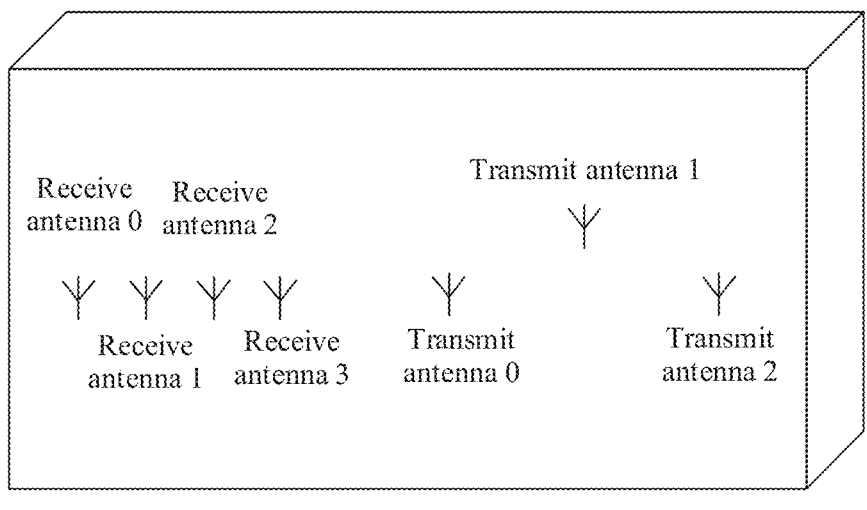
FIG. 8 is a schematic diagram of several antenna distributions of a millimeter-wave radar module in a first electronic device according to an embodiment of this application.

For example, FIG. 8 shows several antenna distributions of the millimeter-wave radar module in the first electronic device according to an embodiment of this application. For example, the transmit antenna includes a transmit antenna 0, a transmit antenna 1, and a transmit antenna 2. The receive antenna includes a receive antenna 0, a receive antenna 1, a receive antenna 2, and a receive antenna 3. A distribution of the transmit antenna 0, the transmit antenna 1, and the transmit antenna 2, and a distribution of the receive antenna 0, the receive antenna 1, the receive antenna 2, and the receive antenna 3 may be shown in (a) or (b) in FIG. 8. The transmit antenna is configured to transmit an electromagnetic signal (for example, an LFMCW) operating in a millimeter-wave band. The receive antenna is configured to receive a signal that is reflected by a reflector (an object or a human body) and that is of the electromagnetic signal operating in the millimeter-wave band. The millimeter-wave radar module 160 obtains a difference frequency signal based on the transmitted signal and the received signal, and determines a position of the object or the human body based on the difference frequency signal.

As shown in FIG. 8, three transmit antennas and four receive antennas are located on a same longitudinal plane (for example, a vertical plane). The three transmit antennas are distributed in a shape of a triangle on the longitudinal plane. In an example, as shown in (a) in FIG. 8, the transmit antenna 0 and the transmit antenna 2 are located on a same transverse plane (for example, a horizontal plane). The four receive antennas are located on a same transverse line (for example, a horizontal line). For example, distances between any two receive antennas are equal (for example, are $\lambda_L/2$). A distance between the transmit antenna 0 and the transmit antenna 2 is equal (for example, is $2\lambda_L$). A distance between the transmit antenna 1 and the transmit antenna 0 and a distance between the transmit antenna 1 and the transmit antenna 2 in a longitudinal direction are both equal (for example, are both $\lambda_L/2$). Herein, $\lambda_L$ is a wavelength of a highest frequency of the linear frequency-modulated continuous signal. In another example, as shown in (b) in FIG. 8, the transmit antenna 0 and the transmit antenna 2 are located on a same longitudinal line (for example, a vertical line). The four receive antennas are located on a same longitudinal line (for example, a vertical line). Distances between any two receive antennas are equal (for example, are $\lambda_L/2$). A distance between the transmit antenna 0 and the transmit antenna 2 is equal (for example, is $2\lambda_L$). A distance between the transmit antenna 1 and the transmit antenna 0 and a distance between the transmit antenna 1 and the transmit antenna 2 in a transverse direction are both equal (for example, are both $\lambda_L/2$). It may be understood that a quantity and a distribution of transmit antennas and/or a quantity and a distribution of receive antennas may be in other forms. This is not limited in embodiments of this application.

A plurality of transmit antennas and a plurality of receive antennas are configured to: accurately measure a direction of a reflected signal, namely, a coming direction of the reflected signal, including a transverse coming direction (for example, a horizontal coming direction) and a longitudinal coming direction (for example, a vertical coming direction), and increase a receiving aperture of the millimeter-wave radar as much as possible. The millimeter-wave radar module 160 may calculate a transverse coming direction of the target based on a phase difference of the reflected signal on the plurality of receive antennas in the transverse direction (for example, the horizontal direction), and calculate a longitudinal coming direction of the target based on a phase difference of the reflected signal on the plurality of receive antennas in the longitudinal direction (for example, the vertical direction).

Optionally, there may be more than or fewer than three transmit antennas. Optionally, there may be more than or fewer than four receive antennas. This is not limited in this application. In an implementation, there is at least one transmit antenna, and there are at least three receive antennas.

In an implementation, there is one transmit antenna, and there are three receive antennas. The three receive antennas, namely, the receive antenna 0, the receive antenna 1, and the receive antenna 2, are distributed in the shape of the triangle. For ease of description, it is assumed that a connection line (actually, there is no connection line) between the receive antenna 0 and the receive antenna 1 is located in the transverse direction, and a connection line (actually, there is no connection line) between the receive antenna 0 and the receive antenna 2 is located in the longitudinal direction. In this way, after a transmitted signal of the transmit antenna is reflected by the reflector (the object or the human body), the three receive antennas separately receive reflected signals. The millimeter-wave radar module 160 may obtain a transverse coming direction (for example, a horizontal coming direction) of the reflected signal based on a phase difference between the reflected signals respectively received by the receive antenna 0 and the receive antenna 1, and obtain a longitudinal coming direction (for example, a vertical coming direction) of the reflected signal based on a phase difference between the reflected signals respectively received by the receive antenna 0 and the receive antenna 2. Further, a coming direction of the reflected signal may be determined based on the transverse coming direction and the longitudinal coming direction.

In another implementation, there are at least two transmit antennas, and there are at least two receive antennas. For example, there are two transmit antennas: the transmit antenna 0 and transmit antenna 1, and there are two receive antennas: the receive antenna 0 and the receive antenna 1. It is assumed that a connection line (actually, there is no connection line) between the transmit antenna 0 and the transmit antenna 1 is located in the transverse direction, and a connection line (actually, there is no connection line) between the receive antenna 0 and the receive antenna 1 is located in the longitudinal direction. After respective transmitted signals of the transmit antenna 0 and the transmit antenna 1 are separately reflected by the reflector (the object or the human body), at least one receive antenna receives reflected signals. The millimeter-wave radar module 160 may calculate a transverse coming direction (for example, a horizontal coming direction) of a signal (which may also be referred to as the reflected signal in this case), that is obtained after the transmitted signal is reflected, based on a phase difference obtained when the signals respectively transmitted by the transmit antenna 0 and the transmit antenna 1 reach a same receive antenna. After the transmitted signals of the transmit antennas are reflected by the reflector (the object or the human body), the two receive antennas respectively receive the reflected signals. A longitudinal coming direction (for example, a vertical coming direction) of the reflected signal is obtained based on a phase difference between the reflected signals respectively received by the receive antenna 0 and the receive antenna 1. Further, a coming direction of the reflected signal may be determined based on the transverse coming direction and the longitudinal coming direction.

In another implementation, there are at least two transmit antennas, and there are at least two receive antennas. For example, there are two transmit antennas: the transmit antenna 0 and transmit antenna 1, and there are two receive antennas: the receive antenna 0 and the receive antenna 1. It is assumed that a connection line (actually, there is no connection line) between the transmit antenna 0 and the transmit antenna 1 is located in the longitudinal direction, and a connection line (actually, there is no connection line) between the receive antenna 0 and the receive antenna 1 is located in the transverse direction. After transmitted signals of the two transmit antennas are separately reflected by the reflector (the object or the human body), at least one receive antenna receives reflected signals. The millimeter-wave radar module 160 may calculate a longitudinal coming direction (for example, a horizontal coming direction) of a signal (which may also be referred to as the reflected signal in this case), that is obtained after the transmitted signal is reflected, based on a phase difference obtained when the signals respectively transmitted by the transmit antenna 0 and the transmit antenna 1 reach a same receive antenna, and obtain a transverse coming direction (for example, a horizontal coming direction) of the reflected signal based on a phase difference between the reflected signals respectively received by the receive antenna 0 and the receive antenna 1. Further, a coming direction of the reflected signal may be determined based on the transverse coming direction and the longitudinal coming direction.

In another implementation, there are at least three transmit antennas, and there are at least one receive antenna. For example, there are three transmit antennas: the transmit antenna 0, the transmit antenna 1, and the transmit antenna 2, and there are one receive antenna: the receive antenna 0. The transmit antenna 0, the transmit antenna 1, and the transmit antenna 2 are distributed in the shape of the triangle. It is assumed that a connection line (actually, there is no connection line) between the transmit antenna 0 and the transmit antenna 1 is located in the transverse direction (for example, the horizontal direction), and a connection line (actually, there is no connection line) between the transmit antenna 0 and the transmit antenna 2 is located in the longitudinal direction. After transmitted signals of the transmit antenna 0, the transmit antenna 1, and the transmit antenna 2 are separately reflected by the reflector (the object or the human body), the receive antenna 0 receives reflected signals. The millimeter-wave radar module 160 may calculate a transverse coming direction (for example, a horizontal coming direction) of a signal (which may also be referred to as the reflected signal in this case), that is obtained after the transmitted signal is reflected, based on a phase difference obtained when the signals respectively transmitted by the transmit antenna 0 and the transmit antenna 1 reach a same receive antenna, and calculate a longitudinal coming direction (for example, a vertical coming direction) of a signal (which may also be referred to as the reflected signal in this case), that is obtained after the transmitted signal is reflected, based on a phase difference obtained when the signals respectively transmitted by the transmit antenna 0 and the transmit antenna 2 reach a same receive antenna.

3. DESCRIPTION OF A LOCATING PRINCIPLE

For ease of description, the following describes a specific locating principle in detail by using an example in which the first electronic device 100 includes the UWB module 150 and the millimeter-wave radar module 160.

It should be noted that locating means obtaining a position. In an embodiment of this application, coordinates in a coordinate system indicate a position. For example, coordinates of the first electronic device indicate a position of the first electronic device, coordinates of the second electronic device indicate the position of the second electronic device, and coordinates of the user indicates the position of the user. It may be understood that, in some other embodiments, a position may alternatively be indicated in another manner. This is not limited in embodiments of this application.

(1) Establishment of the First Coordinate System (First Electronic Device Coordinate System)

To accurately perform locating, the UWB module 150 needs to establish the first coordinate system, and specifically perform locating by using coordinates in the first coordinate system. With reference to FIG. 9, the following describes in detail a process of establishing the first coordinate system. For example, in (a) and (b) in FIG. 9, one UWB module includes three antennas. A distance between an antenna 0 and an antenna 1 and a distance between the antenna 0 and an antenna 2 are both preset distances. It is assumed that a point (for example, a center point or an end point at one end) on the antenna 0 is a coordinate origin $O_e$. A connection line between the antenna 0 and the antenna 1 is used as an $X_e$ axis, and a direction in which the antenna 1 points to the antenna 0 is a positive direction of the $X_e$ axis. In a plane on which the antenna 0, the antenna 1, and the antenna 2 are located, a straight line perpendicular to the $X_e$ axis is used as a $Z_e$ axis, and a projection of the antenna 2 on the $Z_e$ axis is located in a positive direction of the $Z_e$ axis. In this way, the positive direction of the $Z_e$ axis can be determined. In (a) in FIG. 9, the antenna 2 is located in the positive direction of the $Z_e$ axis. In (b) in FIG. 9, the projection of the antenna 2 on the $Z_e$ axis is in the positive direction of the $Z_e$ axis. Finally, a direction of a $Y_e$ axis is determined according to a rule of a right-hand rectangular coordinate system based on directions of the $X_e$ axis and the $Z_e$ axis. The right-hand rectangular coordinate system may be referred to as a right-hand system for short, and is one of methods for specifying a rectangular coordinate system in space. As shown in (c) in FIG. 9, positive directions of an $X_e$ axis, a $Y_e$ axis, and a $Z_e$ axis in the right-hand rectangular coordinate system are defined as follows: The right hand is placed at a position of an origin, the thumb, the index finger, and the middle finger are at right angles to each other, when the thumb and index finger are on a same plane, the thumb points to the positive direction of the $X_e$ axis, and the middle finger points to the positive direction of the $Z_e$ axis, a direction to which the index finger points is the positive direction of the $Y_e$ axis.

In some examples, to facilitate calculation and reduce a calculation error, the $Z_e$ axis may be set on a vertical plane, and the positive direction of the $Z_e$ axis is opposite to a gravity direction. Optionally, prompt information may be marked on an outer surface of the first electronic device 100, and indicates a correct installation manner or placement manner. In this way, the $Z_e$ axis of the first coordinate system is located on the vertical plane, and the positive direction of the $Z_e$ axis is opposite to the gravity direction. For example, as shown in (a) in FIG. 9 or (b) in FIG. 9, an arrow is marked on an outer surface of the UWB base station, and is for prompting to install or place the first electronic device 100 in a direction indicated by the arrow (a direction of the arrow faces upward). In this way, the $Z_e$ axis of the first coordinate system is located on the vertical plane, and the positive direction of the $Z_e$ axis is opposite to the gravity direction. For example, when installing the first electronic device, the user may make an arrow on an outer surface of the first electronic device parallel to a wall surface, and a direction of the arrow face upward. In this way, the $Z_e$ axis of the first coordinate system is located on the vertical plane, and the positive direction of the $Z_e$ axis is opposite to the gravity direction. For example, when installing the first electronic device, the user may use an instrument, for example, a plumb bob, to make an arrow on an outer surface of the first electronic device parallel to a vertical line determined by the plumb bob, and a direction of the arrow face upward. In this way, the $Z_e$ axis of the first coordinate system is located on the vertical plane, and the positive direction of the $Z_e$ axis is opposite to the gravity direction.

Alternatively, the first electronic device 100 may include only one UWB module, and the UWB module 150 may include only one antenna. As a result, three first electronic devices 100 need to cooperate with each other to establish the first coordinate system. In this case, for a detailed process of establishing the first coordinate system, refer to the Chinese Patent Application No. 202110872916.6. Details are not described herein again. It should be noted that the Chinese Patent Application No. 202110872916.6 is incorporated into this application by reference in its entirety, and falls within the scope of this application.

For example, a positive direction of a $Y_e$ axis is alternatively determined according to a rule of a left-hand rectangular coordinate system based on directions of the $X_e$ axis and the $Z_e$ axis. The left-hand rectangular coordinate system may be referred to as a left-hand system for short, and is one of methods for specifying a rectangular coordinate system in space. Positive directions of an $X_e$ axis, a $Y_e$ axis, and a $Z_e$ axis in the left-hand rectangular coordinate system are defined as follows: The left hand is placed at a position of an origin, the thumb, the index finger, and the middle finger are at right angles to each other, when the thumb and index finger are on a same plane, the thumb points to the positive direction of the $X_e$ axis, and the middle finger points to the positive direction of the $Z_e$ axis, a direction to which the index finger points is the positive direction of the $Y_e$ axis.

For ease of description, in embodiments of this application, the $Y_e$ axis, a $Y_b$ axis, and a $Y_t$ axis, and positive directions of the $Y_e$ axis, the $Y_b$ axis, and the $Y_t$ axis are determined according to the rule of the right-hand rectangular coordinate system. A person skilled in the art should understand that determining the $Y_e$ axis, the $Y_b$ axis, the $Y_t$ axis, and the positive direction of the $Y_e$ axis, the $Y_b$ axis, and the $Y_t$ axis according to the rule of the left-hand rectangular coordinate system or in another manner also falls within the scope of this application. In addition, names of any two or more axes in any one of the first coordinate system, the second coordinate system, and a third coordinate system may be switched provided that the foregoing rule or manner is satisfied. Certainly, the positive directions of the three axes in the first coordinate system may alternatively be determined according to another rule. Details are not described herein again.

Optionally, the first coordinate system may be automatically established after a specific input is received, or may be pre-established.

For example, after the first electronic device 100 is installed according to a requirement of the prompt information, when the first electronic device 100 receives the specific input, the first electronic device 100 automatically establishes the first coordinate system. The specific input may be a user input, or may be a non-user input (for example, an instruction message from another device, for example, a remote control, is received).

For example, after the first electronic device 100 is installed according to a requirement of the prompt information, when the first electronic device 100 receives the specific input, the first electronic device 100 automatically invokes related information locally or from a server, to invoke the pre-established first coordinate system. Unless otherwise specified, the server in this application may be a hub device in a home, or may be a cloud server.

It should be noted that the point on the antenna 0 is used as the origin of the first coordinate system. This is merely an example. A point on another antenna (for example, the antenna 1) may alternatively be the origin of the first coordinate system.

(2) Establishment of the Second Coordinate System

For example, FIG. 10 shows a process of establishing the second coordinate system according to an embodiment of this application. As shown in (a) in FIG. 10, an edge contour of the second electronic device includes four sides: two vertical sides and two horizontal sides. $O_b$ is the gravity center or the center of the second electronic device. An axis that includes the point $O_b$ and parallel to the transverse edge of the second electronic device is an $X_b$ axis. A positive direction of the $X_b$ axis points to the right side of the second electronic device. An axis that includes the point $O_b$ and is parallel to the vertical edge of the second electronic device is a $Y_b$ axis. A positive direction of the $Y_b$ axis points to the upper side of the second electronic device. A pointing direction of the second electronic device is the positive direction of the $Y_b$ axis. A Z axis is perpendicular to a plane on which the $X_b$ axis and the $Y_b$ axis are located. A positive direction of the Z axis is determined according to a rule of a right-hand rectangular coordinate system. Optionally, $O_b$ may be the center of the second electronic device, or $O_b$ may be the center of an IMU module of the second electronic device (on a premise that the second electronic device includes the IMU module). (b) in FIG. 10 is a three-dimensional diagram of the second electronic device in (a) in FIG. 10.

It should be noted that FIG. 10 shows only an example of the second coordinate system. The second coordinate system may alternatively be defined according to another rule. For example, a coordinate origin $O_b$ may alternatively be any point on the second electronic device, or any point outside the second electronic device. In addition, directions of the three axes of the second coordinate system are not limited to the positive directions of the $X_b$ axis, the $Y_b$ axis, and the $Z_b$ axis shown in (a) or (b) in FIG. 10.

Optionally, the second coordinate system may be pre-established. For example, during delivery of the second electronic device, the second coordinate system has been established, and related information of the second coordinate system is stored locally or on a server. When the second electronic device is started or when the first electronic device receives a specific input, the second electronic device invokes the related information of the second coordinate system locally or from the server.

(3) Establishment of the Third Coordinate System

Figure 11:
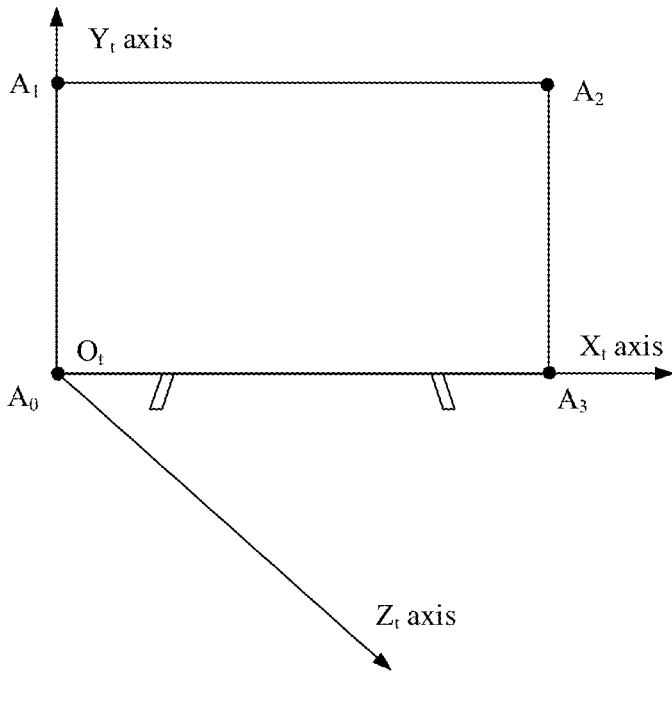
FIG. 11 is a schematic diagram of a manner of establishing a third coordinate system according to an embodiment of this application.

For example, FIG. 11 shows a process of establishing the third coordinate system according to an embodiment of this application. As shown in FIG. 11, an edge contour of the second electronic device includes four sides: a first side $A_0A_1$, a second side $A_1A_2$, a third side $A_2A_3$, and a fourth side $A_3A_0$. The first side $A_0A_1$ and the third side $A_2A_3$ are vertical sides, and the second side $A_1A_2$ and the fourth side $A_3A_0$ are horizontal sides. Optionally, an intersection (namely, the lower left corner of a display region of the second electronic device) at which the leftmost side of the display region of the second electronic device intersects with the bottommost side of the display region of the second electronic device is a coordinate origin $O_t$. An axis that includes the point $O_t$ and is parallel to $A_3A_0$ is an $X_t$ axis, and a positive direction of the $X_t$ axis is a pointing direction from a point $A_0$ to a point $A_3$. An axis that includes the point $O_t$ and is parallel to $A_0A_1$ is a $Y_t$ axis, and a positive direction of the $Y_t$ axis is a pointing direction from the point $A_0$ to a point $A_1$. A $Z_t$ axis is perpendicular to a plane on which the $X_t$ axis and the $Y_t$ axis are located. A positive direction of the $Z_t$ axis is determined according to a rule of a right-hand rectangular coordinate system.

It should be noted that FIG. 11 shows only an example of the third coordinate system. The third coordinate system may alternatively be defined according to another rule. Optionally, $O_t$ may be the center of the display region of the second electronic device, or any point of the display region of the second electronic device. In addition, the forward directions of the three axes of the third coordinate system are not limited to the forward direction indicated by the $X_t$ axis, the $Y_t$ axis, and the $Z_t$ axis shown in FIG. 11.

It should be noted that, when the edge contour of the display region of the second electronic device is an edge contour of the second electronic device, the point $A_0$ of the second electronic device coincides with the point $O_t$. When the edge contour of the display region of the second electronic device is not an edge contour of the second electronic device, for example, when there is a frame outside the display region of the second electronic device, the point $A_0$ of the second electronic device does not coincide with the point $O_t$.

Optionally, the third coordinate system may be pre-established. For example, during delivery of the second electronic device, the third coordinate system has been established, and related information of the third coordinate system is stored locally or on a server. When the second electronic device is started, or when the second electronic device receives a trigger, the second electronic device invokes the third coordinate system locally or from the server.

(4) Calculation of Coordinates in the First Coordinate System

With reference to FIG. 12(*a*) to FIG. 12(*f*), the following specifically describes a calculation principle of locating coordinates of the second electronic device 300 by the first electronic device 100 in the first coordinate system. In FIG. 12(*a*) to FIG. 12(*f*), the second electronic device 300 includes a UWB module. For example, the second electronic device 300 is a mobile device (for example, a smartphone or a remote control). As shown in FIG. 12(*a*), the first electronic device 100 and the second electronic device 300 are located in a same room or region. The first electronic device 100 has established the first coordinate system, and the second electronic device 300 has established the second coordinate system. As shown in FIG. 12(*b*), the first electronic device 100 and the second electronic device 300 may perform UWB communication. Accordingly, a distance between the second electronic device 300 and the first electronic device 100 and a direction of the second electronic device 300 relative to the first electronic device 100 may be determined. As a result, the coordinates of the second electronic device 300 in the first coordinate system may be determined.

1: Measure a distance L between the first electronic device and the second electronic device.

For example, as shown in FIG. 12(*c*), the distance L between the first electronic device and the second electronic device may be obtained in the following manner.

The first electronic device 100 may measure the distance L between the first electronic device 100 and the second electronic device 300 by using a two-way ranging method. The two-way ranging method includes a single-sided two-way ranging (SS-TWR) method and a double-sided two-way ranging (DS-TWR) method. The DS-TWR method is used as an example herein to briefly describe the ranging method.

In the DS-TWR method, a timestamp of a round trip between the first electronic device 100 and the second electronic device 300 is recorded, and finally time of flight is obtained. In the DS-TWR method, although response duration increases, a ranging error is reduced. The double-sided two-way ranging method includes two methods, namely, a four-message manner and a three-message manner, based on different quantities of sent messages.

The three-message manner is used as an example. The second electronic device 300 sends a ranging request packet (namely, a $1^{st}$ packet), and records a sending time point $T_{s1}$. After receiving the request packet, the first electronic device 100 records a receiving time point $T_{r1}$. A time difference t between $T_{r1}$ and $T_{s1}$ is transmission duration of the packet between the two devices. It takes $T_{re1}$ for the first electronic device 100 to process the request packet. Then, the first electronic device 100 sends a response packet (that is, a $2^{nd}$ packet), and records a sending time point $T_{s2}$. After receiving the response packet, the second electronic device 300 records a receiving time point $T_{r2}$. A time difference between $T_{r2}$ and $T_{s2}$ is t. A time difference between the time point at which the second electronic device 300 sends the $1^{st}$ packet and the time point at which the second electronic device 300 receives the $2^{nd}$ packet is a time difference $T_{ro1}$. It takes $T_{re2}$ for the second electronic device 300 to process the response packet. The second electronic device 300 sends a last packet (namely, a $3^{rd}$ packet), and records a sending time point $T_{s3}$.

The first electronic device 100 receives the $3^{rd}$ packet, and records a receiving time point $T_{r3}$. A time difference between $T_{r3}$ and $T_{s3}$ is t. In addition, a time difference from the time point at which the first electronic device 100 starts to send the $2^{nd}$ packet to the time point at which the first electronic device 100 receives the $3^{rd}$ packet is $T_{ro2}$. Consequently, transmission duration t of the packet between the two devices may be calculated according to the following formula (1), and the distance L between the first electronic device 100 and the second electronic device 300 may be calculated according to formula (2).

$$t = \frac{T_{ro1} \times T_{ro2} - T_{re1} \times T_{re2}}{T_{ro1} \times T_{ro2} + T_{re1} \times T_{re2}} \qquad \text{formula (1)}$$

$$L = c \times t \qquad \text{formula (2)}$$

Herein, c is a transmission rate of a UWB signal in a medium, and c is generally a light speed through selection.

Optionally, a ranging request packet may alternatively be sent by the first electronic device 100. Correspondingly, a response packet may alternatively be sent by the second electronic device 300. Correspondingly, a last packet may alternatively be sent by the first electronic device 100. The first electronic device 100 or the second electronic device 300 may calculate L according to formula (1) and formula (2).

It should be noted that the distance L between the first electronic device 100 and the second electronic device 300 may alternatively be obtained through calculation in another manner, without being limited to the manner enumerated above.

2: Determine the signal coming direction of the second electronic device.

A direction of the second electronic device 200 may be indicated by using a coming direction of a signal that is transmitted by the second electronic device 200 and that is measured by the first electronic device 100. In this application, two angles α and β may indicate the coming direction of the signal transmitted by the second electronic device 200. For example, as shown in FIG. 12(d), α is an included angle between a component that is of the UWB signal transmitted by the second electronic device and that is on a plane $X_eO_eY_e$ of the first coordinate system and a negative axis of the $X_e$ axis. Usually, α ∈ [0, π]. Herein, α may alternatively be understood, when it is assumed that a vector is constituted from the UWB module of the second electronic device to the UWB module of the first electronic device, as an included angle between a component of the vector on a plane $X_eO_eY_e$ and a negative axis of the $X_e$ axis. Herein, β is an included angle between the UWB signal transmitted by the second electronic device and a positive axis of the $Z_e$ axis of the first coordinate system. Usually, β ∈ [0, π]. β may alternatively be understood, when it is assumed that the vector is constituted from the UWB module of the second electronic device to the UWB module of the first electronic device, as an included angle between the vector and a positive axis of the $Z_e$ axis.

With reference to two antenna distribution types, namely, the L shape and the triangle, in the UWB module of the first electronic device, the following uses three antennas as an example to describe in detail a process of solving α and β.

Figure 12A:
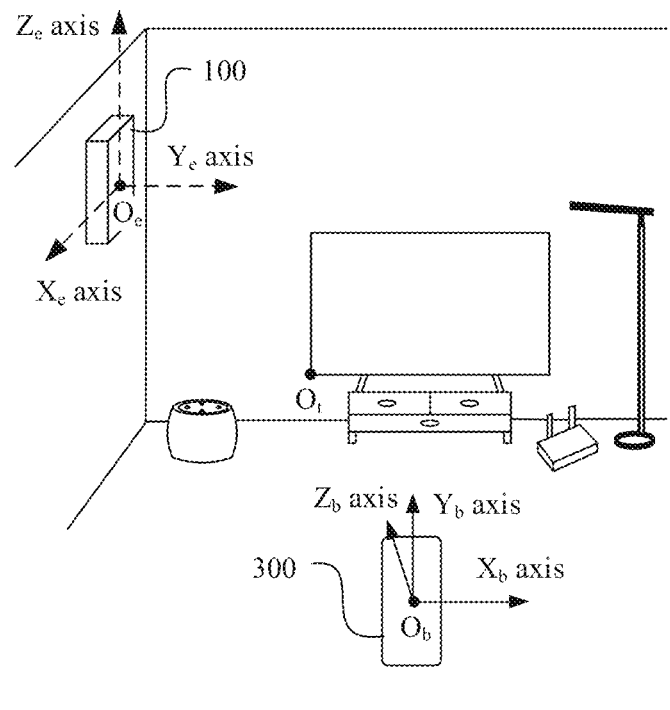
FIG. 12($a$) to FIG. 12($f$) are a schematic diagram of a principle of calculating coordinates of a second electronic device in a first coordinate system according to an embodiment of this application.
Figure 12B:
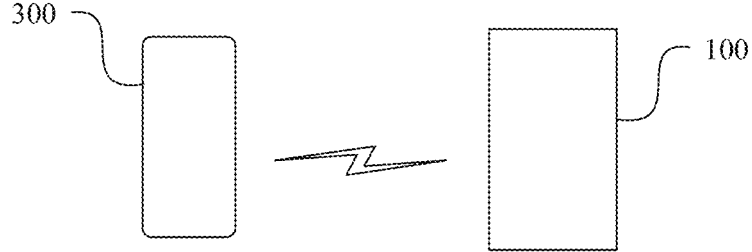
Figure 12C:
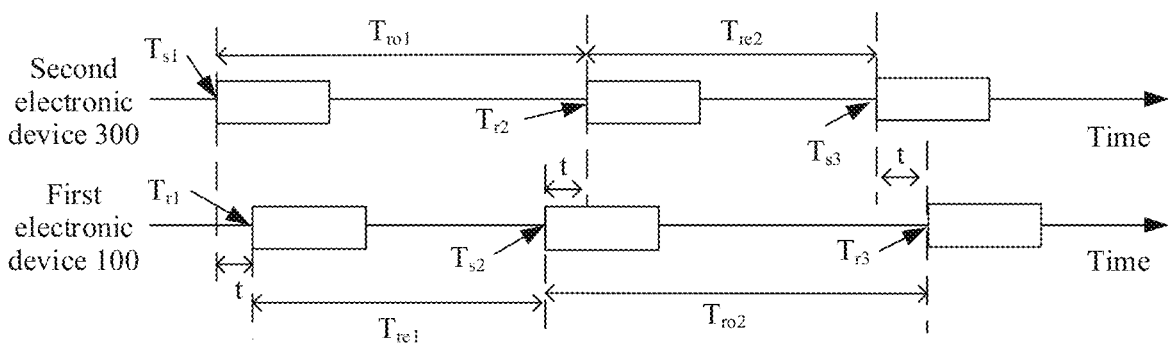
Figure 12D:
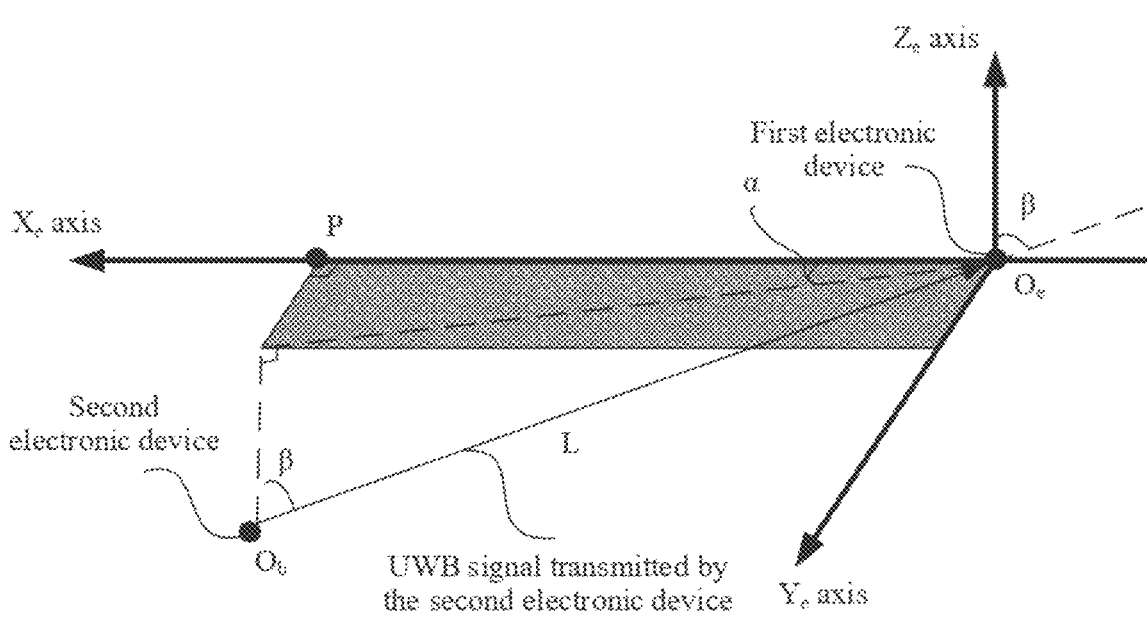
Figure 12E:
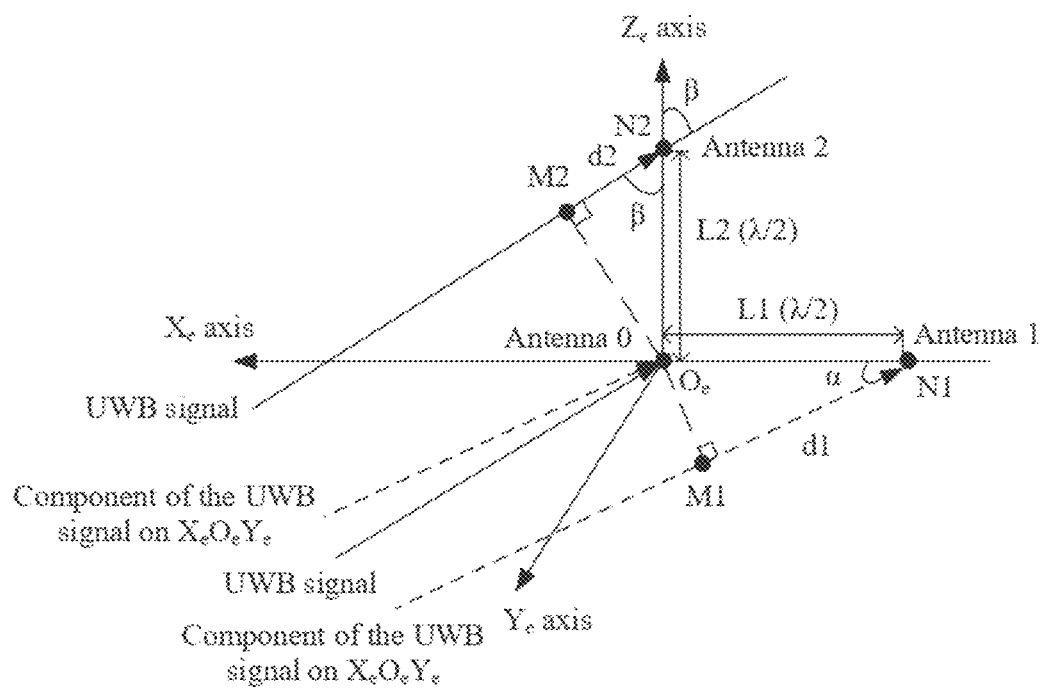

In an example, in FIG. 12(e), the UWB module of the first electronic device uses a three-antenna structure in the L shape. The first electronic device may determine the included angle α based on a UWB signal received by an antenna 1, and may determine the included angle β based on a UWB signal received by an antenna 2. Usually, L1 and L2 are far less than the distance L between the second electronic device and the first electronic device. As a result, when reaching the UWB module of the first electronic device, the UWB signals may be considered as being parallel. Similarly, when the UWB signals reach the UWB module of the first electronic device, components of the UWB signals on the plane $X_eO_eY_e$ may also be considered as being parallel. As shown in FIG. 12(e), the UWB signals are represented by using two parallel solid lines, and the components of the UWB signals on the plane $X_eO_eY_e$ are represented by using two parallel dotted lines. A distance between an antenna 0 and the antenna 1 is L1, and a distance between the antenna 0 and the antenna 2 is L2. A straight line on which M1N1 is located and that is perpendicular to $O_eM1$ is drawn passing through the point $O_e$. A straight line on which M2N2 is located and that is perpendicular to $O_eM2$ is drawn passing through the point $O_e$. N1 is an intersection of a straight line on which the component of the UWB signal on the plane $X_eO_eY_e$ is located and the $X_e$ axis. N2 is an intersection of a straight line on which the UWB signal is located and the $Z_e$ axis. An included angle between the UWB signal and the positive axis of the $Z_e$ axis is β. An included angle between the component of the UWB signal on the plane $X_eO_eY_e$ and the positive axis of the $X_e$ axis is α. Preferably, both L1 and L2 are λ/2. Herein, λ is a wavelength of the UWB signal. Phases that are of a same UWB signal and that are measured by the antenna 0, the antenna 1, and the antenna 2 are respectively $\varphi_0$, $\varphi_1$, and $\varphi_2$. A phase difference between the antenna 1 and the antenna 0 is that $\Delta\varphi_1 = \varphi_1 - \varphi_0$. A phase difference between the antenna 2 and the antenna 0 is that $\Delta\varphi_2 = \varphi_2 - \varphi_0$. Because $\varphi_0$, $\varphi_1$, and $\varphi_2$ are obtained through measurement, $\Delta\varphi_1$ and $\Delta\varphi_2$ can be obtained through calculation. Because λ/2 corresponds to a phase difference π, α and β may be obtained through calculation according to formula (3) and formula (4) with reference to a cosine formula, d1, d2, L1, and L2.

$$\alpha = \arccos\left(\frac{d1}{L1}\right) = \arccos\left(\frac{\Delta\varphi_1 \times (\lambda/2\pi)}{L1}\right) \qquad \text{formula (3)}$$

$$\beta = \arccos\left(\frac{d2}{L2}\right) = \arccos\left(\frac{\Delta\varphi_2 \times (\lambda/2\pi)}{L2}\right) \qquad \text{formula (4)}$$

When L1 is λ/2, $$\alpha = \arccos\left(\frac{\Delta\varphi_1 \times (\lambda/2\pi)}{\lambda/2}\right) = \arccos(\Delta\varphi_1/\pi).$$

When L2 is λ/2, $$\beta = \arccos\left(\frac{\Delta\varphi_2 \times (\lambda/2\pi)}{\lambda/2}\right) = \arccos(\Delta\varphi_2/\pi).$$

Figure 12F:
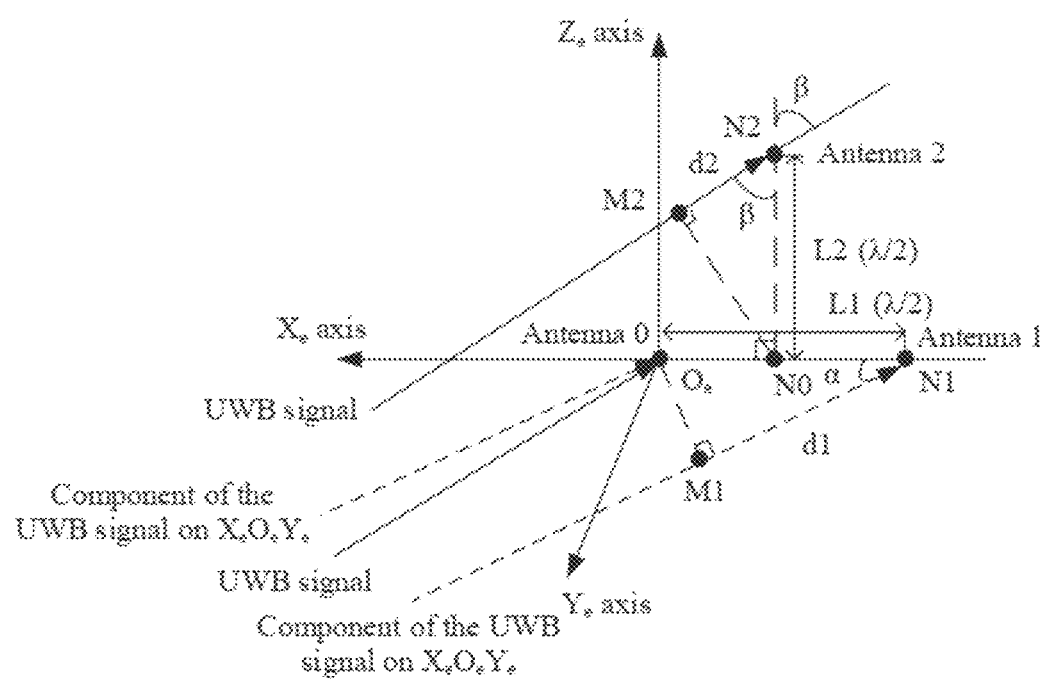

In an example, as shown in FIG. 12(f), the UWB module of the first electronic device uses a three-antenna structure in a shape of the triangle. The same as that in the descriptions in FIG. 12(e), when reaching the UWB module of the first electronic device, UWB signals may be considered as being parallel. Similarly, when the UWB signals reach the UWB module of the first electronic device, components of the UWB signals on the plane $X_eO_eY_e$ may also be considered as being parallel. As shown in FIG. 12(f), the UWB signals are represented by using two parallel solid lines, and the components of the UWB signals on the plane $X_eO_eY_e$ are represented by using two parallel dotted lines. A distance between an antenna 0 and an antenna 1 is L1. A distance between the projections of the antenna 0 and an antenna 2 on the $Z_e$ axis is L2. A point N0 is the center point of the antenna 1 and the antenna 0 on the $X_e$ axis. A straight line on which M1N1 is located and that is perpendicular to $O_e$M1 is drawn passing through the point $O_e$. A straight line on which M2N2 is located and that is perpendicular to N0M2 is drawn passing through the point NO. N1 is an intersection of a straight line on which a component of the UWB signal on the plane $X_eO_eY_e$ is located and the $X_e$ axis. N2 is an intersection of a straight line on which the UWB signal is located and the $Z_e$ axis.

An included angle between the UWB signal and the positive axis of the $Z_e$ axis is. An included angle between the component of the UWB signal on the plane $X_eO_eY_e$ and the negative axis of the $X_e$ axis is $\alpha$. Preferably, both L1 and L2 are $\lambda/2$. Herein, $\lambda$ is a wavelength of the UWB signal.

A calculation formula for $\alpha$ is the same as formula (3). Details are not described herein again. When $\beta$ is calculated, a difference between a phase $\varphi_0+\Delta\varphi_1/2$ obtained when the UWB signal transmitted by the second electronic device reaches N0 and a phase $\varphi_2$ obtained when the UWB signal transmitted by the second electronic device reaches the antenna 2 is first calculated, that is, $\varphi_2-(\varphi_0+\Delta\varphi_1/2)=\varphi_2-\Delta\varphi_1/2=\Delta\varphi_2-\Delta\varphi_1/2$.

Then, a wave path difference d2 obtained when the UWB signal transmitted by the second electronic device reaches NO and the UWB signal transmitted by the second electronic device reaches the antenna 2 is calculated according to formula (5). Next, R is obtained through calculation according to formula (6).

$$d2 = (\Delta\varphi_2 - \Delta\varphi_1/2) \times (\lambda/2\pi) \qquad \text{formula (5)}$$

$$\beta = \arccos(d2/L2) = \arccos\left(\frac{(\Delta\varphi_2 - \Delta\varphi_1/2) \times (\lambda/2\pi)}{L2}\right) \qquad \text{formula (6)}$$

3: Calculate the coordinates of the second electronic device in the first coordinate system based on the distance L between the second electronic device and the first electronic device and the signal coming direction of the second electronic device.

As shown in FIG. 12(d), the first electronic device may calculate, according to formula (7) based on the distance L between the second electronic device and the first electronic device and the signal coming direction (the angle $\alpha$ and the angle $\beta$) of the second electronic device, coordinates $(x_e, y_e, z_e)$ of the second electronic device in the first coordinate system established by the first electronic device.

$$\begin{cases} x^e = L\sin\beta\cos\alpha \\ y^e = L\sin\beta\sin\alpha \\ z^e = -R\cos\beta \end{cases} \qquad \text{formula (7)}$$

The first electronic device 100 and the second electronic device 300 may obtain the distance L between the first electronic device 100 and the second electronic device 300 through, for example, communication interaction shown in FIG. 12(c). The first electronic device 100 may determine the coming direction of the received UWB signal based on the UWB signal. In this way, the first electronic device 100 can obtain the direction and the distance of the second electronic device 300 relative to the first electronic device 100, to obtain the coordinates of the second electronic device 300 in the first coordinate system.

When some second electronic devices each include a UWB module, the coordinates of the second electronic device in the first coordinate system may be obtained in real time or cyclically through UWB signal communication between the second electronic device and the first electronic device.

When some second electronic devices each include no UWB module, for example, a smartphone includes a UWB module, a smart speaker includes no UWB module, or a smart air conditioner includes no UWB module, there may be two marking manners.

Figure 13A:
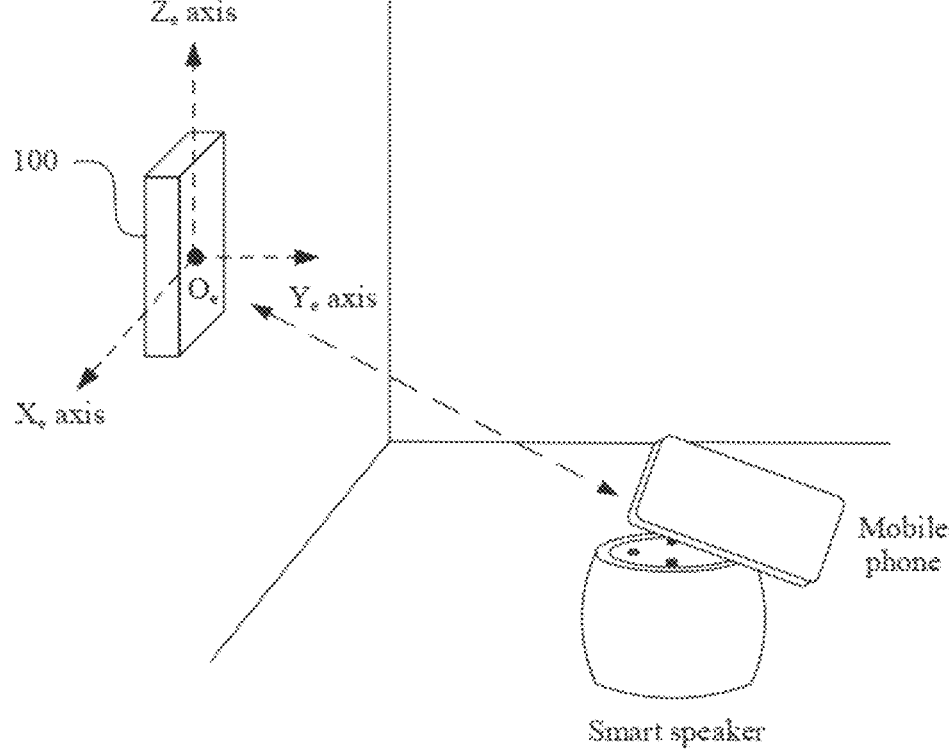
FIG. 13($a$) to FIG. 13($c$) are a schematic diagram of several manners of marking a second electronic device according to an embodiment of this application.

Marking manner 1: As shown in FIG. 13(a), the smartphone is moved to the smart speaker, coordinates of the smartphone in the first coordinate system are obtained through UWB signal communication between the smartphone and the first electronic device. The coordinates are marked as coordinates of the smart speaker in the first coordinate system.

Figure 13B:
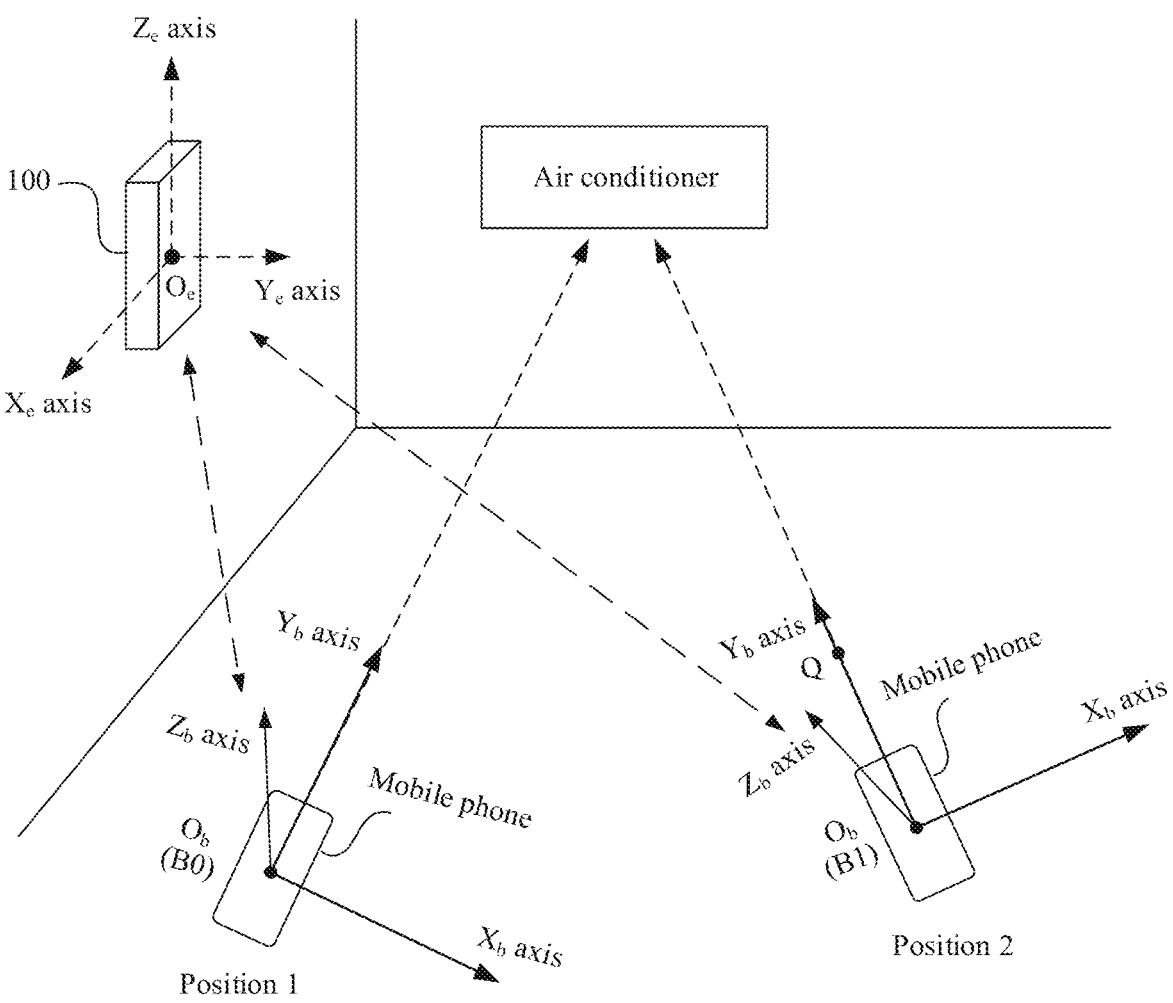

Marking manner 2: As shown in FIG. 13(b), the smartphone is first used to point to the smart air conditioner at a position 1, so that the $Y_b$ axis of the second coordinate system faces a first point (for example, a switch button) on the smart air conditioner. Coordinates 1 of the position 1 in the first coordinate system are obtained through UWB signal communication between the smartphone and the first electronic device. The smartphone further includes an IMU module. An attitude angle 1 of the smartphone at the position 1 is determined by using the IMU module. A straight line 1 established when the smartphone points to the first point on the smart air conditioner at the position 1 may be determined based on the coordinates 1 and the attitude angle 1. Then, the smartphone is used to point to the smart air conditioner at a position 2, so that the $Y_b$ axis of the second coordinate system faces the first point on the smart air conditioner. Coordinates 2 of the position 2 in the first coordinate system are obtained through UWB signal communication between the smartphone and the first electronic device. An attitude angle 2 of the smartphone at the position 2 is determined by using the IMU module. A straight line 2 established when the smartphone points to a second point on the smart air conditioner at the position 2 may be determined based on the coordinates 2 and the attitude angle 2. Coordinates, namely, coordinates of the smart air conditioner in the first coordinate system, of an intersection of the straight line 1 and the straight line 2 are calculated.

It should be noted that the smart speaker or the smart air conditioner are merely examples. The smart speaker is for representing a second electronic device easily touched by a mobile device, for example, the smartphone, held by the user. The smart air conditioner is for representing a second electronic device uneasily touched by a mobile device, for example, the smartphone, held by the user.

Figure 13C:
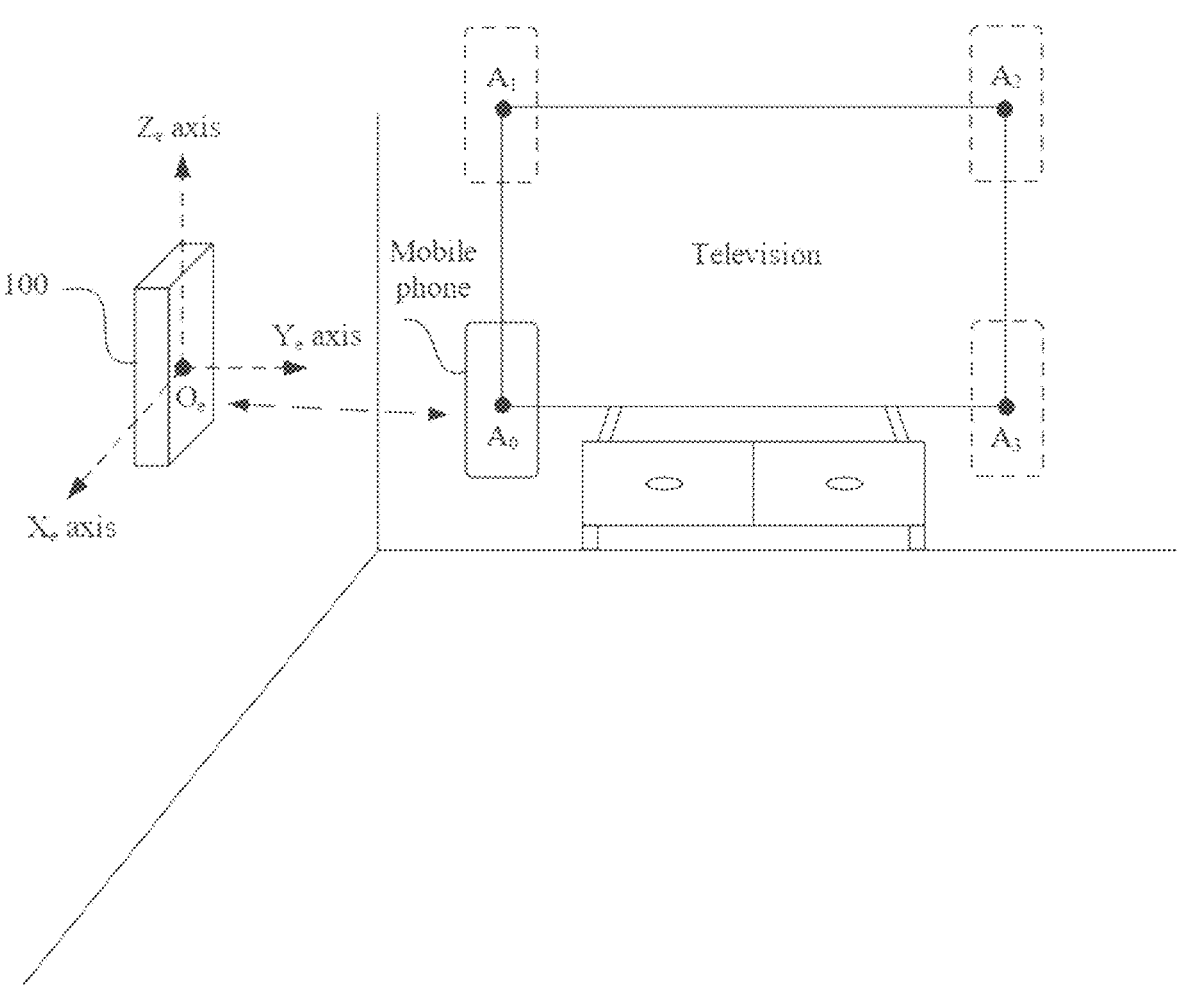

When some second electronic devices each include no UWB module, for example, a smartphone includes a UWB module, and a smart television includes no UWB module, the smart television may be marked a plurality of times by using the smartphone including the UWB module. As shown in FIG. 13(c), the smartphone is moved to a point $A_0$ of the smart television to mark a position. The first electronic device obtains coordinates of a lower left corner contour point of the smart television. Correspondingly, in the foregoing manner, the first electronic device may obtain coordinates of a plurality of contour points (for example, the lower left corner contour point, an upper left corner contour point, and a lower right corner contour point) of the smart television. If $A_0$, $A_1$, $A_2$, And $A_3$ are marked, the first electronic device may obtain coordinates of four corner contour points. If $A_0$, $A_1$, and $A_2$ are marked, the first electronic device may obtain coordinates of three corner contour points. If $A_0$ and $A_2$ are marked, the first electronic device may obtain coordinates of two corner contour points. In this application, which corner contour points are selected from the four corner contour points is not limited provided that a contour range of the smart television can be finally obtained. Optionally, the contour range may be a contour range of a display region of the smart television. Optionally, the display region may include a frame of a display of the smart television, or may include no frame of a display of the smart television.

Preferably, the smartphone may be moved to more than three different positions of the display region of the smart television. When being moved to one position of the display region of the smart television, coordinates of the smartphone are marked as coordinates of the position of the display region of the smart television based on input of the user. In this way, the operation is repeated, and coordinates of the more than three different positions of the display region of the smart television may be marked. Optionally, coordinates of three positions of the display region of the smart television are marked. Similarly, coordinates of a position in a front region of the smart television may be marked. In a process of marking the more than three different positions of the display region of the smart television, pointing directions, orientations, and the like of the smartphone at the more than three different positions are not required to be consistent. In other words, an orientation, a pointing direction, and the like of the smart television during marking are not limited.

Optionally, the more than three positions of the display region of the smart television may be more than three positions (for example, a ½ place and a ⅓ place) on an edge contour of the display region (for example, a horizontal side contour or a vertical contour of the display region) of the smart television, or may be at least three positions in a central part of the display region of the smart television.

Optionally, the second electronic device including the UWB module may not only mark the second electronic device including no UWB module, but also mark a spatial region, for example, mark a range of a three-dimensional spatial region. The following uses, as an example, the smartphone including the UWB module.

Figure 14:
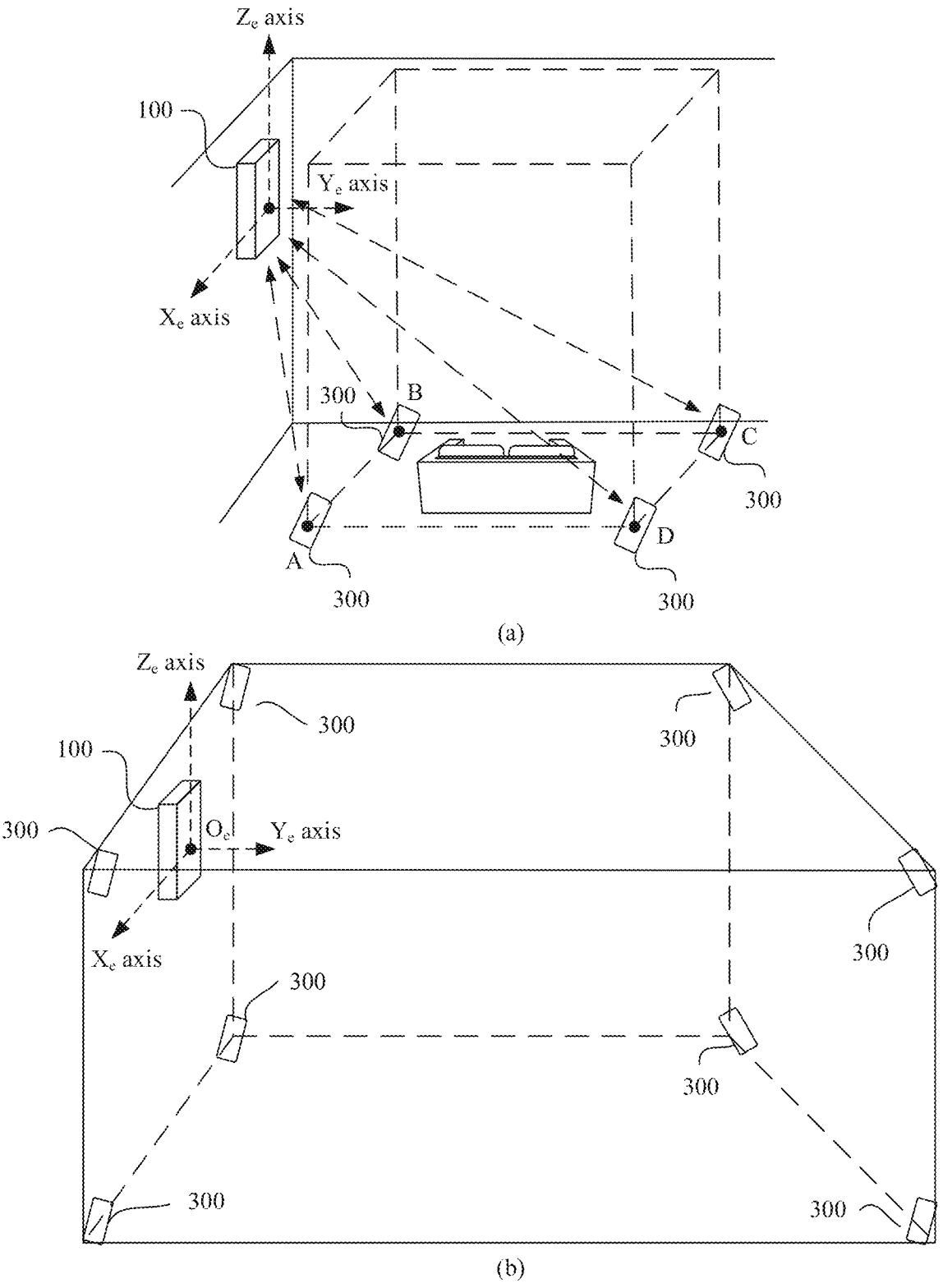
FIG. 14 is a schematic diagram of a manner of marking a spatial region according to an embodiment of this application.

For example, as shown in (a) in FIG. 14, the smartphone is separately placed at four positions A, B, C, and D. The first electronic device 100 separately obtains coordinates $$(x_A^e,$$

$$y_A^e,$$

$$z_A^e)$$

$$(x_B^e,$$

$$y_B^e,$$

$$z_B^e),$$

$$(x_C^e,$$

$$y_C^e,$$

$$z_C^e),$$

and $$(x_D^e,$$

$$y_D^e,$$

$$z_D^e)$$

of the four positions A, B, C, and D in the first coordinate system based on the foregoing principle. A vertical line $$(x_A^e,$$

$$y_A^e$$

$$z^e)$$ passing through the position A, a vertical line $$(x_B^e,$$

$$y_B^e,$$

$z^e$) passing through the position B, a vertical line $$(x_C^e$$

$$y_C^e,$$

$z^e$) passing through the position C, and a vertical line $$x_D^e,$$

$$y_D^e,$$

$z^e$) passing through the position D constitute a three-dimensional region through enclosure. Herein, $z^e$ may be a preset value, or may be a height of the room or the region.

In another example, as shown in (b) in FIG. 14, the smartphone is separately placed at eight vertex positions of a three-dimensional spatial region. The first electronic device 100 separately obtains coordinates of the eight vertex positions in the first coordinate system based on the foregoing principle. In this way, a coordinate range of the three-dimensional spatial region can be obtained. For example, the three-dimensional spatial region is a room. In other words, a coordinate range of the room in the first coordinate system is obtained. The foregoing uses only the vertex position as an example. An actual region may be determined based on a position in which the smartphone is placed. For example, the smartphone may not be placed at the vertex position. In this way, a determined region is a region less than an entire region of the room.

(5) UWB-Based Conversion Between Different Coordinate Systems

In this application, coordinate conversion in the different coordinate systems may be performed in a vector manner. Specifically, distances between two points are the same in the different coordinate systems, but direction representations of vectors constituted by the two points may be different in the different coordinate systems. For example, coordinates of the point $O_e$ in the first coordinate system may be converted into coordinates of the point $O_e$ in the second coordinate system in the vector manner. For example, conversion is performed in a manner of $\overrightarrow{O_eO_b}$.

Distances (which are both L) of the vector $\overrightarrow{O_eO_b}$ in the first coordinate system and the second coordinate system are the same, but a direction that is of the vector $\overrightarrow{O_eO_b}$ and that is represented by using the first coordinate system is different from a direction that is of the vector $\overrightarrow{O_eO_b}$ and that is represented by using the second coordinate system. By obtaining a relative direction change between the first coordinate system and the second coordinate system, the direction that is of the vector $\overrightarrow{O_eO_b}$ and that is represented by using the second coordinate system may be learned when the direction that is of the vector $\overrightarrow{O_eO_b}$ and that is represented by using the first coordinate system is known. The coordinates of the point $O_e$ in the second coordinate system may be obtained with reference to coordinates of the point $O_e$ and the point $O_b$ in the first coordinate system and coordinates of the point $O_b$ in the second coordinate system.

The foregoing coordinate conversion manner of a same point in the different coordinate systems is merely an example. A coordinate conversion manner is not limited in this application.

A relative direction change of the different coordinate systems may be expressed by using a pitch φ, a yaw ψ, and a roll θ that are between the coordinate systems, for example, a pitch, a yaw, and a roll of the second coordinate system relative to the first coordinate system, and a pitch, a yaw, and a roll of the third coordinate system relative to the first coordinate system. The yaw may also be referred to as a drift angle or a heading angle. In order to obtain a pitch, a yaw, and a roll between the three coordinate systems, it is necessary to first assume that the coordinate origins of the three coordinate systems are converged to one point. For example, the coordinate origin $O_e$ of the UWB base station is moved in parallel to the coordinate origin $O_b$ of the second coordinate system. Correspondingly, the first coordinate system is also moved accordingly. Definitions of the pitch, the yaw, and the roll are well known to a person skilled in the art. Details are not described herein again.

Figure 15:
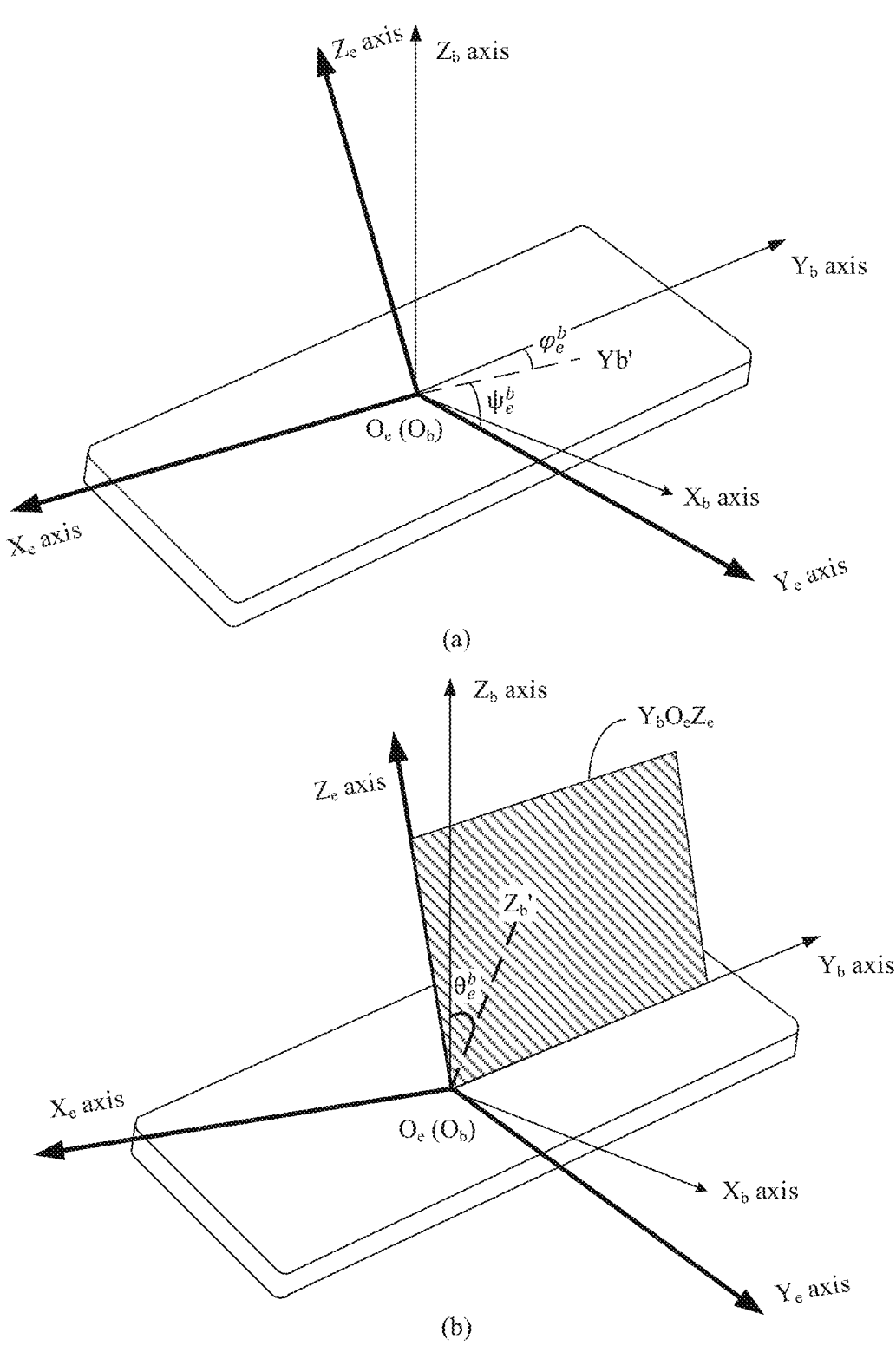
FIG. 15 is a schematic diagram of a pitch $$\varphi_e^b,$$

For example, FIG. 15 shows a pitch $$\varphi_e^b,$$

a yaw $$\psi_e^b,$$

and a roll $$\theta_e^b$$

of the second coordinate system relative to the first coordinate system.

The coordinate origin $O_b$ of the second coordinate system coincides with the coordinate origin $O_e$ of the first coordinate system after parallel movement. The three axes of the second coordinate system are the $X_b$ axis, the $Y_b$ axis, and the $Z_b$ axis. The three axes of the first coordinate system are the $X_e$ axis, the $Y_e$ axis, and the $Z_e$ axis. As shown in (a) in FIG. 15, $O_eY_b'$ (namely, $O_bY_b'$) is a projection of the $Y_b$ axis on the plane $X_eO_eY_e$ of the first coordinate system. As shown in (b) in FIG. 15, $O_eZ_b'$ (namely, $O_bZ_b'$) is a projection of the $Z_b$ axis on a plane $Y_bO_bZ_e$.

The pitch $$\varphi_e^b$$

of the second coordinate system relative to the first coordinate system is an included angle between the $Y_b$ axis of the second coordinate system and the plane $X_eO_eY_e$ of the first coordinate system. In other words, $$\varphi_e^b$$

is an included angle between $O_b Y_b'$ and the $Y_b$ axis. When a component of $O_b Y_b$ on the $Z_e$ axis is located on the positive axis of the $Z_e$ axis, $$\varphi_e^b$$

is positive. When a component of $O_b Y_b$ on the $Z_e$ axis is located on a negative axis of the $Z_e$ axis, $$\varphi_e^b$$

is negative.
The yaw $$\psi_e^b$$

of the second coordinate system relative to the first coordinate system is an included angle between the projection of the $Y_b$ axis of the second coordinate system on the plane $X_e O_e Y_e$ of the first coordinate system and the $Y_e$ axis of the first coordinate system. In other words, $$\psi_e^b$$

is an included angle between $O_b Y_b'$ and the $Y_e$ axis. When a component of $O_b Y_b'$ on the $X_e$ axis is located on the positive axis of the $X_e$ axis, $$\psi_e^b$$

is positive. When a component of $O_b Y_b'$ on the $X_e$ axis is located on the negative axis of the $X_e$ axis, $$\psi_e^b$$

is negative.
The roll $$\theta_e^b$$

of the second coordinate system relative to the first coordinate system is an included angle between the $Z_b$ axis of the second coordinate system and a plane $Y_b O_e Z_e$. In other words, $$\theta_e^b$$

is an included angle between $O_b Z_b'$ and the $Z_b$ axis. When a component that is of a projection of a positive axis of the $Z_b$ axis on the plane $Y_b O_e Z_e$ and that is on the $X_b$ axis is located on a positive axis of the $X_b$ axis, $$\theta_e^b$$

is positive. When a component that is of a projection of a positive axis of the $Z_b$ axis on the plane $Y_b O_e Z_e$ and that is on the $X_b$ axis is located on a negative axis of the $X_b$ axis, $$\theta_e^b$$

is negative.
Alternatively, when a component that is of a projection of $O_b Z_b'$ on a plane $X_b O_b Y_b$ and that is on the $X_b$ axis is located on a positive axis of the $X_b$ axis, $$\theta_e^b$$

is positive. When a component that is of a projection of $O_b Z_b'$ on a plane $X_b O_b Y_b$ and that is on the $X_b$ axis is located on a negative axis of the $X_b$ axis, $$\theta_e^b$$

is negative.
For example, FIG. 16 shows a pitch $$\varphi_e^t,$$

a yaw $$\psi_e^t,$$

and a roll $$\theta_e^t$$

of the third coordinate system relative to the first coordinate system.

As shown in FIG. 16, the coordinate origin $O_t$ of the third coordinate system coincides with the coordinate origin $O_e$ of the first coordinate system after parallel movement. The three axes of the third coordinate system are the $X_t$ axis, the $Y_t$ axis, and the $Z_t$ axis. The three axes of the first coordinate system are the $X_e$ axis, the $Y_e$ axis, and the $Z_e$ axis. As shown in (a) in FIG. 16, $O_e Y_t'$ (namely, $O_t Y_t'$) is a projection of the $Y_t$ axis on the plane $X_e O_e Y_e$ of the first coordinate system. As shown in (b) in FIG. 16, $O_t Z_t'$ (namely, $O_t Z_t'$) is a projection of the $Z_t$ axis on a plane $Y_t O_e Z_e$.

The pitch $$\varphi_e^t$$

of the third coordinate system relative to the first coordinate system is an included angle between the $Y_t$ axis of the third coordinate system and the plane $X_eO_eY_e$ of the first coordinate system. In other words, $$\varphi_e^t$$

is an included angle between $O_eY_t'$ (namely, $O_tY_t'$) and the $Y_t$ axis. When a component of $O_eY_t$ on the $Z_e$ axis is located on the positive axis of the $Z_e$ axis, $$\varphi_e^t$$

is positive. When a component of $O_eY_t$ on the $Z_e$ axis is located on the negative axis of the $Z_e$ axis, $$\varphi_e^t$$

is negative.

The yaw $$\psi_e^t$$

of the third coordinate system relative to the first coordinate system is an included angle between the projection of the $Y_t$ axis of the third coordinate system on the plane $X_eO_eY_e$ of the first coordinate system and the $Y_e$ axis of the first coordinate system. In other words, $$\psi_e^t$$

is an included angle between $O_eY_t'$ (namely, $O_tY_t'$) and the $Y_e$ axis. When a component of $O_eY_t'$ on the $X_e$ axis is located on the positive axis of the $X_e$ axis, $$\psi_e^t$$

is positive. When a component of $O_eY_t'$ on the $X_e$ axis is located on the negative axis of the $X_e$ axis, $$\psi_e^t$$

is negative.

The roll $$\theta_e^t$$

of the third coordinate system relative to the first coordinate system is an included angle between the $Z_t$ axis of the third coordinate system and the plane $Y_tO_eZ_e$. In other words, $$\theta_e^t$$

is an included angle between $O_tZ_t'$ and the $Z_t$ axis. When a component that is of a projection of a positive axis of the $Z_t$ axis on the plane $Y_tO_eZ_e$ and that is on the $X_t$ axis is located on a positive axis of the $X_t$ axis, $$\theta_e^t$$

is positive. When a component that is of a projection of a positive axis of the $Z_t$ axis on the plane $Y_tO_eZ_e$ and that is on the $X_t$ axis is located on a negative axis of the $X_t$ axis, $$\theta_e^t$$

is negative.

Alternatively, when a component that is of a projection of $O_tZ_t'$ on a plane $X_tO_tY_t$ and that is on the $X_t$ axis is located on a positive axis of the $X_t$ axis, $$\theta_e^t$$

is positive. When a component that is of a projection of $O_tZ_t'$ on a plane $X_tO_tY_t$ and that is on the $X_t$ axis is located on a negative axis of the $X_t$ axis, $$\theta_e^t$$

is negative.

A direction change of the third coordinate system relative to the first coordinate system may be expressed by using an attitude matrix $C_e^t$.

$$C_e^t = \qquad \text{formula (8)}$$

$$\begin{bmatrix} \cos\theta_e^t\cos\psi_e^t + \sin\varphi_e^t\sin\theta_e^t\sin\psi_e^t & -\cos\theta_e^t\sin\psi_e^t + \sin\varphi_e^t\sin\theta_e^t\cos\psi_e^t & -\cos\varphi_e^t\sin\theta_e^t \\ \cos\varphi_e^t\sin\psi_e^t & \cos\varphi_e^t\cos\psi_e^t & \sin\varphi_e^t \\ \sin\theta_e^t\cos\psi_e^t - \sin\varphi_e^t\cos\theta_e^t\sin\psi_e^t & -\sin\theta_e^t\sin\psi_e^t - \sin\varphi_e^t\cos\theta_e^t\cos\psi_e^t & \cos\varphi_e^t\cos\theta_e^t \end{bmatrix}$$

The foregoing formula (8) for the attitude matrix $$C_e^t$$

is the conventional technology, and may be obtained by a person skilled in the art from the conventional technology, for example, the attitude matrix in Chapter 1.2.1 in the book Inertial Navigation (Beijing: Science Press, ISBN 7-03-016428-8, Qin Yongyuan, first edition in May 2006, first printing in May 2006).

The foregoing only shows examples of conversion of the second coordinate system and the third coordinate system relative to the first coordinate system. A person skilled in the art should understand that conversion of another coordinate system is also performed according to the same formula based on the foregoing principle, and only a corresponding parameter is modified.

Optionally, the second electronic device may include the IMU module. Optionally, the IMU module of the second electronic device is first calibrated. To be specific, a coordinate system on which a pitch, a yaw, and a roll that are output by the IMU module of the second electronic device are based is calibrated to the first coordinate system, or $$C_b^e$$

output by the IMU module of the second electronic device is calibrated to $$\begin{bmatrix} 1 & 0 & 0 \\ 0 & 1 & 0 \\ 0 & 0 & 1 \end{bmatrix}.$$

In this way, as the second electronic device is subsequently moved, the pitch, the yaw, and the roll that are output by the IMU module of the second electronic device are the pitch, the yaw, and the roll of the second coordinate system relative to the first coordinate system. Alternatively, $$C_b^e$$

output by the IMU module of the second electronic device is transposed, to reflect a direction change of the second coordinate system relative to the first coordinate system.

For example, the second coordinate system of the second electronic device may be enabled to be parallel to the first coordinate system (for example, the $X_b$ axis is parallel to the $X_e$ axis, the $Y_b$ axis is parallel to the $Y_e$ axis, and the $Z_b$ axis is parallel to the $Z_e$ axis), and positive directions of corresponding coordinate axes of the two coordinate systems are enabled to be the same (for example, the positive direction of the $X_b$ axis is the same as the positive direction of the $X_e$ axis, the positive direction of the $Y_b$ axis is the same as the positive direction of the $Y_e$ axis, and the positive direction of the $Z_b$ axis is the same as the positive direction of the $Z_e$ axis). In this case, a pitch, a yaw, and a roll that are output by the IMU module of the second electronic device are set to 0.

For example, the second coordinate system of the second electronic device may be enabled to be parallel to the first coordinate system, and positive directions of all axes of the two coordinate systems are enabled to be the same. In this case, the IMU module of the second electronic device outputs $$C_b^e = \begin{bmatrix} 1 & 0 & 0 \\ 0 & 1 & 0 \\ 0 & 0 & 1 \end{bmatrix}$$

through adjustment.

(6) Establishment of a Fourth Coordinate System (Millimeter-Wave Radar Coordinate System)

The millimeter-wave radar module 160 of the first electronic device 100 is configured to implement a function of the millimeter-wave radar. A plurality of antennas in the millimeter-wave radar have a distance difference in a transverse direction (for example, a horizontal direction) and/or a longitudinal direction (for example, a vertical direction). A coordinate system (the fourth coordinate system) of the millimeter-wave radar may be established by using the distance difference between the antennas.

In an example, the millimeter-wave radar module 160 includes three transmit antennas and four receive antennas. For example, as shown in FIG. 17, the three transmit antennas and the four receive antennas are located on a same longitudinal plane (for example, a vertical plane). The three transmit antennas are distributed in a shape of a triangle on the longitudinal plane. A transmit antenna 0 and a transmit antenna 2 are located on a same transverse plane. The four receive antennas are located on a same transverse line (for example, a horizontal line). In an implementation, a point (for example, an end point on one side) on the receive antenna 0 is used as an origin $O_m$ of the fourth coordinate system. A connection line between the receive antenna 0 and a receive antenna 1 is used as an $X_m$ axis of the fourth coordinate system. In addition, a direction in which the receive antenna 1 points to the receive antenna 0 is a positive direction of the $X_m$ axis. A straight line that passes through the origin $O_m$ and is perpendicular to the $X_m$ axis is a $Z_m$ axis of the fourth coordinate system. In addition, a direction pointing to a zenith direction is a positive direction of the $Z_m$ axis. Then, a $Y_m$ axis of the fourth coordinate system and a positive direction of the $Y_m$ axis are determined with reference to a rule of a right-hand rectangular coordinate system. Optionally, prompt information may be marked on the outer surface of the first electronic device 100, and is for prompting a correct installation manner or a correct placement manner. In this way, the three transmit antennas and the four receive antennas of the millimeter-wave radar module 160 in the first electronic device 100 are located on the same longitudinal plane.

Names of the three axes in the fourth coordinate system and positive directions of the three axes may alternatively be defined in another manner. Details are not described herein again. The $X_m$ axis, the $Y_m$ axis, and the $Z_m$ axis in the fourth coordinate system shown in FIG. 17 are used as an example for description in embodiments of this application.

It should be noted that the point on the receive antenna 0 is used as the origin of the fourth coordinate system, which is merely an example. A point on another antenna (for example, the receive antenna 1) may alternatively be the origin of the fourth coordinate system.

Optionally, the fourth coordinate system may be preestablished. An installation worker only needs to install the first electronic device 100 as required. For example, before delivery of the first electronic device 100, the fourth coordinate system has been established, and related information of the fourth coordinate system is stored locally or on a server. When the first electronic device 100 is started, or when the first electronic device 100 receives a specific trigger, the first electronic device 100 invokes the related information of the fourth coordinate system locally or from the server. Unless otherwise specified, the server in this application may be a hub device 200 in a home, or may be a cloud server.

Preferably, the outer surface of the first electronic device 100 may have only one piece of marked prompt information. The marked prompt information indicates installation of the first electronic device. In this way, the transmit antenna and the receive antenna of the millimeter-wave radar module, and the antenna of the UWB module all meet a preset requirement.

(7) Calculation of Coordinates in the Fourth Coordinate System

1: Determine a distance between a reflection point and the millimeter-wave radar module, and a radial speed of the reflection point.

(1) Determine the Distance Between the Reflection Point and the Millimeter-Wave Radar Module.

The transmit antenna of the millimeter-wave radar module 160 transmits a signal. The signal is reflected by the reflection point, and then is received by the receive antenna of the millimeter-wave radar module 160. A frequency at which an LFMCW millimeter-wave radar transmits a signal increases linearly as time varies. This type of signal is referred to as a chirp signal. With reference to FIG. 5B, the millimeter-wave radar module 160 receives the chirp signal through the receive antenna. The received signal and a local oscillator signal are mixed by the mixer, and a difference frequency signal is output. The difference frequency signal is filtered and amplified by the filter and the sampling module, and then undergoes analog-to-digital conversion to become a digital difference frequency signal.

For example, FIG. 18 is a schematic diagram of a principle of determining the distance and the radial speed of the reflection point by the millimeter-wave radar according to an embodiment of this application. As shown in (a) in FIG. 18, a solid line is the transmitted signal of the millimeter-wave radar module 160, and a dotted line is the received signal of the millimeter-wave radar module 160. For a chirp signal, one frequency sweep cycle Tc is usually at a microsecond (ρs) level, and a frequency modulation rate $S_0$ (namely, a frequency change rate) reaches an order of magnitude of $10^{12}$ (unit: Hz/s). In this embodiment of this application, a chirp signal in one frequency sweep cycle Tc is referred to as one chirp signal. Usually, it is considered that a spatial position of the target within one frequency sweep cycle Tc remains unchanged.

As shown in (b) in FIG. 18, in one frequency sweep cycle Tc, the transmit antenna transmits the chirp signal. After duration $\tau$, the receive antenna receives a signal reflected back from the reflection point. A frequency difference between the received signal and the transmitted signal is $\tau*S_0$. The frequency difference between the received signal and the transmitted signal is a frequency $f_0$ of the difference frequency signal. In other words, $f_0=\tau*S_0$. Herein, $\tau=2d/c$, d is the distance between the reflection point and the millimeter-wave radar module (which may also be considered as the first electronic device), and c is a rate at which the chirp signal is transmitted in the air, and is generally a light speed through selection. Therefore, a relationship between the distance d of the reflection point and the frequency $f_0$ of the difference frequency signal is shown in formula (9).

$$d=f_0\times c/(2\times S_0) \qquad\qquad \text{formula (9)}$$

A time-domain signal may be converted into a frequency-domain signal through a Fourier transform. A sine wave in time domain correspondingly generates a peak value in frequency domain. The peak value corresponds to the frequency $f_0$ of the difference frequency signal. For example, as shown in (c) in FIG. 18, the transmitted signal of the millimeter-wave radar module is reflected back by three reflection points, to obtain three signals. The millimeter-wave radar module receives the three received signals, and separately obtains three corresponding difference frequency signals. A fast Fourier transform (FFT) is performed on the three difference frequency signals to obtain a range curve (referred to as a range FFT), and a spectrum having three different separated peaks may be generated. Each peak value indicates that there is one reflection point in a corresponding place. A frequency of the difference frequency signal may be obtained by calculating a frequency corresponding to the peak value. A distance of the reflection point may be obtained by detecting the frequency of the difference frequency signal.

Similarly, a Doppler FFT is performed on a plurality of difference frequency signals from a same reflection point within different frequency sweep cycles Tc, to obtain a phase difference between the plurality of difference frequency signals. A radial speed of the reflection point may be obtained by detecting the phase difference between the plurality of difference frequency signals. For a detailed principle, refer to the conventional technology. Details are not described herein again.

The millimeter-wave radar module receives the chirp signal, performs mixing, power amplification, and filtering on the transmitted signal and the received signal to obtain the difference frequency signal. The analog-to-digital conversion is performed on the difference frequency signal, to obtain the digital difference frequency signal. The distance and the radial speed of the reflection point may be obtained by detecting the digital difference frequency signal.

For example, as shown in (d) in FIG. 18, a frame of data of the millimeter-wave radar module is data within one radar scanning cycle. One radar scanning cycle includes M frequency sweep cycles Tc. There are N sampling points of a difference frequency signal in each frequency sweep cycle Tc.

A one-dimensional range FFT may be performed on a digital difference frequency signal within one frequency sweep cycle Tc, to obtain a frequency of the difference frequency signal. In this way, the distance of the reflection point can be calculated based on the frequency of the difference signal. A quantity of points in the range FFT is a quantity N of sampling points of the difference frequency signal corresponding to the chirp signal.

A one-dimensional Doppler FFT may be performed on digital difference frequency signals from a same reflection point within a plurality of adjacent frequency sweep cycles Tc, to obtain a phase difference between the plurality of difference frequency signals. In this way, the radial speed of the reflection point can be calculated based on the phase difference between the plurality of difference frequency signals. A quantity of points in the Doppler FFT is a quantity of frequency sweep cycles included in the frame of data.

A combined operation of the range FFT and the Doppler FFT may be considered as a two-dimensional FFT performed on the frame of data. In embodiments of this application, a frame of data obtained after two-dimensional FFT processing is referred to as a frame of two-dimensional FFT data. For example, (e) in FIG. 18 is a schematic diagram of the frame of two-dimensional FFT data obtained by the millimeter-wave radar module. As shown in (e) in FIG. 18, there are a plurality of peak values in the frame of two-dimensional FFT data. Each peak value indicates that there is one reflection point in a corresponding place. A value of the reflection point in a distance dimension or a speed dimension is a distance of the reflection point or a radial speed of the reflection point.

(2) Determine a Signal Coming Direction of the Reflected Signal from the Reflection Point.

The signal coming direction of the reflected signal includes a transverse coming direction (for example, a horizontal coming direction) and a longitudinal coming direction (for example, a vertical coming direction). A yaw may be used to represent a transverse coming direction of a signal, and a pitch may be used to represent a longitudinal coming direction of the signal. In an implementation, the yaw and the pitch may be calculated by using a phase difference between received signals of the plurality of receive antennas of the millimeter-wave radar module.

For example, FIG. 19(*a*) to FIG. 19(*c*)-2 are a schematic diagram of a principle of determining the signal coming direction of the reflected signal from the reflection point by the millimeter-wave radar according to an embodiment of this application. As shown in FIG. 19(*a*), the millimeter-wave radar module includes four receive antennas. A phase difference between reflected signals that reach any two different receive antennas after signals transmitted by a same transmit antenna are reflected by the reflection point may be used by the millimeter-wave radar module to measure a yaw of the reflected signal. For a specific manner in which the millimeter-wave radar module determines a transverse coming direction of the reflected signal based on a phase difference obtained when signals reach two adjacent receive antennas, refer to the method for calculating the angle α in FIG. 12(*e*). Details are not described herein again.

In an implementation, precision of measuring the signal coming direction may be improved by increasing a quantity of antennas. In an example, the antennas of the millimeter-wave radar module are of the distribution structure shown in (a) in FIG. 8. When the millimeter-wave radar module transmits signals, the transmit antenna may be switched by changing the relay switch, to separate signals of different transmit antennas by the receive antennas. For example, as shown in FIG. 19(*b*)-1 and FIG. 19(*b*)-2, when a transmit antenna 0 and a transmit antenna 2 alternately transmit signals, an effect that two transmit antennas and four receive antennas are equivalent to one transmit antenna and eight receive antennas may be implemented based on a principle that a phase difference is generated by a position difference between the antennas. For example, in FIG. 19(*b*)-1 and FIG. 19(*b*)-2, a distance between the receive antennas is $\lambda_L/2$, and a distance between the transmit antenna 0 and the transmit antenna 2 is $2\lambda_L$, where $4_L$ is a wavelength of a millimeter wave. A signal that is of the transmitted signal of the transmit antenna 2 and that reaches a receive antenna 0 may be equivalent to a received signal of a receive antenna 4. A signal that is of the transmitted signal of the transmit antenna 2 and that reaches a receive antenna 1 may be equivalent to a received signal of a receive antenna 5. A signal that is of the transmitted signal of the transmit antenna 2 and that reaches a receive antenna 2 may be equivalent to a received signal of a receive antenna 6. A signal that is of the transmitted signal of the transmit antenna 2 and that reaches a receive antenna 3 may be equivalent to a received signal of a receive antenna 7. For example, the receive antenna 4, the receive antenna 5, the receive antenna 6, and the receive antenna 7 in the schematic diagram of the transmit antenna and the eight receive antennas in FIG. 19(*b*)-1 and FIG. 19(*b*)-2 are equivalently obtained virtual receive antennas.

A phase difference obtained when signals transmitted by transmit antennas between which there is a distance in a longitudinal dimension reach the receive antenna after being reflected by the reflection point may be used by the millimeter-wave radar module to measure a longitudinal coming direction (for example, represented by a pitch) of the reflected signal. In an example, the antennas of the millimeter-wave radar module are of the structure shown in (a) in FIG. 8. There is a distance between a transmit antenna 1 and the transmit antenna 0 in the longitudinal dimension. There is a distance between the transmit antenna 1 and the transmit antenna 2 in the longitudinal dimension. A pitch of a reflected signal may be determined by comparing signals separately received by a same receive antenna from the transmit antenna 1, the transmit antenna 0, and the transmit antenna 2. For example, as shown in FIG. 19(*c*)-1 and FIG. 19(*c*)-2, signals between which there is a phase difference in the longitudinal dimension may be compared with reference to a signal that is transmitted by the transmit antenna 0 and received by the receive antenna 2 and the receive antenna 3, a signal that is transmitted by the transmit antenna 2 and received by the receive antenna 0 and the receive antenna 1, and a signal that is transmitted by the transmit antenna 1 and received by the receive antenna 0, the receive antenna 1, the receive antenna 2, and the receive antenna 3, and a longitudinal coming direction (for example, represented by a pitch) of a reflected signal may be obtained through calculation. For example, a signal that is transmitted by the transmit antenna 0 and received by the receive antenna 2 may be compared with a signal that is transmitted by the transmit antenna 1 and received by the receive antenna 0, to obtain a phase difference between the two signals, and a pitch is calculated based on the phase difference. For a specific step of calculating the pitch based on the phase difference between the received signals, refer to the method for calculating the angle β in FIG. 12(*f*). Details are not described herein again.

(3) Determine Coordinates of the Reflection Point in the Fourth Coordinate System.

The first electronic device may calculate, according to formula (7) based on the distance between the reflection point and the millimeter-wave radar and the signal coming direction (the yaw and the pitch) of the reflected signal, the coordinates of the reflection point in the fourth coordinate system established by the first electronic device.

(4) Determine Coordinates of the User in the Fourth Coordinate System.

In some cases, because different parts of a human body in a large size may be provided with different clothes through wearing and have different bone structures, there may be different detection results. As a result, for detection of the human body, there may be a plurality of reflection points that may not be even distributed quite uniformly. For an object in a large size, different parts may be made from different materials, in different shapes, and the like. As a result, for detection of such an object, there may also be a plurality of reflection points that may not be even distributed quite uniformly. For a human body, because parts such as the head, a hand and a foot of the human body all reflect the transmitted signal of the millimeter-wave radar, the millimeter-wave radar detects the human body as a plurality of reflection points within the detectable range. In this case, clustering processing may be performed on point cloud data of the reflection points. To be specific, the plurality of detected reflection points are aggregated into one category, and the cluster is determined as an object or a human body.

For example, (a) in FIG. 20 is a schematic diagram of an effect of performing clustering processing on the point cloud data. In (a) in FIG. 20, each point represents one reflection point detected by the millimeter-wave radar module, three closed curves respectively represent categories obtained through aggregation, and a point outside the three closed curves represents a reflection point that is not aggregated into any category. In an example, the millimeter-wave radar module clusters the plurality of reflection points into one object or human body (user) according to a clustering algorithm, and may obtain, through calculation, coordinates of the object or the human body (the user) in the fourth coordinate system based on coordinates of a plurality of reflection points obtained after clustering. For example, the coordinates of the object or the human body (the user) in the fourth coordinate system may be coordinates of a gravity center of the object or the human body in the fourth coordinate system. For example, as shown in (b) in FIG. 20, a smaller point in (b) in FIG. 20 represents the reflection point detected by the millimeter-wave radar, and a largest point is a coordinate point of the human body (the user) in the fourth coordinate system. The coordinates of the human body (the user) in the fourth coordinate system are denoted as $$u^m = [x_u^m, y_u^m, z_u^m]^T.$$

Further, a height of the object or a height of the human body (the user) may be further obtained through calculation based on a height H of the first electronic device from the ground and the coordinates of the object or the human body (the user) in the fourth coordinate system. For example, a height $h^m$ of the human body (the user) may be calculated according to formula (10).

$$h^m = (H + z_u^m) \times 2 \qquad \text{formula (10)}$$

For example, FIG. 21 is a flowchart of a method for determining the coordinates of the user by the first electronic device in the fourth coordinate system according to an embodiment of this application. As shown in FIG. 21, the method may include the following steps.

S2100: The millimeter-wave radar module receives a reflected signal.

S2101: The millimeter-wave radar module performs a two-dimensional fast Fourier transform on a digital difference frequency signal.

The receive antenna of the millimeter-wave radar module receives the reflected signal. The digital difference frequency signal is obtained based on the reflected signal. The two-dimensional fast Fourier transform is performed on the digital difference frequency signal, to obtain two-dimensional FFT data.

S2102: The millimeter-wave radar module obtains a distance between a reflection point and the millimeter-wave radar and a radial speed according to a target detection algorithm.

The millimeter-wave radar may perform target detection on a frame of two-dimensional FFT data according to a target detection algorithm, to obtain a distance and a radial speed of a target.

It should be noted that, in an indoor environment, a multipath effect and clutter interference are generated, and a signal received by the millimeter-wave radar includes a target reflected signal, background noise, clutter interference, and the like. For example, in a test environment for the frame of two-dimensional FFT data shown in (e) in FIG. 18, there are moving human bodies respectively located in places that are 1 m, 2 m and 4 m away from the millimeter-wave radar. However, it can be learned from (e) in FIG. 18 that, in addition to three peak values in the places that are 1 m, 2 m and 4 m away from the millimeter-wave radar, there is a larger peak value caused by other reflected signals (the background noise, the clutter interference, and the like). If a reflected signal caused by the background noise, the clutter interference, and the like is detected as a reflection point, a false alarm is generated. In an implementation method, the distance and the radial speed of the reflection point may be obtained according to a constant false alarm rate (CFAR) target detection algorithm, to maintain a constant false alarm rate, and improve target detection precision.

It should be noted that the millimeter-wave radar module may obtain, based on two-dimensional FFT data, the distance and the radial speed of the reflection point according to a target detection algorithm in the conventional technology as required. A used target detection algorithm is not limited in embodiments of this application. A specific implementation method of the target detection algorithm may be obtained from the conventional technology. Details are not described herein again.

S2103: The millimeter-wave radar module determines a signal coming direction of the reflected signal.

For example, a yaw and a pitch may be estimated according to an algorithm, for example, a phase difference method, a sum difference beam method, or a music method. The algorithm, for example, the phase difference method, the sum difference beam method, or the music method, may be obtained from the conventional technology. Details are not described herein again.

S2104: The millimeter-wave radar module determines coordinates of the reflection point in the fourth coordinate system.

The millimeter-wave radar determines the coordinates of the reflection point in the fourth coordinate system based on the distance between the reflection point and the millimeter-wave radar and a signal coming direction of the reflection point.

S2105: The millimeter-wave radar module determines coordinates of a smart device or the user in the fourth coordinate system.

In an implementation, detected reflection points are clustered according to the clustering algorithm, and a plurality of reflection points are clustered into the smart device or the user. The clustering algorithm includes a partition-based clustering method, a density-based partitioning method, a model-based partitioning method, a network-based partitioning method, and the like. For example, common clustering algorithms include density-based spatial clustering of applications with noise (DBSCAN), a K-means algorithm, a BIRCH algorithm, and the like. Clustering processing may be performed according to any clustering algorithm. This is not limited in embodiments of this application.

The coordinates of the smart device or the user in the fourth coordinate system may be obtained through calculation based on a coordinate average value of a plurality of reflection points of the smart device or the user obtained after clustering.

S2106: The millimeter-wave radar module tracks the smart device or the user.

The millimeter-wave radar module performs target detection on each received frame of data. Further, after an object (a smart device) or a human body in each frame of data is detected according to the target detection algorithm and the clustering algorithm, a detection result in a current frame may be further matched with a detection result in a previous frame one by one according to an association algorithm, to track the object or the human body (that is, obtain a change in a coordinate value of the object or the human body as time varies). For example, a tracking algorithm (a previous frame and subsequent frame association algorithm) is as follows: Calculate a Euclidean distance (a straight line distance between two spatial points) between two targets in two frames, determine two targets with a shortest Euclidean distance as a same target, and then link and track the target according to a Hungarian algorithm.

Further, in an implementation, the millimeter-wave radar module may determine, based on a target tracking result, that the target is stationary or moving. The millimeter-wave radar module may be further configured to detect a physiological feature (for example, a breath frequency or a heartbeat frequency) of a target in a stationary state. If it is determined that the physiological feature of the target satisfies a set condition (for example, the breath frequency falls within a preset range, or the heartbeat frequency falls within a preset range), it is determined that the target or a target obtained after clustering is the human body (the user). The user is tracked.

(8) Detection of the Physiological Feature, an Identity Category, a Human Body Attitude, and the Like of the User by the Millimeter-Wave Radar Module With reference to accompanying drawings, the following describes in detail a specific method for detecting information such as the physiological feature, the identity category, and the human body attitude by the millimeter-wave radar module.

(1) The Millimeter-Wave Radar Module Detects the Physiological Feature of the User.

The physiological feature of the user includes the breath frequency, the heartbeat frequency, and the like of the user. When the user is still (the position of the user does not change), slight displacement of the body of the user caused by a breath and a heartbeat may cause a phase change of the reflected signal of the millimeter-wave radar module. The breath frequency and the heartbeat frequency of the user may be obtained by detecting the phase change of the reflected signal of the millimeter-wave radar module when the user is still.

In an implementation, as shown in FIG. 22, a method for obtaining the breath frequency and the heartbeat frequency of the user by the millimeter-wave radar module may include the following steps.

S2201: Extract phase information.

In S2201, a range FFT is performed on each frame of data of the millimeter-wave radar, and a frequency of the difference frequency signal may be obtained based on a range FFT result. To be specific, a phase of the difference frequency signal may be obtained. In S2206, the millimeter-wave radar performs target tracking on the user, and may obtain a change of the position of the user as time changes, that is, may obtain a position of the user at a moment.

If the millimeter-wave radar determines that the user is still (for example a coordinate change amount of the user is less than a specified value within a period of time) based on the target tracking result, the millimeter-wave radar performs phase extraction on a range FFT result obtained at the current position of the user, that is, extracts the phase information of the difference frequency signal. For example, the radar scanning cycle is 100 ms, that is, a cycle of a frame of data is 100 ms. The phase information of the difference frequency signal is extracted once from each frame of data. Phase information of a plurality of frames of data is continuously extracted, to obtain a relationship that the phase changes with a quantity of the frames, that is, a relationship that the phase changes with time. The phase is denoted as a vibration signal v(j), where j is the quantity of the frames.

S2202: Unwrap the phase.

The phase is unwrapped, to obtain an actual displacement curve. It is specified that a phase value falls within $[-\pi, \pi]$. If the phase value obtained through calculation in S2201 is greater than $\pi$, phase unwrapping is performed by subtracting $2\pi$ from the phase value. If the phase value obtained through calculation in S2201 is less than $-\pi$, phase unwrapping is performed by adding $2\pi$ to the phase value.

S2203: Calculate a phase difference.

A subtraction is performed on consecutive phase values, and a phase difference operation is performed on the unwrapped phase, to obtain a phase difference $\Delta v$. This can enhance a heartbeat signal and eliminates any phase drift. Herein, $\Delta v(k)=v(k)-v(k-1)$.

S2204: Perform band-pass filtering.

The phase value is filtered by a band-pass filter for distinguishing separately based on the heartbeat frequency and the breath frequency. For example, a passband range of the band-pass filter is set to 0.8 Hz to 4 Hz, and the phase value is filtered, to detect heartbeat. The passband range of the band-pass filter is set to 0.1 Hz to 0.6 Hz, and the phase value is filtered, to detect a breath.

S2205: Estimate a range.

An FFT is performed on a phase difference signal, and a breath frequency and a heartbeat frequency within N frames of time are obtained based on a magnitude of a peak value and a harmonic feature.

S2206: Perform determining.

A breath frequency and a heartbeat frequency within a period of time are recorded. Obtained breath frequency and heartbeat frequency values are screened based on a preset confidence indicator (for example, an accuracy rate of 95% or a false alarm rate of 5%), and a relationship that the breath frequency and the heartbeat frequency changes with time is output.

(2) The Millimeter-Wave Radar Module Detects the Identity Category of the User.

The millimeter-wave radar module may determine the identity category of the user based on the height $h'''$ (of the user) obtained through calculation. The identity category of the user includes adult, child, and the like.

In an implementation, when the user is within a detection range of the millimeter-wave radar module, if it is detected that the user is a moving state, the millimeter-wave radar module calculates a height of a user detected in each frame of data. The height is denoted as $h'''(t)$, indicating a height value at a moment t. An average value $H'''$ of the height of the user may be further calculated based on $h'''(t)$, and the identity category of the user may be determined based on $H'''$. For example, a correspondence between the height of the user and the identity category of the user is shown in Table 1.

63

TABLE 1

| Identity category | Height |
|---|---|
| Adult | $H^m$ > 120 centimeters |
| Child | 120 centimeters ≥ $H^m$ > 50 centimeters |
| Pet | $H^m$ ≤50 centimeters |

(3) The Millimeter-Wave Radar Module Detects the Human Body Attitude of the User.

The millimeter-wave radar module may determine the human body attitude of the user based on a change of the height $h^m$ (of the user) obtained through calculation. The human body attitude includes standing, sitting, lying, and the like.

In an implementation, the millimeter-wave radar module performs target tracking on the user, and if it is determined that the height of the user changes, a value of a height change is greater than a preset height difference threshold, and maintenance duration obtained after the height changes is greater than preset duration, determines that the human body attitude of the user changes. For example, as shown in (a) in FIG. 23, if the millimeter-wave radar module detects that the height of the user changes from 175 centimeters to 80 centimeters and remains at 80 centimeters for a period of time, the millimeter-wave radar module determines that the user changes from standing to lying. If the millimeter-wave radar module detects that the height of the user changes from 175 centimeters to 120 centimeters and remains at 120 centimeters for a period of time, the millimeter-wave radar module determines that the user changes from standing to sitting.

In an example, the millimeter-wave radar module determines the human body attitude of the user based on a height difference Δh between a current height of the user and a height obtained when the user stands. For example, Δh(t) may be obtained through calculation according to formula (11), and Δh(t) indicates a height difference between a height of the user at the moment t and the height obtained when the user stands.

$$\Delta h(t) = H^m - h^m(t) \qquad \text{formula (11)}$$

For example, if the millimeter-wave radar module determines that Δh at a plurality of consecutive moments (that are greater than the preset duration) satisfies the preset height difference threshold, the millimeter-wave radar module determines that the human body attitude of the user changes. For example, a correspondence between the height difference Δh and the human body attitude is shown in Table 2.

TABLE 2

| Identity category | Human body attitude | Height difference Δh |
|---|---|---|
| Adult | Sitting | 30 centimeters ≤ Δh < 60 centimeters |
| | Lying | 60 centimeters ≤ Δh < 120 centimeters |
| Child | Sitting | 20 centimeters ≤ Δh < 40 centimeters |
| | Lying | 40 centimeters ≤ Δh < 80 centimeters |

Further, the millimeter-wave radar may further identify a fall behavior of the user by monitoring the height change of the user. For example, (b) in FIG. 23 shows a height change between a fall and normal lying of the user. As shown in (b) in FIG. 23, compared with that obtained during normal lying, the height of the user changes faster during the fall (that is, a height difference generated within same duration is large), and the height obtained after the fall is lower.

In an implementation, if the millimeter-wave radar module determines that the height difference Δh between the current height of the user and the height obtained when the user stands satisfies a preset fall height threshold, and duration Δt taken by the user to change from the height obtained when the user stands to the current height satisfies a preset fall duration threshold, the millimeter-wave radar module determines a user fall. For example, a correspondence between Δh, Δt, and the user fall is shown in Table 3.

TABLE 3

| Identity category | Status | Height difference Δh | Δt |
|---|---|---|---|
| Adult | Fall | 120 centimeters ≤ Δh | Δt ≤ 0.3 second |
| Child | Fall | 80 centimeters ≤ Δh | Δt ≤ 0.3 second |

(9) Conversion Between the First Coordinate System and the Fourth Coordinate System After the first electronic device 100 establishes the first coordinate system and the fourth coordinate system, a coordinate value in the first coordinate system and a coordinate value in the fourth coordinate system need to be converted, to facilitate collaboration. For example, the coordinates of the second electronic device 300 in the first coordinate system are converted into coordinates of the second electronic device 300 in the fourth coordinate system, or coordinates of the user in the fourth coordinate system are converted into coordinates of the user in the first coordinate system. Consequently, conversion between the first coordinate system and the fourth coordinate system is mentioned.

For example, the antenna distributions of both the UWB module 150 and the millimeter-wave radar module 160 of the first electronic device 100 may be set as shown in FIG. 24. The antenna 0, the antenna 1, and the antenna 2 are distributed in an L shape on a longitudinal plane (for example, a vertical plane). The transmit antenna 0, the transmit antenna 1, and the transmit antenna 2 are distributed in a shape of a triangle on a longitudinal plane (for example, a vertical plane). The receive antenna 0, the receive antenna 1, the receive antenna 2, and the receive antenna 3 are on a same horizontal line on a longitudinal plane (for example, a vertical plane). In addition, the three transmit antennas and the four receive antennas are disposed on a same longitudinal plane.

For example, as shown in FIG. 24, an end point (which may alternatively be replaced with the center point or the like) of a tail end the antenna 0 is used as the origin $O_e$ of the first coordinate system, the connection line between antenna 0 and the antenna 1 is used as the $X_e$ axis of the first coordinate system. The direction in which the antenna 1 points to the antenna 0 is the positive direction of the $X_e$ axis. In the plane in which the antenna 0, the antenna 1, and the antenna 2 are located, the straight line perpendicular to the $X_e$ axis is used as the $Z_e$ axis of the first coordinate system, and the antenna 2 is located in the positive direction of the $Z_e$ axis. Then, with reference to the rule of the right-hand rectangular coordinate system, the $Y_e$ axis of the first coordinate system and the positive direction of the $Y_e$ axis are determined. An end point (which may alternatively be replaced with the center point or the like) of a tail end of the receive antenna 0 is used as the origin $O_m$ of the fourth coordinate system. The connection line between the receive antenna 0 and the receive antenna 1 is used as the $X_m$ axis of the fourth coordinate system. The direction in which the receive antenna 1 points to the receive antenna 0 is the positive direction of the $X_m$ axis. A longitudinal line (for example, a vertical line) passing through the origin $O_m$ is used as the $Z_m$ axis of the fourth coordinate system. The direction pointing to the zenith is the positive direction of the $Z_m$ axis. Then, with reference to the rule of the right-hand rectangular coordinate system, the $Y_m$ axis of the fourth coordinate system and the positive direction of the $Y_m$ axis are determined. It can be learned that the $X_e$ axis is parallel to the $X_m$ axis, the $Y_e$ axis is parallel to the $Y_m$ axis, the $Z_e$ axis is parallel to the $Z_m$ axis, and the fourth coordinate system and the first coordinate system can be converted to each other only through translation.

For example, as shown in FIG. 24, when the first coordinate system is moved a distance dx in a direction parallel to the $X_e$ axis, then moved a distance dy in a direction parallel to the $Y_e$ axis, and next, moved a distance dz in a direction parallel to the $Z_e$ axis, the first coordinate system coincides with the fourth coordinate system. For example, if a case in which coordinates of a point in the first coordinate system are $(x^e, y^e, z^e)$ and coordinates of the point in the fourth coordinate system are $(x^m, y^m, z^m)$ is defined, $[x^m, y^m z^m]^T=[x^e, y^e z^e]^T-[dx, dy, dz]^T$.

It may be understood that a relative position between the first coordinate system and the fourth coordinate system of the first electronic device 100 may be set in another manner. A similar method may be used to perform conversion between the fourth coordinate system and the first coordinate system. Details are not described herein again.

(10) Establishment of a Fifth Coordinate System (Whole-House Coordinate System) and Conversion Between the Fifth Coordinate System and the First Coordinate System In an example, one first electronic device is disposed in each room or each region. The first electronic device obtains position information of each device and each specified region in the room or the region by using a second electronic device including a UWB module to mark a second electronic device including no UWB module and communicating and interacting with the second electronic device including the UWB module. By using a millimeter-wave radar module, the first electronic device obtains position information of a user in the room or the region, and may further obtain information such as a physiological feature, an identity category, and a human body attitude of the user. The first electronic device controls or notifies, based on the received information, a second electronic device to perform a preset operation. In this example, a separate room or region is used as an example.

In another example, for example, in a whole-house scenario, a hub device may be disposed. Devices such as the hub device, a first electronic device, and a second electronic device constitutes a whole-house system in a wired or wireless manner. The first electronic device obtains position information of each device and each specified region in the room or the region by using a second electronic device including a UWB module to mark a second electronic device including no UWB module and communicating and interacting with the second electronic device including the UWB module. By using a millimeter-wave radar module, the first electronic device obtains position information of a user in the room or the region, and obtain information such as a physiological feature, an identity category, and a human body attitude of the user. The first electronic device sends, to the hub device in a wired or wireless manner, the position information of each device and each specified region, and at least one of information such as a position, the physiological feature, the identity category, and the human body attitude of the user. The hub device controls or notifies, based on the received information, a second electronic device to perform a preset operation.

Optionally, the hub device and a specific first electronic device (for example, the first electronic device in the living room) may be integrated into one device.

In the whole-house scenario, the foregoing information of each room and/or each region needs to be collected in a unified manner. Conversion between different coordinate systems in all rooms is mentioned. For example, position information of the primary bedroom in the first coordinate system and position information of the secondary bedroom in the first coordinate system should be both unified to one coordinate system. In this way, unified control or notification can be performed from a whole-house level. Therefore, the fifth coordinate system (also referred to as the whole-house coordinate system) needs to be established.

For example, the user may input, to the hub device, a whole-house floor plan, an installation position of the hub device, a position of the installation position of the hub device in the whole-house floor plan, height information of a whole house, and the like. The whole-house floor plan is a plane spatial layout of the house, is a drawing for describing a usage function, a relative position, a size, and the like of each piece of independent space of the whole house. The hub device establishes the fifth coordinate system based on the whole-house floor plan.

In an example, as shown in (a) in FIG. 25, a projected point that is of the southernmost point of the whole-house floor plan and that is projected onto a horizontal plane is a first projection point. A first straight line parallel to the east-west direction is drawn passing through the first projected point. A projected point that is of the westernmost point of the whole-house floor plan and that is projected onto the horizontal plane is a second projected point. A second straight line parallel to the north-south direction is drawn passing through the second projected point. An intersection of the first straight line and the second straight line is used as an origin $O_h$ of the fifth coordinate system. The first straight line is used as an $X_h$ axis, and the due east direction is a positive direction of the $X_h$ axis. The second straight line is used as a $Y_h$ axis, and the due north direction is a positive direction of the $Y_h$ axis. A $Z_h$ axis is perpendicular to the horizontal plane, and a direction pointing to the sky is a positive direction of the $Z_h$ axis. Optionally, names of the three axes in the fifth coordinate system and the positive directions of the three axes may alternatively be determined in another manner. Details are not described herein again.

Optionally, the first electronic device includes an IMU module. For example, one hub device is installed in the living room. Both the hub device and the first electronic device in the living room are installed in parallel in a position, for example, a wall or a ceiling. There may be an included angle between the first coordinate system established by the first electronic device and a geographical coordinate system (a sixth coordinate system) on all or some of three axes. The included angle may be output by using the IMU module of the first electronic device, or may be obtained by parsing a result output by the IMU module of the first electronic device, or may be obtained through calculation by using a measurement result of an instrument, for example, a level instrument and/or a plumb bob. For example, (b) in FIG. 25 shows an included angle $\Delta\varepsilon$ between a positive direction of a $Y_g$ axis and a positive direction of the $Y_e$ axis. Conversion between the sixth coordinate system and the fifth coordinate system is well known to a person skilled in the art. Details are not described herein again. In an implementation, three axes of the sixth coordinate system are respectively parallel to the three axes of the fifth coordinate system. In this way, conversion between the first coordinate system and the fifth coordinate system can be implemented.

In another example, when establishing the fifth coordinate system, the hub device makes three axes of the fifth coordinate system respectively parallel to three axes of the sixth coordinate system, and may further determine an origin $O_h$ of the fifth coordinate system according to the method shown in (a) in FIG. 25. In addition, when the first electronic device is installed, an instrument, for example, a level instrument and/or a plumb bob or a device including an IMU module is used for assistance, so that the three axes of the first coordinate system established by the first electronic device are respectively parallel to the three axes of the sixth coordinate system. In this way, the three axes of the first coordinate system are respectively parallel to the three axes of the fifth coordinate system. Conversion does not need to be performed between the first coordinate system and the fifth coordinate system.

A distance difference between the coordinate origins of the first coordinate system and the fifth coordinate system may be obtained by using two coordinate values of a same hub device in the first coordinate system and the fifth coordinate system. Specifically, the hub device may obtain coordinate information of the hub device in the fifth coordinate system. The coordinate information of the hub device in the first coordinate system may be obtained in two manners. (i) If the hub device includes a UWB module, the coordinate information of the hub device in the first coordinate system may be obtained through UWB communication between the hub device and the first electronic device. (ii) If the hub device includes no UWB module, the second electronic device including the UWB module may mark the hub device, to obtain the coordinate information of the hub device in the first coordinate system. The distance difference between the coordinate origins of the first coordinate system and the fifth coordinate system can be obtained by using the two coordinate values of the same hub device in the first coordinate system and the fifth coordinate system.

4. HUMAN SENSING-BASED AUTOMATIC CONTROL METHOD

As described above, in a whole-house scenario, one first electronic device is disposed in each room in all or some rooms, one first electronic device is disposed in all or some regions, and one or more second electronic devices are disposed in a single room. For example, (a) in FIG. 26 shows general steps of the human sensing-based automatic control method. As shown in (a) in FIG. 26, the method may include the following steps.

S1: The first electronic device establishes a first coordinate system and a fourth coordinate system. The second electronic device establishes a second coordinate system. A hub device establishes a fifth coordinate system. Position information of each device, region, and user, and the like in the fifth coordinate system is obtained through conversion from the first coordinate system, the second coordinate system, a third coordinate system, and the fourth coordinate system to the fifth coordinate system.

S1 is specifically described in the following steps.

(1) The first electronic device establishes the first coordinate system and the fourth coordinate system. The second electronic device establishes the second coordinate system. The hub device establishes the fifth coordinate system.

Optionally, a second electronic device including a UWB module establishes the second coordinate system. A second electronic device including no UWB module establishes the third coordinate system.

For establishment of the first coordinate system and the fourth coordinate system by the first electronic device, establishment of the second coordinate system by the second electronic device, and establishment of the fifth coordinate system by the hub device, refer to the foregoing principles. Details are not described herein again.

(2) Correct an installation error of the first electronic device, and obtain the position information of each device, region, and user, and the like in the fifth coordinate system through conversion from the first coordinate system, the second coordinate system, the third coordinate system, and the fourth coordinate system to the fifth coordinate system.

There may be an error during installation of the first electronic device. As a result, locating for the second electronic device or the user by the first electronic device deviates. In an implementation, the first electronic device may be corrected during first use, to reduce or even avoid the error caused by installation.

The installation error of the first electronic device may reduce measurement precision of a UWB system. For example, as shown in FIG. 27(*a*), at least one of a first electronic device ① located in the entrance aisle and a first electronic device ③ located in the living room may have an installation error. For a same second electronic device, the first electronic device ① determines that the second electronic device is located in a position 1, and the first electronic device ③ determines that the second electronic device is located in a position 2. The first electronic device ① and the first electronic device ③ determine, based on an identifier of the second electronic device, that electronic devices respectively located in the position 1 and the position 2 are actually the same second electronic device. Consequently, it is indicated that there is an installation error, which reduces measurement precision.

The first electronic device includes a UWB module and a millimeter-wave radar module. Installation error correction may be separately performed on the UWB module and the millimeter-wave radar module. In an implementation, antennas in the UWB module 150 and the millimeter-wave radar module 160 of the first electronic device 100 are distributed as shown in FIG. 24. Hardware is disposed to ensure that a relative position of the UWB module and the millimeter-wave radar in the first electronic device is fixed. Therefore, installation error correction may be performed on only the UWB module or the millimeter-wave radar module. In another implementation, installation error correction may be performed on both the UWB module and the millimeter-wave radar module of the first electronic device. Correction precision is improved through a plurality of times of corrections.

In an embodiment of this application, an example in which the UWB module of the first electronic device is corrected is used for description. It may be understood that a procedure of correcting the millimeter-wave radar module of the first electronic device is similar to that of correcting the UWB module of the first electronic device. Details are not described herein again. The following method is merely an example, and is not intended to limit a correction method. Another correction method also falls within the scope of this application.

Step 11: Correct an installation error of a reference first electronic device by using the hub device, to obtain a first correction parameter.

The reference first electronic device is one of a plurality of first electronic devices. For example, the hub device is installed in the living room, and the first electronic device in the living room may be used as the reference first electronic device. A first coordinate system of the reference first electronic device is denoted as a system e1.

Optionally, the hub device may display a whole-house map. The hub device may indicate the user to hold a second electronic device including a UWB module, and move from a known and easily identified position 1 to another known and easily identified position 2 based on a first track. The reference first electronic device detects a movement track of the second electronic device (by using the UWB module) or a movement track of the user (by using the millimeter-wave radar module). The movement track of the second electronic device is used as an example. There is a deviation between the detected movement track of the second electronic device and the first track.

For example, as shown in FIG. 27(*c*), the hub device may indicate the user to hold the second electronic device including the UWB module, and move from a position 1 with known coordinates to a position 2 with known coordinates along a straight line. The first electronic device ① may obtain an actual movement track of the second electronic device based on detection performed by the UWB module. As shown in FIG. 27(*c*), there is a specific deviation between a movement track of the user detected by the first electronic device ① and an actual movement track of the user.

Then, an attitude error rotation matrix W and a position error vector G may be obtained through calculation according to an algorithm. For example, the algorithm may be an ICP algorithm shown in FIG. 28. An optimal matching attitude error rotation matrix W and position error vector G may be obtained through calculation according to the ICP algorithm. In this way, an error function is minimized. For specific content of the ICP algorithm, refer to the conventional technology. Details are not described herein again. The first correction parameter includes the current optimal matching attitude error rotation matrix W and position error vector G.

After the reference first electronic device is corrected, the installation error of the first electronic device is corrected based on the reference first electronic device.

Step 12: Correct the installation error of the first electronic device by using the reference first electronic device, to obtain a second correction parameter.

In an example, the user holds the second electronic device including the UWB module, and moves in each room of a whole house. Each first electronic device in the whole house locates the second electronic device. For example, as shown in FIG. 27(*a*), there is an overlapping region 2701 between a signal coverage region of the first electronic device ① and a signal coverage region of the first electronic device ③. When the user moves in the overlapping region 2701, as shown in FIG. 27(*b*), there is a specific deviation between movement tracks of the second electronic device that are obtained by the first electronic device ① and the first electronic device ③. The first electronic device ① is the reference first electronic device.

In an implementation, installation errors of two first electronic devices are corrected based on movement tracks of the second electronic device that are respectively detected by the two first electronic devices. For example, the correction parameter includes an attitude error rotation matrix W and a position error vector G. For example, the first electronic device ① obtains a movement track $$q^{e1} = [q_{t1}^{e1}, q_{t2}^{e1}, q_{t3}^{e1}, \ldots, q_{tm}^{e1}]$$

of the second electronic device in the first coordinate system (the system e1) established by the first electronic device ①. The first electronic device ③ obtains a movement track $$q^{e3} = [q_{t1}^{e3}, q_{t2}^{e3}, q_{t3}^{e3}, \ldots, q_{tm}^{e3}]$$

of the second electronic device in a first coordinate system (a system e3) established by the first electronic device ③. Herein, $$q_{tm}^{e1}$$

represents coordinates of the second electronic device in the system e1 that are detected by the first electronic device ① at a moment tn, and $$q_{tm}^{e3}$$

represents coordinates of the second electronic device in the system e3 that are detected by the first electronic device ③ at the moment tn. The movement tracks $q^{e1}$ and $q^{e3}$ of the user may be converted to the fifth coordinate system according to a subsequent formula (13), and are respectively denoted as $q^{e1 \to h}$ and $q^{e3 \to h}$.

Herein, $q^{e1 \to h}$ and $q^{e3 \to h}$ are point clouds that record a movement track of the user. An attitude error rotation matrix $W^{e3 \to e}$ and a position error vector $G^{e3 \to e1}$ between the two point clouds $q_{e1 \to h}$ and $q^{e3 \to h}$ may be calculated according to an iterative closest point (ICP) algorithm, to minimize a three-dimensional spatial error between a corrected point cloud $q^{e1 \to h}$ and the point cloud $q^{e3 \to h}$. A basic principle of the ICP algorithm is shown in FIG. 28. A closest point $$\left( q_i^{e1}, q_i^{e3} \right)$$

is found in a to-be-matched target point cloud $q^{e3 \to h}$ and a reference point cloud $q^{e1 \to h}$ based on a constraint condition $$E(W, G) = \frac{1}{n} \sum_{i=1}^{n} \left\| q_i^{e1} - \left( W q_i^{e3} + G \right) \right\|^2.$$

Then an optimal matching attitude error rotation matrix W and position error vector G are obtained through calculation, to minimize an error function. For a specific step of the ICP algorithm, refer to the conventional technology. Details are not described again in embodiments of this application. The second correction parameter includes the current optimal matching attitude error rotation matrix W and position error vector G.

Optionally, an order between step 11 and step 12 may be changed. In addition, the foregoing step 11 and step 12 are merely examples. In another example, correction of all first electronic devices is implemented by using the hub device, instead of using the reference first electronic device.

When the user moves without holding the second electronic device including the UWB module, each first electronic device may detect a movement track of the user. A related manner is similar to a manner of processing the movement track of the second electronic device. Details are not described herein again.

Step 13: Convert, to the coordinates in the fifth coordinate system, coordinates of the second electronic device in the first coordinate system or coordinates of the user in the fourth coordinate system that are obtained by the first electronic device through calculation.

In an example, an attitude error rotation matrix and a position error vector that are of the reference first electronic device relative to the hub device are obtained by performing the foregoing step 11. For example, the first electronic device ① is used as the reference first electronic device. An attitude error rotation matrix and a position error vector of the first electronic device ① relative to the hub device are denoted as $[W^{e1 \to h}, G^{e1 \to h}]$.

An attitude error rotation matrix and a position error vector of another first electronic device relative to the reference first electronic device are corrected by performing the foregoing step 12. For example, the first electronic device ① is used as the reference first electronic device. An attitude error rotation matrix and a position error vector of the another first electronic device relative to the first electronic device ① are denoted as $[W^{ek \to e1}, G^{ek \to e1}]$, where $k \in 2, \ldots, n$.

In an example, the first electronic device ① is used as the reference first electronic device. Coordinates that are of an origin of a first coordinate system of a $k^{th}$ other first electronic device other than the reference first electronic device and that are in the fifth coordinate system are expressed as $$[x_o^{kh}, y_o^{kh}, z_o^{kh}].$$

Any point in space is selected as a point q. Coordinates of the point q in the first coordinate system established by the $k^{th}$ first electronic device are expressed as $$q^{ek} = [x_q^{ek}, y_q^{ek}, z_q^{ek}].$$

Coordinates of the point q in the fifth coordinate system that are obtained after installation error correction are expressed as $q'^h = [x'_q{}^h, y'_q{}^h, z'_q{}^h]$. The coordinates of the point q in the first coordinate system established by the $k^{th}$ first electronic device may be converted to the fifth coordinate system according to formula (12) after undergoing installation error correction.

$$[x_q'^h, y_q'^h, z_q'^h]^T = W^{e1 \to h}(W^{ek \to e1}(C_e^h \cdot [x_q^{ek}, y_q^{ek}, z_q^{ek}]^T + \qquad \text{formula (12)}$$
$$[x_o^{kh}, y_o^{kh}, z_o^{kh}]^T) + G^{ek \to e1}) + G^{e1 \to h}$$

Coordinates, of an origin of the first coordinate system established by the reference first electronic device, in the fifth coordinate system are expressed as $$[x_o^{1h}, y_o^{1h}, z_o^{1h}].$$

Coordinates of the point q in the first coordinate system established by the reference first electronic device are expressed as $$q^{e1} = [x_q^{e1}, y_q^{e1}, z_q^{e1}].$$

Coordinates of the point q in the fifth coordinate system that are obtained after installation error correction are expressed as $$q'^h = [x_q'^h, y_q'^h, z_q'^h].$$

The coordinates of the point q in the first coordinate system established by the reference first electronic device may be converted to the fifth coordinate system according to formula (13) after undergoing installation error correction.

$$[x_q'^h, y_q'^h, z_q'^h]^T = \qquad \text{formula (13)}$$
$$W^{e1 \to h}(C_e^h \cdot [x_q^{e1}, y_q^{e1}, z_q^{e1}]^T + [x_o^{1h}, y_o^{1h}, z_o^{1h}]^T) + G^{e1 \to h}$$

In another example, coordinates detected by the first electronic device are directly converted to the fifth coordinate system after undergoing installation error correction, without using the reference first electronic device. For example, the attitude error rotation matrix and the position error vector between two point clouds of the movement track of the user detected by the first electronic device and the actual movement track of the user, are respectively denoted as $W^{e \to h}$ and $G^{e \to h}$. Coordinates, of an origin of the first coordinate system established by the first electronic device, in the fifth coordinate system are expressed as $$[x_o^h, y_o^h, z_o^h].$$

Coordinates of the point q in the first coordinate system established by the first electronic device are expressed as $$q^e = [x_q^e, y_q^e, z_q^e].$$

Coordinates of the point q in the fifth coordinate system that are obtained after installation error correction are expressed as $$q'^h = [x_q'^h, y_q'^h, z_q'^h].$$

The coordinates of the point q in the first coordinate system established by the first electronic device may be converted to the fifth coordinate system according to formula (14) after undergoing installation error correction.

$$[x_q'^h, y_q'^h, z_q'^h]^T =$$

$$W^{e->h}(C_e^h \cdot [x_q^e, y_q^e, z_q^e]T + [x_o^h, y_o^h, z_o^h]T) + G^{e->h}$$

formula (14)

It may be understood that a method for converting, to the fifth coordinate system, the coordinates of the user in the fourth coordinate system that are detected by the first electronic device and that undergo installation error correction is similar to a method for converting, to the fifth coordinate system, the coordinates of the user in the first coordinate system that are detected by the first electronic device and that undergo installation error correction. Details are not described herein again.

During first use, the second electronic device in the whole house may be located by using the UWB module of the first electronic device. A first electronic device in each room or region may determine coordinates of a second electronic device in the room or the region in a first coordinate system of the first electronic device. Optionally, for a plurality of first electronic devices whose signal coverage regions have an overlapping region, one of the plurality of first electronic devices may locate a second electronic device in the overlapping region.

Further, in an implementation, each first electronic device in the whole house converts obtained coordinates of one or more second electronic devices in a first coordinate system to the fifth coordinate system, and sends coordinates of the one or more second electronic devices in the fifth coordinate system to the hub device. In another implementation, each first electronic device in the whole house sends obtained coordinates of one or more second electronic devices in first coordinate system to the hub device, and the hub device converts, to the fifth coordinate system, the coordinates of the second electronic device in the first coordinate system that are received from each first electronic device. Optionally, converting the coordinates of the second electronic device in the first coordinate system to the fifth coordinate system includes: converting, to the fifth coordinate system, the coordinates of the second electronic device in the first coordinate system that undergo installation error correction. The hub device may store the obtained coordinates of the second electronic device in the fifth coordinate system.

Optionally, after first use, a second electronic device may be added to or removed from the whole house, or a position of the second electronic device may change. In an implementation, the hub device cyclically locates the second electronic device by using the first electronic device in each room or each region, and updates the coordinates of the second electronic device that are stored in the hub device. In another implementation, when detecting the second electronic device newly added to the whole house, the hub device triggers locating the second electronic device by using the first electronic device, and updates the coordinates of the second electronic device that are stored in the hub device. For example, the hub device stores configuration information of all devices such as the first electronic device and the second electronic device in the whole house. The second electronic device accesses the hub device, and corresponding configuration information is newly added. If the hub device determines, based on the configuration information, that the second electronic device is newly added, the hub device triggers the first electronic device to locate the second electronic device. In another implementation, after the second electronic device is added to or removed from the whole house, or the position of the second electronic device changes, the user may manually trigger the first electronic device to locate the second electronic device, and update the coordinates of the second electronic device that are stored in the hub device. For example, the user starts, through a human-machine interaction interface displayed on a control panel, the first electronic device to locate the second electronic device. For example, as shown in (a) in FIG. 29, a "Locate a hub device" interface 2901 is displayed on the control panel. The "Locate a hub device" interface 2901 includes room options such as the living room, a dining room, and a kitchen. The user may select one or more of the room options, and click an "OK" button 2902, to enable a first electronic device in a corresponding room to locate a hub device in the room. The "Locate a hub device" interface 2901 further includes a "Cancel" button 2903, used to cancel performing of locating an IoT device. Optionally, the "Locate an IoT device" interface 2901 further includes a "Select all" button 2904. The user may tap the "Select all" button 2904 to select all rooms in the house, and tap the "OK" button 2902, to enable the first electronic device in the whole house to separately locate the second electronic devices.

Optionally, after first use, the first electronic device in each room or each region may be used to cyclically locate the user in the whole house and track a movement track of each user. For example, a cycle is 1 second. The first electronic device performs detection at a frequency of 10 Hz (hertz) (10 times per second), and sends a detection result to the hub device at a frequency of 1 Hz (once per second). Each first electronic device in the whole house may locate (obtain the coordinates of the user in the fourth coordinate system) and track (obtain a movement track of the user in the fourth coordinate system) the user in a signal coverage region of the first electronic device. Optionally, for the plurality of first electronic devices whose signal coverage regions have the overlapping region, one of the plurality of first electronic devices may locate and track a user in the overlapping region. Further, in an implementation, each first electronic device in the whole house converts obtained coordinates or movement tracks of one or more users in the fourth coordinate system to coordinates or movement tracks in the fifth coordinate system, and sends the coordinates or the movement tracks of the one or more users in the fifth coordinate system to the hub device. In another implementation, each first electronic device in the whole house sends obtained coordinates or movement tracks of one or more users in the fourth coordinate system to the hub device. The hub device converts, to coordinates or movement tracks in the fifth coordinate system, the coordinates or the movement track that is of the user in the fourth coordinate system and that is received from each first electronic device. Optionally, converting the coordinates or the movement track of the user in the fourth coordinate system to the fifth coordinate system includes: converting, to the coordinates or the movement track in the fifth coordinate system after, the coordinates or the movement track that is of the user in the fourth coordinate system and that undergoes installation error correction. The hub device may store and cyclically update an obtained position of the user (for example, the coordinates of the user in the fifth coordinate system) or movement track (a coordinate track in the fifth coordinate system).

It should be noted that step (2) is not mandatory and is optional. For example, at the beginning of installation, correction is performed once. Later, correction is generally not required, or correction is performed once again after a long period of use. When step (2) is performed, step (3) does not need to be performed. When step (2) is not performed, step (3) is performed. That is, either step (2) or step (3) is performed.

(3) Obtain the position information of each device, region, and user, and the like in the fifth coordinate system through conversion from the first coordinate system, the second coordinate system, the third coordinate system, and the fourth coordinate system to the fifth coordinate system.

Conversion from the first coordinate system, the second coordinate system, the third coordinate system, and the fourth coordinate system to the fifth coordinate system may be specifically implemented as follows: Conversion between the second coordinate system, the third coordinate system, and the first coordinate system may be implemented by obtaining $$C_e^p$$

and $$C_e^t$$

based on the foregoing principle. The conversion between the fourth coordinate system and the first coordinate system is described in the foregoing principle part. After conversion from all the second coordinate system, the third coordinate system, and the fourth coordinate system to the first coordinate system, $$C_e^h$$

may be obtained based on the foregoing principle. Then, conversion from the first coordinate system to the fifth coordinate system is implemented.

$$C_e^h =$$

formula (15)

$$\begin{bmatrix} \cos\theta_e^h\cos\psi_e^h + \sin\varphi_e^h\sin\theta_e^h\sin\psi_e^h & \cos\varphi_e^h\sin\psi_e^h & \sin\theta_e^h\cos\psi_e^h - \sin\varphi_e^h\cos\theta_e^h\sin\psi_e^h \\ -\cos\theta_e^h\sin\psi_e^h + \sin\varphi_e^h\sin\theta_e^h\cos\psi_e^h & \cos\varphi_e^h\cos\psi_e^h & -\sin\theta_e^h\sin\psi_e^h - \sin\varphi_e^h\cos\theta_e^h\cos\psi_e^h \\ -\cos\varphi_e^h\sin\theta_e^h & \sin\varphi_e^h & \cos\varphi_e^h\cos\theta_e^h \end{bmatrix}$$

Herein, $$\psi_e^h, \varphi_e^h,$$

and $$\theta_e^h$$

are respectively a heading angle, a pitch, and a roll of the fifth coordinate system relative to the first coordinate system. For the any point q in the space of the whole house, coordinates $$q^h = [x_q^h, y_q^h, z_q^h]$$

of the any point q in the fifth coordinate system are obtained, the coordinates $$q^e = [x_q^e, y_q^e, z_q^e]$$

of the any point q in the first coordinate system are obtained, and coordinates of an origin $O_e$ of the first coordinate system in the fifth coordinate system are $$[x_o^h, y_o^h, z_o^h]$$

The coordinates of the point q in the first coordinate system may be converted to the fifth coordinate system according to formula (16).

$$[x_q^h, y_q^h, z_q^h]^T = C_e^h \cdot [x_q^e, y_q^e, z_q^e]^T + [x_o^h, y_o^h, z_o^h]^T \qquad \text{formula (16)}$$

Optionally, the first electronic device may convert coordinates of the first electronic device in the first coordinate system or the fourth coordinate system to the fifth coordinate system. To be specific, the coordinates in the fourth coordinate system do not need to be first converted into coordinates in the first coordinate system, and then the coordinates in the first coordinate system are converted into coordinates in the fifth coordinate system. Instead, the coordinates in the fourth coordinate system may be directly converted into the coordinates in the fifth coordinate system. Then, the converted coordinates in the fifth coordinate system are sent to the hub device. $C_m^{\ h}$ may be obtained based on the foregoing principle. Then, conversion from the fourth coordinate system to the fifth coordinate system is implemented.

$$C_m^h = \begin{bmatrix} \cos\theta_m^h\cos\psi_m^h + \sin\varphi_m^h\sin\theta_m^h\sin\psi_m^h & \cos\varphi_m^h\sin\psi_m^h & \sin\theta_m^h\cos\psi_m^h - \sin\varphi_m^h\cos\theta_m^h\sin\psi_m^h \\ -\cos\theta_m^h\sin\psi_m^h + \sin\varphi_m^h\sin\theta_m^h\cos\psi_m^h & \cos\varphi_m^h\cos\psi_m^h & -\sin\theta_m^h\sin\psi_m^h - \sin\varphi_m^h\cos\theta_m^h\cos\psi_m^h \\ -\cos\varphi_m^h\sin\theta_m^h & \sin\varphi_m^h & \cos\varphi_m^h\cos\theta_m^h \end{bmatrix} \qquad \text{formula (17)}$$

Herein, $$\psi_m^h, \varphi_m^h,$$

and $$\theta_m^h$$

are respectively a heading angle, a pitch, and a roll of the fifth coordinate system relative to the fourth coordinate system. For the any point q in the space of the whole house, the coordinates $$q^h = \left[x_q^h, y_q^h, z_q^h\right]$$

of the any point q in the fifth coordinate system are obtained, coordinates $$q^m = \left[x_q^m, y_q^m, z_q^m\right]$$

of the any point q in the fourth coordinate system are obtained, and coordinates of an origin $O_m$ of the fourth coordinate system in the fifth coordinate system are $$\left[x_o^h, y_o^h, z_o^h\right].$$

Coordinates of the point q in the first coordinate system may be converted to the fifth coordinate system according to formula (18).

$$\left[x_q^h, y_q^h, z_q^h\right]^T = C_m^h \cdot \left[x_q^m, y_q^m, z_q^m\right]^T + \left[x_o^h, y_o^h, z_o^h\right]^T \qquad \text{formula (18)}$$

Optionally, the foregoing conversion is performed by the hub device. The first electronic device separately sends coordinates of the first electronic device in the first coordinate system or the fourth coordinate system to the hub device. The hub device converts the coordinates, that are based on the first coordinate system or the fourth coordinate system of each first electronic device, into coordinates in the fifth coordinate system.

Optionally, one reference first electronic device is set in the plurality of first electronic devices. Another first electronic device other than the reference first electronic device sends coordinate information of the another first electronic device in a first coordinate system or a fourth coordinate system to the reference first electronic device. The reference first electronic device converts coordinates, that are based on the first coordinate system or the fourth coordinate system of each first electronic device, into coordinates in the fifth coordinate system, and sends, to the hub device, the coordinates in the fifth coordinate system that are obtained after conversion.

S2: The second electronic device performs a preset operation based on the position information of the user and the position information of the second electronic device.

In an embodiment of this application, the whole house is divided into one or more rooms and/or one or more regions, which do not overlap each other. The hub device may locate the room or the region by using the first electronic device, and obtain and store a coordinate range of each room or region. For example, the coordinate range of each room or region may be obtained according to the method in (b) in FIG. 14.

The hub device may determine a room or a region in which each first electronic device and each second electronic device are located. In an implementation, the user may query by using the hub device, for example, input a device name (a name of the first electronic device or a name of the second electronic device), a room or a region in which a device is located, or the like. In an implementation, at least one first electronic device is installed in each room or region. The hub device determines, based on an input of the user, a room or a region in which each first electronic device is located. In an implementation, the hub device determines, based on coordinates of the first electronic device or the second electronic device and the coordinate range of each room or region in the whole house, a room or a region in which each first electronic device or each second electronic device is located.

For example, as shown in (b) in FIG. 29, for a room whose horizontal direction is a quadrilateral, a smartphone may be separately placed at four positions in the room, namely, a point A, a point B, a point C, and a point D according to the method shown in (a) in FIG. 14. Coordinates $$\left(x_A^h, y_A^h, 0\right), \left(x_B^h, y_B^h, 0\right),$$

$$\left(x_C^h, y_C^h, 0\right),$$

and $$\left(x_D^h, y_D^h, 0\right)$$

of the four positions, namely, the point A, the point B, the point C, and the point D, in the fifth coordinate system are separately obtained by using the first electronic device 100. A vertical line passing through the position A, a vertical line passing through the position B, a vertical line passing through the position C, and a vertical line passing through the position D may determine a region range of a region obtained, through division, in the room. Coordinates of the second electronic device in the fifth coordinate system are $$\left(x_Q^h, y_Q^h, z_Q^h\right)$$

and $$\left(x_Q^h, y_Q^h, 0\right)$$

are coordinates of a projected point Q of the second electronic device in a plane $X_h O_h Y_h$. A convex quadrilateral is obtained by connecting A, B, C, and D in sequence in the clockwise direction. Four sides of the convex quadrilateral are respectively $\overrightarrow{AB}$, $\overrightarrow{BC}$, $\overrightarrow{CD}$, and $\overrightarrow{DA}$. If it is determined that the point Q is on the right side of the four sides $\overrightarrow{AB}$, $\overrightarrow{BC}$, $\overrightarrow{CD}$, and $\overrightarrow{DA}$, it is determined that the point Q is located in the convex quadrilateral including the point A, the point B, the point C, and the point D. To be specific, it is determined that the second electronic device is located in the room. For example, if the coordinates $$\left(x_Q^h, y_Q^h, 0\right)$$

of the point Q and the coordinates of the point A, the point B, the point C, and the point D satisfies formula (19), it is determined that the point Q is located in a region range including the point A, the point B, the point C, and the point D.

$$\overrightarrow{AB} \times \overrightarrow{AQ} < 0 \qquad \text{formula (19)}$$

$$\overrightarrow{BC} \times \overrightarrow{BQ} < 0$$

$$\overrightarrow{CD} \times \overrightarrow{CQ} < 0$$

$$\overrightarrow{DA} \times \overrightarrow{DQ} < 0$$

Herein, x indicates a vector cross product. $\overrightarrow{AB} \times \overrightarrow{AQ}$ indicates a vector cross product of $\overrightarrow{AB}$ and $\overrightarrow{AQ}$. $\overrightarrow{BC} \times \overrightarrow{BQ}$ indicates a vector cross product of $\overrightarrow{BC}$ and $\overrightarrow{BQ}$. $\overrightarrow{CD} \times \overrightarrow{CQ}$ indicates a vector cross product of $\overrightarrow{CD}$ and $\overrightarrow{CQ}$. $\overrightarrow{DA} \times \overrightarrow{DQ}$ indicates a vector cross product of $\overrightarrow{DA}$ and $\overrightarrow{DQ}$. A vector cross product of two vectors is a scalar.

For example, $$\overrightarrow{AB} = \left(\left(x_B^h - x_A^h\right), \left(y_B^h - y_A^h\right)\right), \overrightarrow{AQ} = \left(\left(x_Q^h - x_A^h\right), \left(y_Q^h - y_A^h\right)\right),$$

$$\overrightarrow{BC} = \left(\left(x_C^h - x_B^h\right), \left(y_C^h - y_B^h\right)\right), \overrightarrow{BQ} = \left(\left(x_Q^h - x_B^h\right), \left(y_Q^h - y_B^h\right)\right),$$

$$\overrightarrow{CD} = \left(\left(x_D^h - x_C^h\right), \left(y_D^h - y_C^h\right)\right), \overrightarrow{CQ} = \left(\left(x_Q^h - x_C^h\right), \left(y_Q^h - y_C^h\right)\right),$$

$$\overrightarrow{DA} = \left(\left(x_A^h - x_D^h\right), \left(y_A^h - y_D^h\right)\right), \overrightarrow{DQ} = \left(\left(x_Q^h - x_D^h\right), \left(y_Q^h - y_D^h\right)\right),$$

$$\overrightarrow{AB} \times \overrightarrow{AQ} = \left(x_B^h - x_A^h\right)\left(y_Q^h - y_A^h\right) - \left(x_Q^h - x_A^h\right)\left(y_B^h - y_A^h\right),$$

$$\overrightarrow{BC} \times \overrightarrow{BQ} = \left(x_C^h - x_B^h\right)\left(y_Q^h - y_B^h\right) - \left(x_Q^h - x_B^h\right)\left(y_C^h - y_B^h\right),$$

$$\overrightarrow{CD} \times \overrightarrow{CQ} = \left(x_D^h - x_C^h\right)\left(y_Q^h - y_C^h\right) - \left(x_Q^h - x_C^h\right)\left(y_D^h - y_C^h\right), \text{ and}$$

$$\overrightarrow{DA} \times \overrightarrow{DQ} = \left(x_A^h - x_D^h\right)\left(y_Q^h - y_D^h\right) - \left(x_Q^h - x_D^h\right)\left(y_A^h - y_D^h\right).$$

In an example, the hub device may store a device information table in the whole house. The device information table includes information about one or more devices (including but not limited to the first electronic device, the second electronic device, and the like) in the whole house. For example, the information about the device includes a device name and a room or a region (room) in which the device is located, and optionally, may further include coordinates (for example, coordinates in the fifth coordinate system) of the device. For example, the device information table is shown in Table 4.

TABLE 4

| Room | Device name | Coordinates |
|------|-------------|-------------|
| Living room | Home theater (left) | $(x_1^h, y_1^h, z_1^h)$ |
| Living room | Home theater (right) | $(x_2^h, y_2^h, z_2^h)$ |
| Living room | Router 1 | $(x_3^h, y_3^h, z_3^h)$ |
| Living room | Living-room television | $(x_4^h, y_4^h, z_4^h)$ |
| Primary bedroom | Bedside speaker | $(x_5^h, y_5^h, z_5^h)$ |
| Primary bedroom | Control panel 1 | $(x_6^h, y_6^h, z_6^h)$ |
| Secondary bedroom | Escritoire speaker | $(x_7^h, y_7^h, z_7^h)$ |
| Balcony | Balcony speaker | $(x_8^h, y_8^h, z_8^h)$ |
| ... | ... | ... |

The hub device may further determine a room or a region in which the user is located. In an implementation, the at least one first electronic device is installed in each room or region. The hub device determines the room or the region in which each first electronic device is located. The room or the region in which each first electronic device is located is the room or the region in which the user that can be detected by the first electronic device is located. In an implementation, the hub device determines the room or the region in which each user is located based on coordinates of the user and the coordinate range of each room or region in the whole house. For a specific method, refer to the method of determining, by the hub device based on the coordinates of the second electronic device and the coordinate range of each room or region in the whole house, the room or the region in which each second electronic device is located. Further, the hub device cyclically obtains the coordinates of the user, and determines, based on the coordinates of the user, the room or the region in which the user is located. In another implementation, the hub device obtains a coordinate range of the whole house and the coordinate range of each room or each region in the whole house based on a whole-house floor plan, an installation position of the hub device, a position of the installation position of the hub device in the whole-house floor plan, height information of the whole house, and the like. Then, the hub device may know, based on obtained coordinates of the user through comparison, the room or the region in which the user is located and that is in the whole house. The hub device may determine, based on a room or a region in which the user is currently located and a room or a region in which the user is located within a previous cycle, that the user enters another room or region from one room or region, or leaves the whole house, enters the whole house, or the like.

Optionally, the hub device may further obtain at least one of information such as a physiological feature, an identity category, and a human body attitude from the first electronic device in each room or each region, and then may subsequently notify or control, based on the at least one of the information such as the position information, the physiological feature, the identity category, and the human attitude, a corresponding second electronic device in a corresponding room or a corresponding region to perform the preset operation.

Specific content of S2 may be further described subsequently with reference to a specific scenario.

For example, (b) in FIG. 26 shows an implementation of the human sensing-based automatic control method according to an embodiment of this application. As shown in (b) in FIG. 26, the UWB module of the first electronic device locates the device, the room, the region, and the like in the whole house, obtains coordinates of the device in the whole house and the room or the region in which the device is located, and reports the coordinates and room or the region to the hub device. The millimeter-wave radar module of the first electronic device performs target tracking on the user in the whole house, and cyclically reports, to the hub device, the coordinates of the user in the whole house and the room or the region in which the user is located. The hub device sends a corresponding preset instruction to the second electronic device based on the coordinates of the second electronic device and the coordinates of the user. In an implementation, if it is determined that a relative position between a first user and the second electronic device satisfies a preset condition, the second electronic device is controlled to execute the preset instruction. Coordinates of the first user may be coordinates of one user or an average value of coordinates of a plurality of users. The second electronic device executes the preset instruction. In this way, for example, when the user approaches a smart lamp, the second electronic device can execute the preset instruction, for example, turn on the smart lamp, by performing a procedure shown in (b) in FIG. 26.

It should be noted that, in the human sensing-based automatic control method provided in embodiments of this application, the hub device may determine, based on the coordinates of the second electronic device and the coordinates of the user, that the second electronic device executes the preset instruction. Alternatively, another device other than the hub device may determine, based on the coordinates of the second electronic device and the coordinates of the user, that the second electronic device executes the preset instruction. Alternatively, the hub device sends the coordinates of the second electronic device and the coordinates of the user to the second electronic device, and the second electronic device determines, based on the coordinates, to execute the preset instruction. It may be understood that an execution body of the human sensing-based automatic control method is not limited in embodiments of this application.

5. DESCRIPTION OF SPECIFIC EMBODIMENTS

After the general descriptions of the overall scenario, the hardware structure of the electronic device, the locating principle, and the human sensing-based automatic control method are provided, the following further describes, with reference to accompanying drawings and specific scenarios, the human sensing-based automatic control method by using a plurality of embodiments. In this way, how a user is enabled to perform automatic control on an IoT device more conveniently according to the technical solutions provided in embodiments of this application is more clearly described, to further improve user experience. In this process, the user does not need to carry any electronic device.

It should be noted that some embodiments include communication and interaction between a plurality of different second electronic devices and a hub device, and even further include communication interaction between the plurality of different second electronic devices. For ease of subsequent description, the following uses a first device, a second device, a third device, and the like to indicate different second electronic devices.

It should be noted that, in specific embodiments, the human sensing-based automatic control method provided in embodiments of this application may be separately refined into a human sensing-based automatic air supply method for an air supply device, a human sensing-based automatic prompt method for a specified user approaching a preset position, a human sensing-based automatic prompt method for a user approaching a specified electronic device, a human sensing-based sedentariness automatic prompt method for a user, a human sensing-based exception automatic alarm method for a user, and the like. The following specifically provides descriptions with reference to the specific embodiments.

Embodiment 1

Embodiment 1 relates to FIG. 30, FIG. 31, and FIG. 32, and provides a human sensing-based automatic air supply method for an air supply device.

Generally, a user may manually adjust an air supply direction, an air supply amount, and the like of an air supply device like an air conditioner, an electric fan, or an air outlet of a fresh air system by using a remote control, an application, or the like. For example, by using an air conditioner remote control, the user may set an air supply mode of the air conditioner to an air sweep mode or a fixed-angle mode, further adjust the air supply direction upwards, downwards, leftwards, or rightwards, and further adjust the air supply amount at several levels. However, a manner of manual adjustment by the user is not intelligent enough, and is inconvenient for use.

According to the human sensing-based automatic air supply method for an air supply device provided in embodiments of this application, an air supply direction of the air supply device is automatically adjusted based on a relative position between a user and the air supply device. An air supply amount of the air supply device is further adjusted based on an area of a room or a region in which the air supply device is located. The user does not need to perform a manual operation, use is facilitated, and user experience is improved. For example, as shown in FIG. 30, when the user approaches an air conditioner 300, the air conditioner 300 automatically adjusts an air supply direction of the air conditioner 300 based on a relative position between the user and the air conditioner 300, so that the air supply direction avoids the user. This prevents the air conditioner from directly blowing air to the user, and avoids user discomfort.

Based on the foregoing principle, the air supply device establishes a coordinate system of the air supply device, and performs marking in the foregoing marking manner based on whether the air supply device includes a UWB module. The first electronic device 100 obtains a position (for example, specific coordinates) of the air supply device 300 through coordinate system conversion. Further, the first electronic device 100 further obtains a position of the user. The first electronic device 100 may send the position of the air supply device 300 and the position of the user to a hub device. The hub device determines the air supply direction of the air supply device 300 based on the position of the air supply device 300 and the position of the user, so that the air supply direction of the air supply device 300 avoids the user.

Based on the foregoing principle, the hub device may further obtain the area of the room or the region in which the air supply device is located. The hub device may automatically set the air supply amount of the air supply device based on the area of the room or the region in which the air supply device is located.

It should be noted that an execution body of the foregoing implementations may be the air supply device 300, the first electronic device 100, or the hub device (not shown in FIG. 30). For example, the hub device, the first electronic device 100, or the air supply device 300 controls the air supply direction or the air supply amount of the air supply device

300 based on the position of the user and the position of the air supply device 300. When the air supply device 300 is the execution body, the air supply device 300 needs to communicate with the hub device or the first electronic device 100 in advance to obtain corresponding positions (for example, the position of the user and the position of the air supply device 300).

The following describes in detail a process of communication interaction between the hub device and the air supply device with reference to FIG. 31 and FIG. 32 by using an example in which the execution body is the hub device, to describe an example of the human sensing-based automatic air supply method for the air supply device.

For example, FIG. 31 is a schematic flowchart of a human sensing-based automatic air supply method for an air supply device in a whole-house scenario according to an embodiment of this application. As shown in FIG. 31, the method includes the following steps.

S3101: A hub device learns that the air supply device is started, and obtains coordinates of the air supply device and coordinates of a user in a fifth coordinate system in real time or cyclically.

For example, after the air supply device is started, the air supply device sends a start indication message to the hub device. If the hub device receives the start indication message, the hub device learns that the air supply device is started.

S3102: The hub device determines whether the user is located in a room or a region to which the air supply device belongs. If it is determined that the user is located in the room or the region to which the air supply device belongs, S3103 is performed.

S3103: The hub device sends a first message to the air supply device.

In an implementation, the hub device obtains a device attitude of the air supply device according to the method described in the foregoing principle part. The hub device further calculates, based on the coordinates and the device attitude of the air supply device in the fifth coordinate system and the coordinates of the user in the fifth coordinate system, coordinates of the user in a coordinate system established by the air supply device.

Further, in an implementation, the hub device calculates a yaw of the user relative to the air supply device based on the coordinates of the user in the coordinate system established by the air supply device.

The hub device sends the first message to the air supply device. The first message indicates the air supply device to automatically adjust an air supply direction. In an example, the first message includes yaw indication information that indicates the yaw of the user relative to the air supply device.

S3104: The air supply device receives the first message, and automatically adjusts the air supply direction, so that the air supply direction avoids the user.

The air supply device receives the first message, obtains the yaw indication information, and obtains the yaw of the user relative to the air supply device based on the yaw indication information. The air supply device automatically adjusts the air supply direction based on the yaw of the user relative to the air supply device, so that the air supply direction avoids the user.

Optionally, as shown in FIG. 31, the method may further include the following steps.

S3105: The air supply device sends a first feedback message to the hub device.

The first feedback message indicates that the air supply device has completed automatically adjusting the air supply direction.

S3106: The hub device receives the first feedback message, and learns that the air supply device has completed adjustment.

The hub device receives the first feedback message, determines, based on the first feedback message, that the air supply device has completed adjustment, and continues to cyclically obtain the coordinates of the user in the fifth coordinate system.

S3107: A change of the coordinates of the user exceeds a first preset range.

If the hub device determines that the change of the coordinates of the user exceeds the first preset range, S3102 to S3104 are performed, to enable the air supply device to automatically adjust the air supply direction, so that the air supply direction avoids the user.

In this scenario, the air supply device automatically adjusts the air supply direction based on the position of the user, so that the air supply direction avoids the user. The user does not need to perform a manual operation, and the user does not need to carry any device neither. This improves convenience and comfort of using the air supply device by the user.

For example, FIG. 32 is another schematic flowchart of a human sensing-based automatic air supply method for an air supply device in a whole-house scenario according to an embodiment of this application. As shown in FIG. 32, the method includes the following steps.

S3201: A hub device learns that the air supply device is started, and obtains, in real time or cyclically, coordinates of the air supply device and a room or a region to which the air supply device belongs.

For example, after the air supply device is started, the air supply device sends a start indication message to the hub device. If the hub device receives the start indication message, the hub device learns that the air supply device is started. The hub device learns that the air supply device is started, and obtains, in real time or cyclically, the coordinates of the air supply device and the room or the region to which the air supply device belongs.

S3202: The hub device obtains an area of the room or the region to which the air supply device belongs.

Based on the foregoing principle, the hub device may obtain a coordinate range of the room or the region to which the air supply device belongs, and obtain, based on the coordinate range of the room or the region, the area of the room or the region to which the air supply device belongs.

S3203: The hub device sends a second message to the air supply device.

For example, a correspondence between the area and an air supply amount is shown in Table 5.

TABLE 5

| Room area (square meter) | Air supply amount |
|---|---|
| Less than or equal to 15 | Level 1 |
| Greater than 15 and less than or equal to 20 | Level 2 |
| Greater than 20 and less than or equal to 30 | Level 3 |
| Greater than 30 | Level 4 |

It should be noted that Table 5 is merely an example. A manner of setting the correspondence between the room area and the air supply amount is not limited in embodiments of this application. For example, the air supply amount may not be set based on a level but calculated based on an air outlet volume per unit time.

In an implementation, the hub device determines the air supply amount of the air supply device based on the area of the room or the region to which the air supply device belongs and the correspondence between the area and the air supply amount. The second message includes first indication information. The first indication information indicates the air supply amount.

In another implementation, the second message includes second indication information. The second indication information indicates the area of the room or the region to which the air supply device belongs. The air supply device receives the second message, obtains, based on the second indication information, the area of the room or the region to which the air supply device belongs, and determines the air supply amount of the air supply device based on the area of the room or the region to which the air supply device belongs and the correspondence between the area and the air supply amount.

S3204: The air supply device receives the second message, and adjusts the air supply amount based on the second message.

Optionally, as shown in FIG. 32, the method may further include the following steps.

S3205: The air supply device sends a second feedback message to the hub device.

The second feedback message indicates that the air supply device has completed adjusting the air supply amount.

S3206: The hub device receives the second feedback message, and learns that the air supply device has completed adjustment.

In this implementation, the air supply device automatically adjusts the air supply amount based on the area of the room or the region to which the air supply device belongs. This improves convenience of using the air supply device by the user.

It should be noted that the methods in FIG. 31 and FIG. 32 may be performed together or independently. This is not limited in embodiments of this application.

Embodiment 2

Embodiment 2 relates to FIG. 33 and FIG. 34, and provides a human sensing-based automatic prompt method for a specified user approaching a preset position.

In a home scenario, there are some positions that the specified user (for example, a child) is not wanted to approach. For example, a user does not want the child to approach regions that are dangerous to the child, for example, a gas stove and a balcony. According to the human sensing-based automatic prompt method for a specified user approaching a preset position provided in embodiments of this application, a hub device obtains coordinates of the preset position, tracks a position of the user in real time, and sends prompt information if determining that the specified user (for example, the child) approaches the preset position, to avoid danger. For example, as shown in FIG. 33, if the child approaches a window of the balcony or enters a kitchen, the prompt information is sent, to remind an adult to pay attention.

For example, as shown in FIG. 34, a human sensing-based automatic prompt method for a specified user approaching a preset position provided in an embodiment of this application may include the following steps.

S3401: A hub device obtains coordinates of a preset position.

In an example, the preset position is one point. For example, a user does not want a child to approach a gas stove in a kitchen. For example, as shown in FIG. 33, the preset position is set to a position of the gas stove.

In an example, the preset position is two points, namely, a line segment connecting the two points. For example, as shown in FIG. 33, the preset position is a position 1 and a position 2 that are in the doorway of the kitchen, namely, a line segment connecting the position 1 and the position 2. If a child passes through the line segment connecting the position 1 and the position 2, it indicates that the child enters the kitchen.

In an example, the preset position is three or more points, namely, a region enclosed by the three or more points, for example, a room or a region like a kitchen or a balcony.

S3402: The hub device obtains coordinates of a first user in real time or cyclically.

For example, the specified user is a child. The hub device obtains coordinates of a child in a whole house in real time or cyclically. It should be noted that the child herein may be a specific person or a specific type of persons.

S3403: The hub device sends a first message to a playing device if the hub device determines, based on the coordinates of the first user and the coordinates of the preset position, that the first user approaches the preset position.

In an example, the preset position is one point. If the hub device determines that a distance between the first user and the preset point is less than or equal to a preset safe distance (for example, 1 meter), the hub device determines that the first user approaches the preset position.

In an example, the preset position is two points. If the hub device determines that the first user passes through a line segment connecting the two preset points, the hub device determines that the first user approaches the preset position. In an implementation, a line segment 1 connecting a current position of the first user and any point on a movement track of the first user is obtained. If it is determined that the line segment 1 intersects the line segment connecting the two preset points, it is determined that the first user passes through the line segment connecting the two preset points.

In an example, the preset position is three or more points. If the hub device determines that the first user enters a three-dimensional region enclosed by the three or more points, the hub device determines that the first user approaches the preset position.

S3404: The playing device receives the first message, and sends prompt information.

The playing device includes a smart speaker, a smart television, a mobile phone, a tablet computer, a wearable device, a control panel, a lighting device, or the like. Certainly, the playing device may alternatively be the hub device, a first electronic device, or the like. The prompt information indicates that the specified user approaches the preset position. For example, the smart speaker plays a speech "The little master enters the kitchen. Please pay attention".

In an example, the playing device is a playing device that is closest to a current position of the user in the whole house.

Embodiment 3

Embodiment 3 relates to FIG. 35 and FIG. 36, and provides a human sensing-based automatic prompt method for a user approaching a specified electronic device.

In a home or office scenario, there may be some devices that adversely affect a user if the user is close to the devices for a long time. According to the human sensing-based automatic prompt method for a user approaching a specified electronic device provided in embodiments of this application, if it is determined that a distance between the user and a specified second electronic device is less than a preset first distance and duration is greater than or equal to first duration, prompt information is sent. For example, as shown in FIG. 35, if a distance between the user and a second electronic device 300 is less than the preset first distance (for example, 0.5 meter), and duration within which the distance between the user and the second electronic device 300 is less than the preset first distance is greater than or equal to the first duration (for example, 30 seconds), a smart speaker in the room plays prompt information "You have entered an unhealthy region. Please leave."

For example, as shown in FIG. 36, a human sensing-based automatic prompt method for a user approaching a specified electronic device provided in an embodiment of this application may include the following steps.

S3601: A hub device obtains coordinates of a first device.

The first device is a specified second electronic device. The first device may be a specified device or a specified type of devices.

S3602: The hub device obtains coordinates of a user in a whole house in real time or cyclically.

S3603: The hub device sends a first message to the first device or a second device if the hub device determines, based on the coordinates of the first device and the coordinates of the user, that a distance between at least one user and the first device is less than a preset first distance.

After the hub device learns that the distance between the at least one user and the first device is less than the preset first distance, optionally, if the hub device further learns that duration within which the distance between the at least one user and the first device is less than the first distance is greater than or equal to first duration, the hub device sends the first message to the first device or the second device.

In an implementation, if a first electronic device detects that the distance between the user and the first device is less than the preset first distance, and the user stops moving, the first electronic device detects a breath frequency of the user by using a millimeter-wave radar module. If it is determined that the breath frequency of the user is greater than 0 (that is, it is determined that a detected object is a human body), and the duration within which the distance between the user and the first device is less than the preset first distance is greater than or equal to the first duration, the hub device sends the first message to the first device or the second device.

For example, the first device has a playing function, and the hub device sends the first message to the first device. For example, the first device does not have a playing function, and the hub device sends the first message to the second device.

S3604: The first device or the second device receives the first message, and sends prompt information.

The prompt information prompts the user that the user has entered an unhealthy region.

The first device or the second device includes a smart speaker, a smart television, a mobile phone, a tablet computer, a wearable device, a control panel, a lighting device, and the like. Certainly, the hub device or the first electronic device may alternatively send the prompt information.

In an example, the first device or the second device is a playing device that is closest to a current position of the user in the whole house.

Embodiment 4

Embodiment 4 relates to FIG. 37 and FIG. 38, and provides a human sensing-based sedentariness automatic prompt method for a user.

According to the human sensing-based sedentariness automatic prompt method for a user provided in embodiments of this application, if unhealthy behavior (for example, sedentariness) of the user is detected, prompt information is sent. For example, as shown in FIG. 37, if it is determined that duration within which the user sits on a sofa is greater than preset duration (for example, 1 hour), a smart speaker sends the prompt information, to prompt the user to avoid sedentariness.

For example, as shown in FIG. 38, a human sensing-based sedentariness automatic prompt method for a user provided in an embodiment of this application may include the following steps.

S3801: A hub device obtains coordinates of furniture and coordinates of the user.

The furniture may include a sofa, a chair, a stool, a bed, and the like. Based on the foregoing principle, the hub device may calibrate the coordinates of the furniture by locating a mobile device.

S3802: The hub device learns that a distance between the user and the furniture is less than a preset error range.

For example, the error range is 0.5 meter. If the distance between the user and the furniture is less than the preset error range, it may be considered that the user is beside or on the furniture.

S3803: The hub device obtains an attitude of the user.

The attitude of the user includes sitting, lying, standing, and the like.

S3804: The hub device determines that duration within which the attitude of the user is the sitting attitude is greater than or equal to preset duration, and the hub device sends a first message to a first device.

For example, the preset duration is 1 hour.

S3805: The first device receives the first message, and sends prompt information.

The first device includes a smart speaker, a smart television, a mobile phone, a tablet computer, a wearable device, a control panel, a lighting device, and the like. Certainly, the hub device or a first electronic device may alternatively send the prompt information. The prompt information prompts the user to avoid keeping a same human body attitude for a long time. For example, the smart speaker plays a speech "You've been sitting for a long time. Please stand up and move about".

In an example, the first device is a playing device that is closest to the user in a whole house.

Embodiment 5

Embodiment 5 relates to FIG. 39 and FIG. 40, and provides a human sensing-based exception automatic alarm method for a user.

An exception of a user may occur during movement in a home scenario. For example, an old person suddenly falls. For example, the user suddenly has a breath exception or a heartbeat exception. According to the human sensing-based exception automatic alarm method for a user provided in embodiments of this application, if it is detected that the exception of the user occurs, query information is sent. If the user replies, an instruction is executed based on the reply from the user. If the user does not reply, alarm information is sent. For example, as shown in FIG. 39, when it is detected that the user falls, a smart speaker sends query information "Are you okay, master? Do you need help?". The smart speaker sends the alarm information to an emergency contact of the user if the smart speaker does not receive a user reply within preset duration after the smart speaker sends the query information.

For example, as shown in FIG. 40, a human sensing-based exception automatic alarm method for a user provided in an embodiment of this application may include the following steps.

S4001: The hub device detects that an exception of the user occurs, and sends a first message to a playing device.

In an example, detecting that the exception of the user occurs includes detecting that the user falls. In an implementation, a millimeter-wave radar module identifies fall behavior of the user by monitoring a change in a height of the user. For a specific implementation, refer to (b) in FIG. 23 and Table 3. Details are not described herein again.

In an example, detecting that the exception of the user occurs includes detecting no heartbeat or breath of a static user within first duration. For a method for obtaining, by the millimeter-wave radar module, a breath frequency and a heartbeat frequency of the user, refer to FIG. 22. Details are not described herein again.

S4002: The playing device receives the first message, and sends query information.

The playing device includes a smart speaker, a smart television, a mobile phone, a tablet computer, and the like. Certainly, the playing device may alternatively be the hub device, a first electronic device, or the like. The query information is for prompting the user to reply. For example, the smart speaker plays a speech "Are you okay, master? Do you need help?".

In an example, the playing device is a playing device that is closest to a current position of the user in a whole house.

S4003: Determine whether the playing device receives a user reply within preset duration after the playing device sends the query information. If the user reply is received, S4004 is performed. If the user reply is not received within the preset duration, S4005 is performed.

S4004: The playing device executes a corresponding instruction based on the user reply.

The playing device receives a user reply speech, and performs semantic recognition.

In an example, the playing device determines, based on the user reply speech, that the user needs help. For example, the user reply speech is "Yes". The playing device sends alarm information to a preset remote device (for example, a mobile phone of an emergency contact). The alarm information indicates that the exception of the user occurs. It should be noted that, that the playing device sends the alarm information to the preset remote device includes: The playing device sends the alarm information to the preset remote device by using the hub device, the first electronic device, or the like, or the playing device directly sends the alarm information to the preset remote device.

In an example, the playing device determines, based on the user reply speech, that the user does not need help. For example, the user reply speech is "No". The playing device stops receiving speech.

In an example, the playing device determines, based on the user reply speech, that the user indicates to execute another instruction. For example, the user reply speech is "Play music". The playing device executes the corresponding instruction.

S4005: The playing device sends the alarm information to the preset remote device.

Optionally, the hub device sends a second message to the playing device if the hub device detects, within the preset duration after the playing device sends the query information, that the user moves. If the playing device receives the second message, the playing device performs S4003, to wait for a user reply.

In some embodiments, the user may set, on an input device (for example, a mobile phone or a control panel), to enable or disable, in the foregoing scenarios, the human sensing-based automatic control method provided in embodiments of this application. It may be understood that the human sensing-based automatic control methods provided in embodiments of this application are enabled or disabled independently of each other in the foregoing scenarios, may be all enabled or disabled, or may be separately set based on the scenarios. The user may further set, on the input device (for example, the mobile phone or the control panel), a parameter in the human sensing-based automatic control method provided in embodiments of this application. For example, a value of the preset duration may be set, a value of the first distance may be set, and a manner (for example, voice broadcast, blinking, or ringing) in which the playing device sends the prompt information may be set.

It should be noted that the methods in embodiments, the implementations, and the examples of embodiments of this application may be separately combined, and combined embodiments, implementations, or examples also fall within the protection scope of embodiments of this application. Steps or technical features in embodiments of this application may be randomly combined, and combined implementations also fall within the protection scope of embodiments of this application.

It may be understood that, to implement the foregoing functions, the device in the foregoing whole-house system includes a corresponding hardware structure and/or software module for implementing each function. A person skilled in the art should be aware that, in combination with units and algorithm steps of the examples described in embodiments disclosed in this specification, embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the foregoing device may be divided into functional modules based on the foregoing method examples, for example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, is merely logical function division, and may be other division during actual implementation.

In an example, FIG. 41 is a schematic diagram of a possible structure of the first electronic device in the foregoing embodiments. The electronic device 4100 includes a processor 4110 and a memory 4120.

The processor 4110 is configured to: control and manage an action of the electronic device 4100. For example, the processor 4110 may be configured to: calculate coordinates of a user and a room or a region in which the user is located; calculate coordinates of a second electronic device and a room or a region in which the second electronic device is located; calculate a distance between the user and the second electronic device; and determine an instruction to be executed by the second electronic device; and/or is configured for another process of the technology described in this specification.

The memory 4120 is configured to store program code and data of the electronic device 4100.

Certainly, unit modules in the electronic device 4100 include but are not limited to the processor 4110 and the memory 4120. For example, the electronic device 4100 may further include a power supply unit. The power supply unit is configured to supply power to the electronic device 4100.

In an example, FIG. 42 is a schematic diagram of a possible structure of the second electronic device in the foregoing embodiments. The electronic device 4200 includes a processor 4210, a memory 4220, and a display 4230.

The processor 4210 is configured to: control and manage an action of the electronic device 4200.

The memory 4220 is configured to store program code and data of the electronic device 4200.

The display 4230 is configured to display information, an image, a video, and the like on the electronic device 4200.

Certainly, unit modules in the electronic device 4200 include but are not limited to the processor 4210, the memory 4220, and the display 4230. For example, the electronic device 4200 may further include a power supply unit. The power supply unit is configured to supply power to the electronic device 4200.

An embodiment of this application further provides a computer-readable storage medium. The computer-readable storage medium stores computer program code. When a processor of an electronic device executes the computer program code, the electronic device performs the method in the foregoing embodiments.

An embodiment of this application further provides a computer program product. When the computer program product runs on a computer, the computer is enabled to perform the method in the foregoing embodiments.

The electronic device 4100, the electronic device 4200, the computer-readable storage medium, or the computer program product provided in embodiments of this application may be configured to perform a corresponding method provided above. Therefore, for beneficial effects that can be achieved by the electronic device 4100, the electronic device 4200, the computer-readable storage medium, or the computer program product, refer to the beneficial effects of the corresponding method provided above. Details are not described herein again.

A person skilled in the art may clearly learn from the foregoing descriptions of the implementations that, for convenience and brevity of description, division into the foregoing functional modules is only used as an example for description. During actual application, the foregoing functions may be allocated to different functional modules for implementation based on a requirement, that is, an inner structure of an electronic device is divided into different functional modules, to complete all or some of the functions described above.

In the several embodiments provided in this application, it should be understood that the disclosed electronic device and method may be implemented in other manners. For example, the described electronic device embodiment is merely an example. For example, division into the modules or the units is merely logical function division and may be other division during actual implementation. For example, a plurality of units or components may be combined or integrated into another electronic device, or some features may be ignored or not performed. In addition, the displayed or discussed mutual couplings or direct couplings or communication connections may be implemented through some interfaces. The indirect couplings or communication connections between electronic devices or units may be implemented in electrical, mechanical, or other forms.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, for example, a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A human sensing-based automatic control method for a human sensing-based communication system, the system comprising a hub device, a first electronic device, and one or more second electronic devices, any two of the hub device, the first electronic device, and a second electronic device of the one or more second electronic devices communicate in a wired or wireless communication manner, the first electronic device comprises a first ultra-wide band module and a millimeter-wave radar module, and the one or more second electronic devices include a playing device, the method comprising:

obtaining, by the hub device, based on measurement and conversion performed by the first electronic device on a human body position and based on communication between the hub device and the first electronic device, a position information of a user in a whole-house coordinate system provided by the hub device;

obtaining, by the hub device, an exception of the user that occurred, and sending a first message to the playing device; and receiving, by the playing device, the first message, and sending query information.

2. The method according to claim 1, wherein the obtaining, by the hub device, the exception of the user that occurred comprises:

obtaining, by the hub device, that the user falls; or obtaining, by the hub device, that a heartbeat or a breath of a static user is not detected within a first duration.

3. The method according to claim 2, wherein the method further comprises:

if the playing device receives a user reply speech within a preset duration after the playing device sends the query information, executing, by the playing device, a corresponding instruction based on semantics of the user reply speech.

4. The method according to claim 3, wherein the executing, by the playing device, the corresponding instruction based on the semantics of the user reply speech comprises:

determining, by the playing device and based on the user reply speech, that the user needs help and sending alarm information to a remote device; or determining, by the playing device and based on the user reply speech, that the user does not need help, stopping receiving the user reply speech; or executing, by the playing device, a first instruction based on the user reply speech.

5. The method according to claim 4, wherein the method further comprises:

sending, by the playing device, the alarm information to the remote device if the playing device does not receive a user reply within the preset duration after the playing device sends the query information.

6. The method according to claim 2, wherein the method further comprises:

sending, by the hub device, the first message to the playing device if the hub device learns, after the playing device sends the query information, that the user moved; and receiving, by the playing device, the first message, and sending the query information.

7. The method according to claim 2, wherein the playing device is closest to the user in the one or more second electronic devices.

8. The method according to claim 1, wherein the method further comprises:

if the playing device receives a user reply speech within a preset duration after the playing device sends the query information, executing, by the playing device, a corresponding instruction based on semantics of the user reply speech.

9. The method according to claim 8, wherein the executing, by the playing device, the corresponding instruction based on the semantics of the user reply speech comprises:

determining, by the playing device and based on the user reply speech, that the user needs help and sending alarm information to a remote device; or determining, by the playing device and based on the user reply speech, that the user does not need help, stopping receiving the user reply speech; or executing, by the playing device, a first instruction based on the user reply speech.

10. The method according to claim 9, wherein the method further comprises:

sending, by the playing device, the alarm information to the remote device if the playing device does not receive a user reply within the preset duration after the playing device sends the query information.

11. The method according to claim 1, wherein the method further comprises:

sending, by the hub device, the first message to the playing device if the hub device learns, after the playing device sends the query information, that the user moved; and receiving, by the playing device, the first message, and sending the query information.

12. The method according to claim 1, wherein the playing device is closest to the user in the one or more second electronic devices.

13. A hub device, wherein any two hub devices, a first electronic device, and one or more second electronic devices communicate in a wired or wireless communication manner, the first electronic device comprises a first ultra-wide band module and a millimeter-wave radar module, and the one or more second electronic devices include a playing device, the hub device comprising:

a memory storing instructions; and at least one processor in communication with the memory, the at least one processor configured, upon execution of the instructions, to perform the following steps:

obtain position information of a user in a whole-house coordinate system provided by the hub device, the position information being based on measurement and conversion performed by the first electronic device on a human body position and communication between the hub device and the first electronic device; and learn that an exception of the user has occurred; and send a first message to the playing device, the first message indicating the playing device is to send query information.

14. The hub device according to claim 13, wherein the hub device learns the exception of the user occurred comprises:

the hub device learns that the user falls; or the hub device learns that a heartbeat or a breath of a static user is not detected within first duration.

15. The hub device according to claim 14, wherein the at least one processor further executes the instructions to perform the step of:

the hub device sends the first message to the playing device if the hub device learns, after the playing device sends the query information, that the user moved.

16. The hub device according to claim 13, wherein the at least one processor further executes the instructions to perform the step of:

the hub device sends the first message to the playing device if the hub device learns, after the playing device sends the query information, that the user moved.

17. A human sensing-based automatic control method for a hub device, wherein any two hub devices, a first electronic device, and one or more second electronic devices communicate in a wired or wireless communication manner, the first electronic device comprises a first ultra-wide band module and a millimeter-wave radar module, the one or more second electronic devices include a playing device, the method comprising:

obtaining, by the hub device based on measurement and conversion performed by the first electronic device on a human body position and based on communication between the hub device and the first electronic device, a position information of a user in a whole-house coordinate system provided by the hub device;

obtaining, by the hub device, an exception of the user that occurred; and sending a first message to the playing device, the first message indicating the playing device is to send query information.

18. The method according to claim 17, wherein the obtaining, by the hub device, the exception of the user that occurred comprises:

obtaining, by the hub device, that the user falls; or obtaining, by the hub device, that a heartbeat or a breath of a static user is not detected within a first duration.

19. The method according to claim 18, wherein the method further comprises:

sending, by the hub device, the first message to the playing device if the hub device learns, after the playing device sends the query information, that the user moved.

20. The method according to claim 17, wherein the method further comprises:

sending, by the hub device, the first message to the playing device if the hub device learns, after the playing device sends the query information, that the user moved.

* * * * *